United States Patent
Acharya et al.

(10) Patent No.: US 11,960,683 B2
(45) Date of Patent: Apr. 16, 2024

(54) DISPLAY SYSTEM WITH FINGER SENSING

(71) Applicant: 3M INNOVATIVE PROPERTIES COMPANY, St. Paul, MN (US)

(72) Inventors: Bharat R. Acharya, Woodbury, MN (US); Robert D. Taylor, Stacy, MN (US); Joseph P. Attard, Woodbury, MN (US); Benjamin J. Forsythe, Stillwater, MN (US); David T. Yust, Woodbury, MN (US); Matthew E. Sousa, Rosemount, MN (US); Jason S. Petaja, Hudson, WI (US); Anthony M. Renstrom, Forest Lake, MN (US); William Blake Kolb, Stillwater, MN (US); Matthew S. Cole, Woodbury, MN (US); Matthew S. Stay, Bloomington, MN (US); Matthew R. D. Smith, Woodbury, MN (US); Jeremy O. Swanson, Woodbury, MN (US); Tri D. Pham, Woodbury, MN (US); David A. Rosen, North St. Paul, MN (US); Qunyi Chen, St. Paul, MN (US); Lisa A. DeNicola, St. Paul, MN (US); Quinn D. Sanford, Mosinee, WI (US); Carl A. Stover, St. Paul, MN (US); Lin Zhao, Woodbury, MN (US); Gilles J. Benoit, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/996,583

(22) PCT Filed: May 4, 2021

(86) PCT No.: PCT/IB2021/053751
§ 371 (c)(1),
(2) Date: Oct. 19, 2022

(87) PCT Pub. No.: WO2021/224798
PCT Pub. Date: Nov. 11, 2021

(65) Prior Publication Data
US 2023/0214062 A1   Jul. 6, 2023

Related U.S. Application Data

(60) Provisional application No. 63/021,760, filed on May 8, 2020.

(51) Int. Cl.
*G06F 3/042* (2006.01)
*F21V 8/00* (2006.01)
(Continued)

(52) U.S. Cl.
CPC .......... *G06F 3/0421* (2013.01); *G02B 5/0226* (2013.01); *G02B 5/305* (2013.01); *G02B 6/0051* (2013.01)

(58) Field of Classification Search
CPC .......... G06F 3/0421; G06F 2203/04103; G02B 5/0226; G02B 5/305; G02B 6/0051;
(Continued)

(56) References Cited

U.S. PATENT DOCUMENTS

| 5,882,774 A | 3/1999 | Jonza et al. |
| 6,179,948 B1 | 1/2001 | Merrill et al. |

(Continued)

FOREIGN PATENT DOCUMENTS

| WO | WO-2017127734 A1 * | 7/2017 | ............. G02B 5/204 |
| WO | 2019069214 A2 | 4/2019 | |

(Continued)

OTHER PUBLICATIONS

International Search Report for PCT International Application No. PCT/IB2021/053751, dated Jul. 27, 2021, 3 pages.

*Primary Examiner* — Koosha Sharifi-Tafreshi
(74) *Attorney, Agent, or Firm* — Clifton F. Richardson

(57) ABSTRACT

A display system for sensing a finger of a user applied to the display system includes a display panel; a sensor for sensing the finger; a sensing light source configured to emit a first light having a first wavelength W1; and a reflective polarizer disposed between the display panel and the sensor. For a substantially normally incident light, an optical transmit-
(Continued)

tance of the reflective polarizer versus wavelength for a first polarization state has a band edge such that for a first wavelength range extending from a smaller wavelength L1 to a greater wavelength L2 and including W1, where 30 nm≤L2−L1≤50 nm and L1 is greater than and within about 20 nm of a wavelength L3 corresponding to an optical transmittance of about 50% along the band edge, the optical transmittance has an average of greater than about 75%.

18 Claims, 39 Drawing Sheets

(51) Int. Cl.
*G02B 5/02* (2006.01)
*G02B 5/30* (2006.01)

(58) Field of Classification Search
CPC ........ G02B 5/3041; G02B 5/22; G02B 5/208; G02B 5/28; G02B 5/3025
See application file for complete search history.

(56) References Cited

U.S. PATENT DOCUMENTS

| | | | |
|---|---|---|---|
| 6,783,349 B2 | 8/2004 | Neavin et al. | |
| 6,967,778 B1 | 11/2005 | Wheatley et al. | |
| 9,162,406 B2 | 10/2015 | Neavin et al. | |
| 9,441,809 B2 | 9/2016 | Nevitt et al. | |
| 9,551,818 B2 | 1/2017 | Weber et al. | |
| 11,493,777 B2 * | 11/2022 | Yun | G02B 5/305 |
| 11,726,246 B2 * | 8/2023 | Yun | G02B 27/283 |
| | | | 359/485.03 |
| 2015/0220212 A1 | 8/2015 | Kim | |
| 2019/0391307 A1 | 12/2019 | Wheatley et al. | |

FOREIGN PATENT DOCUMENTS

| | | | | |
|---|---|---|---|---|
| WO | 2019123141 A1 | 6/2019 | | |
| WO | WO-2019123141 A1 * | 6/2019 | ........... | G02B 27/285 |
| WO | 2021224703 A1 | 11/2021 | | |
| WO | 2021224715 A1 | 11/2021 | | |
| WO | 2021224735 A1 | 11/2021 | | |
| WO | 2021224761 A1 | 11/2021 | | |
| WO | 2021224782 A1 | 11/2021 | | |
| WO | 2021224799 A1 | 11/2021 | | |

* cited by examiner

DISPLAY SYSTEM WITH FINGER SENSING

CROSS REFERENCE TO RELATED APPLICATIONS

This application is a national stage filing under 35 U.S.C. 371 of PCT/IB2021/053751, filed May 4, 2021, which claims the benefit of U.S. Application No. 63/021,760, filed May 8, 2020, the disclosures of which are incorporated by reference in their entirety herein.

BACKGROUND

A liquid crystal display (LCD) can include a reflective polarizer between an LCD panel and a lightguide.

SUMMARY

The present disclosure relates generally to display systems configured to sense a finger of a user applied to the display system.

In some aspects of the present description, a display system for sensing a finger of a user applied to the display system is provided. The display system includes a display panel configured to generate an image for viewing by the user; a sensor for sensing the finger of the user disposed proximate the display panel; a sensing light source configured to emit a first light having a first wavelength W1 toward the finger of the user; and a reflective polarizer disposed between the display panel and the sensor. The sensor is configured to receive and detect at least a portion of the first light reflected by the finger. The reflective polarizer includes a plurality of polymeric layers numbering at least 50 in total, such that for a substantially normally incident light, an optical transmittance of the reflective polarizer versus wavelength for a first polarization state includes a band edge, where: a best linear fit to the band edge correlating the optical transmittance to the wavelength at least across a wavelength range where the optical transmittance along the band edge increases from about 10% to at least about 70% has a slope of greater than about 2.5%/nm; and for a first wavelength range extending from a smaller wavelength L1 to a greater wavelength L2 and comprising W1, where 30 nm≤L2−L1≤50 nm and L1 is greater than and within about 20 nm of a wavelength L3 corresponding to an optical transmittance of about 50% along the band edge, the optical transmittance has an average of greater than about 75%.

In some aspects of the present description, a display system for sensing a finger of a user applied to the display system is provided. The display system includes a display panel configured to generate an image for viewing by the user; a sensor for sensing the finger of the user disposed proximate the display panel; a sensing light source; and a reflective polarizer disposed between the display panel and the sensor. The reflective polarizer includes a plurality of polymeric layers and can further include a first outer layer co-extruded with the plurality of polymeric layers, where the reflective polarizer includes a plurality of first particles having an average size of from about 7 to about 9 microns and partially protruding from a first major surface of the first outer layer to form a first structured major surface; and a first optically diffusive layer conformably disposed on the first structured major surface so that opposing first and second major surfaces of the first optically diffusive layer substantially conform to the first structured major surface. The first optically diffusive layer may include a plurality of nanoparticles dispersed therein where the nanoparticles define a plurality of voids therebetween. The reflective polarizer may further include a second outer layer opposite the first outer layer where the second outer layer is co-extruded with the plurality of polymeric layers and the first outer layer. The reflective polarizer can include a plurality of second particles partially protruding from a second major surface of the second outer layer to form a second structured major surface.

In some aspects of the present description, a display system for sensing a finger of a user applied to the display system is provided. The display system includes a display panel configured to generate an image for viewing by the user; a sensor for sensing the finger of the user disposed proximate the display panel; a sensing light source; a reflective polarizer disposed between the display panel and the sensor; a lightguide for providing illumination to the display panel where the lightguide is disposed between the reflective polarizer and the sensor; and a structured mirror disposed between the lightguide and the sensor and including an optical mirror and an array of discrete spaced apart optical bumps formed on the optical mirror and facing the lightguide.

These and other aspects will be apparent from the following detailed description. In no event, however, should this brief summary be construed to limit the claimable subject matter.

DETAILED DESCRIPTION

Figure 1:
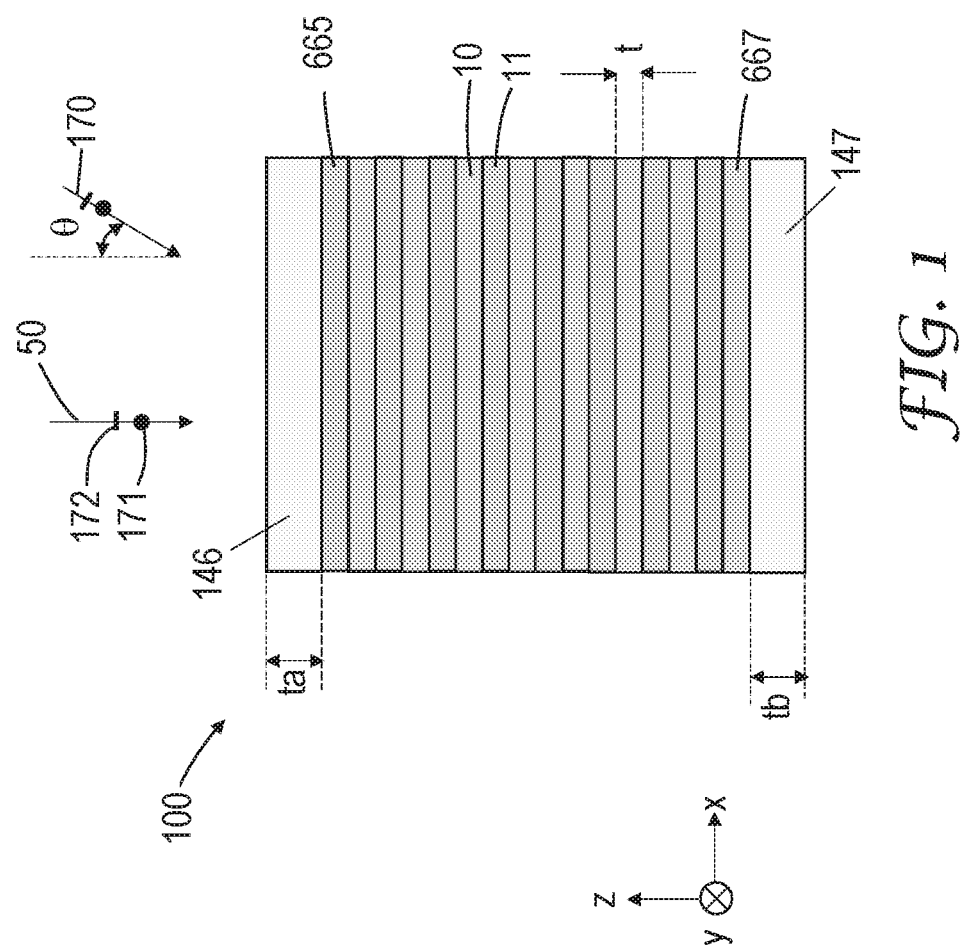
FIGS. 1-2 are schematic cross-sectional views of illustrative reflective polarizers.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments, a display system for sensing a finger of a user applied to the display system includes a reflective polarizer and a sensing light source (e.g., an infrared light source used for finger sensing) configured to emit a first light having a first wavelength W1 toward the finger of the user. The reflective polarizer can be configured such that for a substantially normally incident light, the first wavelength is greater than but close to (e.g., within about 70 nm, or within about 50 nm, or within about 40 nm) a band edge wavelength. In some embodiments, an optical transmittance of the reflective polarizer versus wavelength for a first polarization state includes a band edge such that for a first wavelength range extending from a smaller wavelength L1 to a greater wavelength L2 and including W1, where 30 nm≤L2−L1≤50 nm and L1 is greater than and within about 20 nm of a wavelength L3 corresponding to an optical transmittance of about 50% along the band edge, the optical transmittance has an average of greater than about 75%. In some embodiments, the optical transmittance has a local maximum within about 60 nm of the wavelength L2 and the first wavelength W1 is within about 30 nm or within about 20 nm of the local maximum. In some embodiments, the reflective polarizer includes a packet of polymeric layers including a first portion with a generally increasing layer thickness profile having a first slope and a second portion adjacent the first portion and having a generally decreasing layer thickness profile having a second slope having a magnitude substantially higher than the first slope.

According to some embodiments, the display system includes at least one optically diffusive layer. For example, the reflective polarizer can have a structured outer surface and include a first optically diffusive layer disposed on and conforming to the structured outer surface. The display system can optionally further include an optically diffusive film including a second optically diffusive layer. An optically diffusive layer (e.g., at least one of the first and second optically diffusive layers) can include particles dispersed so as to form aggregates of the particles with voids (air space) between the aggregates. In some embodiments, the optically diffusive layer provides a substantially higher degree of specular transmittance in an infrared range than in a visible range. Alternatively, or in addition, the optically diffusive layer can provide a substantially higher degree of diffuse transmittance in a visible range than in an infrared range, according to some embodiments. In some embodiments, the particles are nanoparticles and the aggregates have an average size of less than about 1 micron. In other embodiments, the aggregates can be larger (e.g., up to about 10 microns, or from about 1 micron to about 10 microns, or from about 5 microns to about 10 microns).

According to embodiments, a plurality of spaced-apart, elongated structures are disposed on an optical layer (e.g., on a side of an optically diffusive film opposite a reflective polarizer) and may impart a surface roughness that lowers the coefficient of friction and eliminates or reduces damage to adjacent films, and which may prevent optical defects (e.g., wet-out, moiré patterns, Newton's rings and similar effects) between adjacent films. In some cases, these elongated structures may be printed onto an optical film, or may be created and placed by another process (e.g., microreplication).

According to some embodiments, a display system further includes a structured mirror including a discontinuous coating on a surface of an optical mirror. The discontinuous coating may impart a surface roughness that lowers the coefficient of friction and eliminates or reduces damage to adjacent films. In some embodiments, the discontinuous coating may be substantially transparent to near infrared wavelengths, enabling infrared sensor functionality behind an LCD panel. In some embodiments, the discontinuous coating may include discrete raised features, such as rounded bumps. In some embodiments, the discrete features may be added to an optical mirror using a technique such as flexographic printing (or similar printing process). In some embodiments, other techniques or processes may be used to add the discrete features to the optical mirror.

Figure 2:
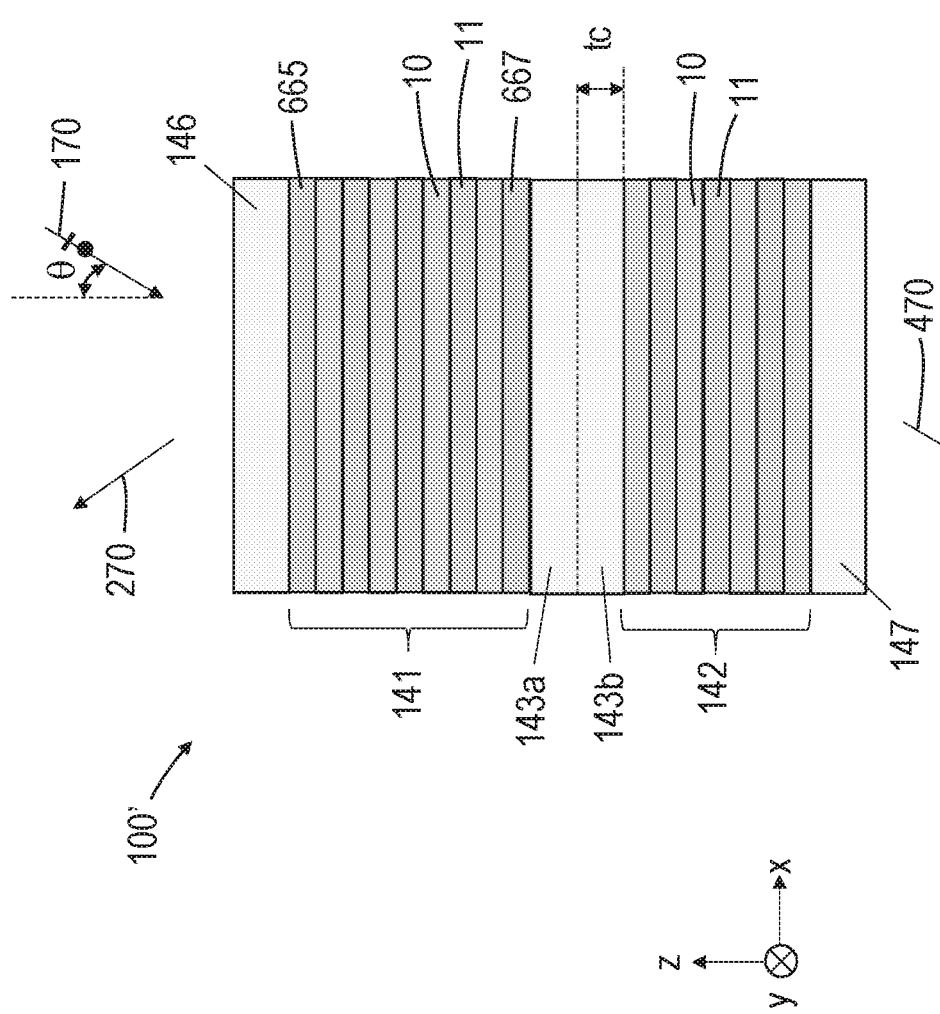

FIGS. 1-2 are schematic cross-sectional views of reflective polarizers 100 and 100', respectively, according to some embodiments. The reflective polarizer 100, 100' includes a plurality of polymeric layers 10, 11 arranged along at least a portion of a thickness (along the z-direction, referring to the illustrated x-y-z coordinate system) of the reflective polarizer. Each polymeric layer 10,11 has an average thickness t which may be less than about 350 nm or less than about 300 nm.

The number of polymeric layers 10, 11 in the reflective polarizer 100 or 100' can be substantially larger than schematically illustrated in FIGS. 1-2. For example, the plurality of polymeric layers 10, 11 can include 50 to 1000 layers or 100 to 800 layers in total. In some embodiments, the plurality of polymeric layers 10, 11 includes greater than about 100 layers, or greater than about 150 layers, or greater than about 200 layers.

The reflective polarizers 100, 100' include outermost layers 146 and 147 which have thicknesses ta and tb, respectively. Each thickness ta, tb can be greater than about 500 nm, or greater than about 1 micrometer, or greater than about 2 micrometers, or greater than about 3 micrometers, or greater than about 5 micrometers, for example. The thicknesses of the outermost layers 146 and 147 may have an effect on the transmission spectra of the reflective polarizer due to light reflected from surfaces of the layers 146 and 147 which may undergo optical interference with light reflected from other layers. For the reflective polarizer 100', the plurality of polymeric layers 10, 11 includes first (141) and second (142) pluralities of polymeric layers where the first and second pluralities of polymeric layers are separated from one another along the thickness of the reflective polarizer by at least one middle layer 143a, 143b, where each middle layer 143a, 143b has an average thickness tc greater than about 500 nm, or greater than about 1 micrometer, or greater than about 2 micrometers, or greater than about 3 micrometers, or greater than about 5 micrometers, for example. The at least one middle layer 143a, 143b can be two protective boundary layers, or a single layer formed from two protective boundary layers, for example. As is known in the art, protective boundary layers are often included adjacent to packets of alternating interference layers to protect the interference layers from damage during processing. Outermost layer 146 and/or 147 can be a protective boundary layer or a combination of a protective boundary layer with an additional outer skin layer, for example.

In some embodiments, the plurality of polymeric layers 10, 11 includes a plurality of first polymeric layers (e.g., layers 10, 11 in the first plurality 141 of layers in reflective polarizer 100' or each of the layers 10, 11 in reflective polarizer 100) arranged along at least a portion of a thickness of the reflective polarizer 100, 100' and sequentially numbered from 1 to N, where N is an integer greater than about 150. The plurality of first polymeric layers includes a polymeric end layer 665, 667 at each end thereof. The polymeric end layers and each layer therebetween can have an average thickness less than about 350 nm or less than about 300 nm. In some embodiments, the plurality of polymeric layers 10, 11 further includes a plurality of second polymeric layers (e.g., layers 10, 11 in the second plurality 142 of layers in reflective polarizer 100') spaced apart along a thickness direction of the reflective polarizer 100' from the plurality of first polymeric layers by one or more middle layers 143a, 143b, where each of the first and second polymeric layers have an average thickness of less than about 350 nm or less than about 300 nm, and each of the one or more middle layers have an average thickness of greater than about 500 nm. In some embodiments, each of the pluralities of first and second polymeric layers number at least 150 in total or at least 200 in total.

The plurality of polymeric layers 10, 11 can include alternating first and second polymeric layers 10 and 11 which may be referred to as interference layers. Interference layers may be described as reflecting and transmitting light primarily by optical interference when the reflectance and transmittance of the interference layers can be reasonably described by optical interference or reasonably accurately modeled as resulting from optical interference. As is known in the art, multilayer optical films (e.g., reflective polarizer films) including alternating polymeric layers can be used to provide desired reflection and transmission in desired wavelength ranges by suitable selection of layer thicknesses. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. In some embodiments, the reflective polarizer has a sharp band edge. Optical films having sharpened band edges are known in the art and are described in U.S. Pat. No. 6,967,778 (Wheatley et al.), for example.

As described further elsewhere herein, the transmittance and reflectance of the reflective polarizer 100, 100' may be specified for substantially normally incident (e.g., nominally normally incident or within 30 degrees, or 20 degrees, or 10 degrees of normally incident) light 40 and/or for light 170 having an incident angle θ (angle of incidence direction with the normal to the reflective polarizer) and may be specified for first and/or second polarization states (e.g., first and second polarization states 171 and 172). The electric field is polarized along the y-axis for first polarization state 171 and is polarized in the x-z plane for second polarization state 172 in the illustrated embodiment. A pass (resp., block) polarization state of a reflective polarizer can be a p-polarization state (p-pol) or an s-polarization state (s-pol) with the projection of the electric field onto a plane (x-y plane) of the reflective polarizer being parallel to a pass (resp., block) axis of the reflective polarizer. In some embodiments, the first polarization state 171 is a block state of the reflective polarizer and the second polarization state 172 is a pass state of the reflective polarizer regardless of the plane of incidence. A portion (e.g., light 270) of the incident light 40, 170 is typically reflected and a portion (e.g., light 470) is typically transmitted. In some embodiments, for the second polarization state 172 (and/or for a pass polarization state) and a first wavelength range, the reflective polarizer has a greater average optical transmittance for light incident at a smaller incident angle (e.g., light 40) and a smaller average optical transmittance for light incident at a greater incident angle (e.g., light 170). Such reflective polarizers may be referred to as collimating reflective polarizers, since when the reflective polarizer is included in a recycling backlight, a portion of light in the pass polarization state that is incident at oblique angles is reflected by the reflective polarizer and then recycled and is eventually transmitted when incident on the reflective polarizer at a smaller incident angle. Collimating reflective polarizers are known in the art and are described in U.S. Pat. No. 9,441,809 (Nevitt et al.) and U.S. Pat. No. 9,551,818 (Weber et al.), for example.

In some embodiments, the reflective polarizer 100 or 100' is an infrared transmissive reflective polarizer. For example, the reflective polarizer may transmit greater than about 60% (or greater than about 70%, or greater than about 75%, or greater than about 80%) of the substantially normally incident light 40 in the wavelength range from about 950 nm to about 1200 nm or from about 950 nm to about 1300 nm for each of the orthogonal first and second polarization states 171 and 172.

Figure 3A:
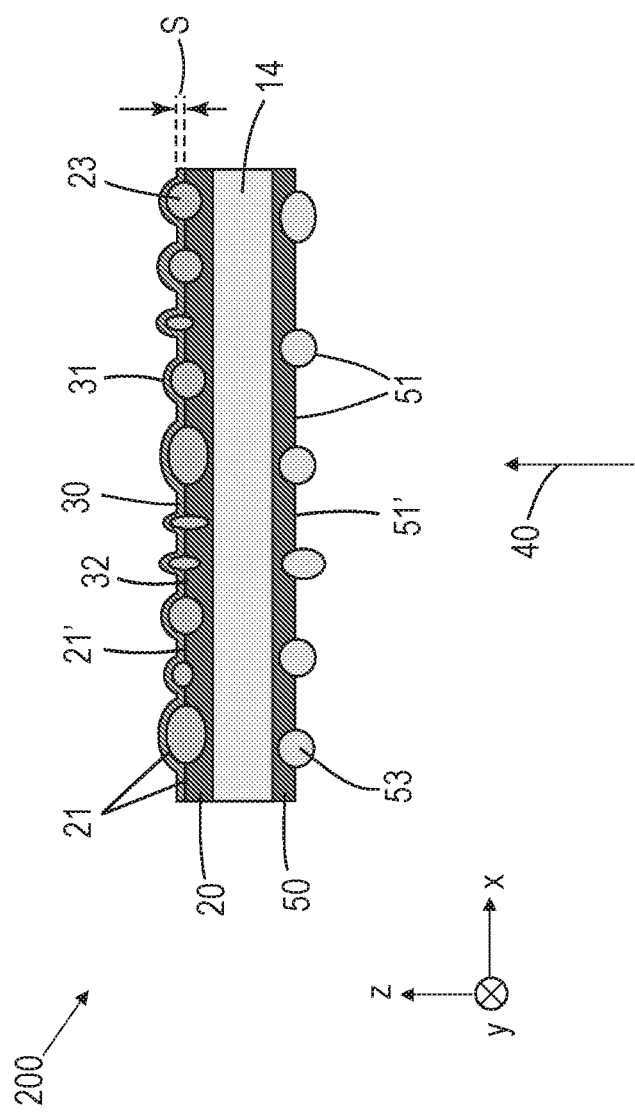
FIG. 3A is a schematic cross-sectional view of an illustrative reflective polarizer having an outer layer including particles partially protruding from a major surface thereof.

The light 40 (or 170) can be incident on either side of the reflective polarizer 100, 100' (e.g., along the −z direction as schematically illustrated in FIG. 1 or along the +z direction as schematically illustrated in FIG. 3A). Similarly, incident light depicted in other figures can be incident from either side of the depicted optical element.

FIG. 3A is a schematic cross-sectional view of a reflective polarizer 200, according to some embodiments. The reflective polarizer includes a plurality of layers 14 (individual layers are not shown in the schematic illustration of FIG. 3A; see, e.g., FIGS. 1-2). The reflective polarizer 200 may generally correspond to the reflective polarizer 100 or 100' except that the reflective polarizer 200 includes first and second outer layers 20 and 50 which includes particles 23 and 53, respectively, but may otherwise correspond to layers 146 and 147. In some embodiments, the reflective polarizer 200 includes a plurality of first particles 23 partially protruding from a first major surface 21' of first outer layer 20 to form a first structured major surface 21. The plurality of polymeric layers 14 can be co-extruded with the first outer layer 20. In some embodiments, the second outer layer 50 is co-extruded with the plurality of polymeric layers 14 and the first outer layer 20. In some embodiments, the reflective polarizer 200 includes a plurality of second particles 53 partially protruding from a second major surface 51' of the second outer layer 50 to form a second structured major surface 51. In some embodiments, the first particles 23 have an average size of from about 7 to about 9 microns. It has been found that undesired optical effects can result when a reflective or partially reflective film (e.g., another reflective polarizer) is disposed on a reflective polarizer with a structured surface. Choosing the average size of the first particles to be in a range from about 7 to about 9 microns has been found to substantially reduce or eliminate these undesired optical effects. In some embodiments, the second particles may also have an average size from about 7 to 9 microns. In other embodiments, the average size is in a different range for the second particles 53 than the first particles 23 since the second structured surface 51 is typically disposed to face a diffuser (see, e.g., FIGS. 21-23) rather than a more reflective film, for example. In some embodiments, the second particles 53 have an average size less than the average size of the first particles 23. In some embodiments, the second particles 53 have an average size of less than about 6 microns or the average size can be in a range of about 1 micron or about 2 microns to about 6 microns, for example. In some embodiments, the second particles 53 have an average size about the same as (e.g., within 10% or within 5%) the average size of the first particles 23. In some embodiments, the second particles 53 have an average size greater than the average size of the first particles 23. In some embodiments, the second particles 53 have an average size greater than about 3 microns, or greater than about 5 microns, or greater than about 10 microns, or greater than about 15 microns. In some embodiments, the second particles have an average size in a range of about 3 microns to about 20 microns, for example.

In some embodiments, the second outer layer 50 includes a plurality of particles 53 partially sunk therein and forming the second structured major surface 51. In some embodiments, the first outer layer 20 includes a plurality of particles 23 partially sunk therein and forming the first structured major surface 21. Related reflective polarizers with structured outer major surfaces are described in U.S. provisional co-pending application 63/021,765 titled REFLECTIVE POLARIZER WITH IMPROVED OPTICAL CHARACTERISTICS and filed on May 8, 2020, and hereby incorporated herein by reference to the extent that it does not contradict the present description.

Figure 3B:
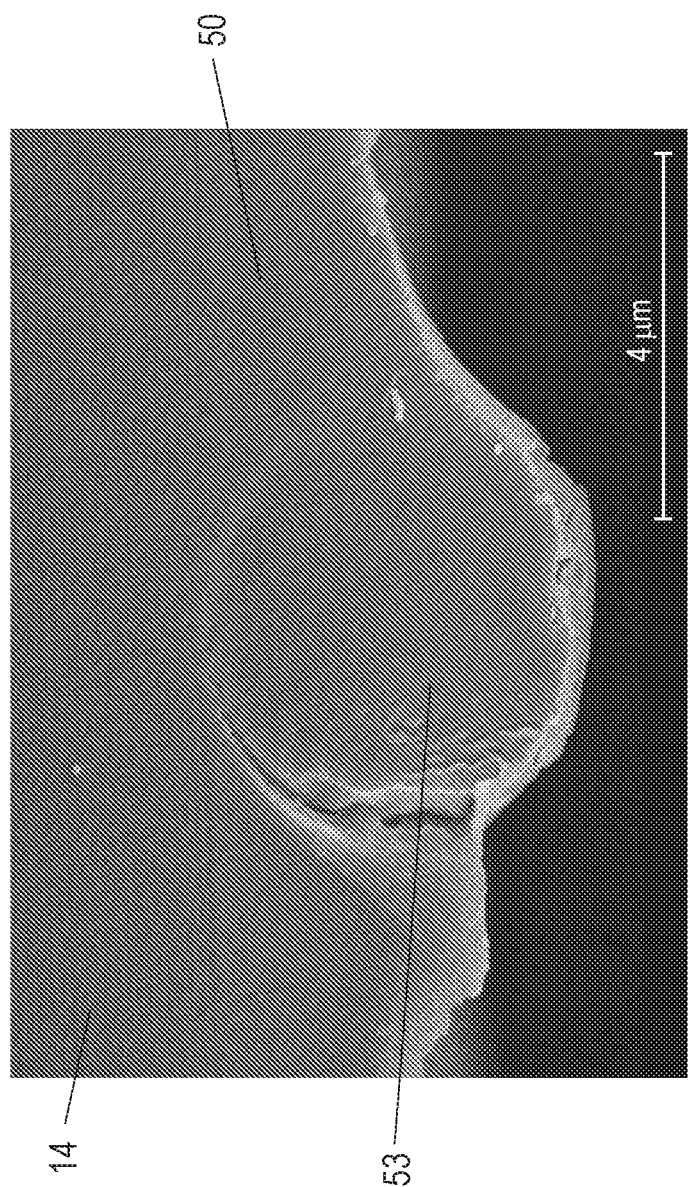
FIGS. 3B-3C are images of cross-sections of portions of an illustrative reflective polarizer where each image shows a particle partially protruding from an outer layer of the reflective polarizer.
Figure 3C:
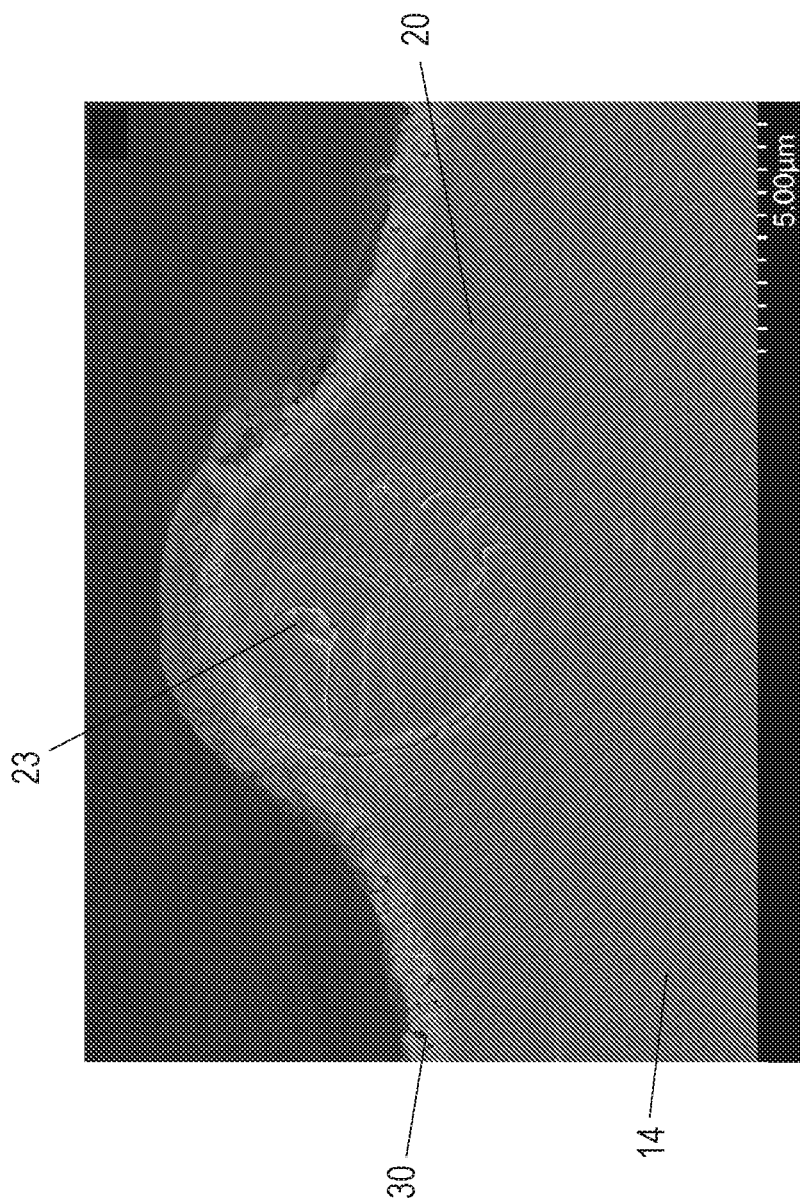

The particles can be applied in a coating to an outermost major surface of a cast web, the coating dried and the cast web stretched (e.g., uniaxially or biaxially to orient the film) to form an optical film. This can result in the particles partially sinking into an outer layer of the film so that the particle is anchored onto the surface and partially protrudes from a major surface of the outer layer. The coating may optionally be applied between sequential stretching in a sequential stretching process to change the modulus/thickness of the outermost layer which may affect the particles partially sinking into the outermost layer. FIG. 3B is a scanning electron microscope (SEM) image of a cross-section of a portion of a multilayer optical film reflective polarizer showing a particle 53 partially protruding from a major surface of an outer layer 50 of the reflective polarizer to form a structured major surface. FIG. 3C is an SEM image of a cross-section of a portion of a multilayer optical film reflective polarizer showing a particle 23 partially protruding from a major surface of an outer layer 20 of the reflective polarizer to form a structured major surface. The reflective polarizer includes an optically diffusive layer 30 substantially conforming to the structured major surface. An outer layer of a film can be described as co-extruded with a plurality of polymeric layers of the film if a continuous portion (e.g., a continuous polymeric phase) of the outer layer is co-extruded with the plurality of polymeric layers, even when particles or other components (e.g., polymer from particle coating) are subsequently (after co-extrusion) added to the outer layer, as the layer will exhibit the properties of a co-extruded layer (e.g., bonding to an adjacent layer without an adhesive). For example, an outer layer that is co-extruded with the polymeric layers 11, 12 may be described as including the particles partially sunk into the outer layer and may be described as being co-extruded with the polymeric layers 11, 12 even if the particles are partially sunk into the layer after it is first formed by co-extrusion with the polymeric layers 11, 12. The particles can be surface coated particles where the surface coating on the particle is formed from a polymer from the mixture used to coat the particles onto the outer layer. In some embodiments, the mixture containing the particles includes a polyester (e.g., the mixture can be an aqueous mixture containing a water soluble polyester), and in some embodiments, the co-extruded outer layer includes a polyester. In some such embodiments, this provides close refractive index matching between the polyester of the coating and the co-extruder layer and the coated polyester can be stretched under similar conditions as the coextruded web. Also, the coated polyester can be compatible with a coated optically diffusive layer.

Alternatively, instead of describing a co-extruded outer layer as including the particles added after co-extrusion, the reflective polarizer can be described as including the particles partially protruding from a major surface of the co-extruded layer.

In other embodiments, particles are included in one, but not the other, of the first and second outer layers to form the respective major surface. For example, a structured surface can be formed by embossing, casting and curing, or other technique that does not utilize the particles to for the structures.

The first structured major surface 21 faces away from the plurality of polymeric layers 14. An optically diffusive layer 30 is conformably disposed on the first structured major surface 21 of the outer layer 20 so that opposing first and second major surfaces 31 and 32 of the optically diffusive layer 30 substantially conform to the first structured major surface 21. For example, the first and second major surfaces 31 and 32 can conform to the first structured major surface 21, or nominally conform to the first structured major surface 21, or conform to the first structured major surface 21 up to variations small compared to the heights of the structures of the structured major surface 21 (e.g., less than about 30%, or less than about 20%, or less than about 10% of the heights of the structures or the average size of the particles 23). In some embodiments, the first and second major surfaces 31 and 32 define an average spacing S of from about 200 to about 5000 nm therebetween. In some embodiments, the average spacing S is from about 200 nm to about 2000 nm, or from about 200 nm to about 1500 nm, or from about 300 nm to about 1200 nm. Reflection and transmission properties of the reflective polarizer 100 can be described for substantially normally incident (e.g., nominally normally incident or within 30 degrees, or within 20 degrees, or 10 degrees of a normal (z-direction) to the x-y plane when the optical construction extends in the x-y plane and has a thickness in the z-direction) light 40 as described further elsewhere.

Figure 4A:
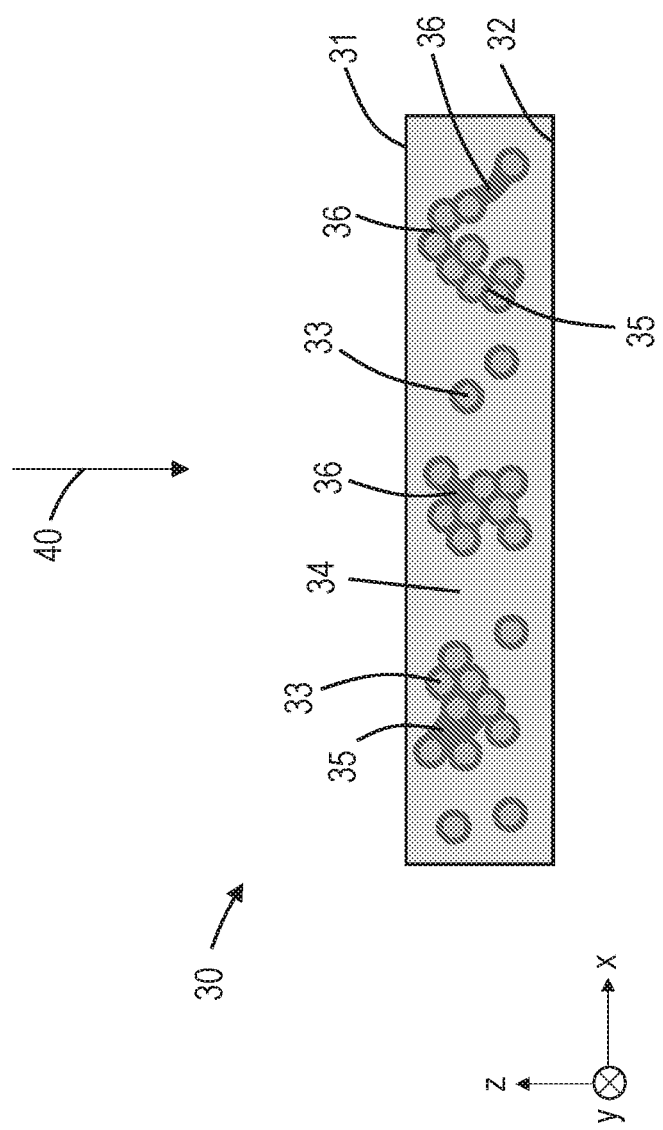
FIG. 4A is a schematic cross-sectional view of an illustrative optically diffusive layer.
Figure 4B:
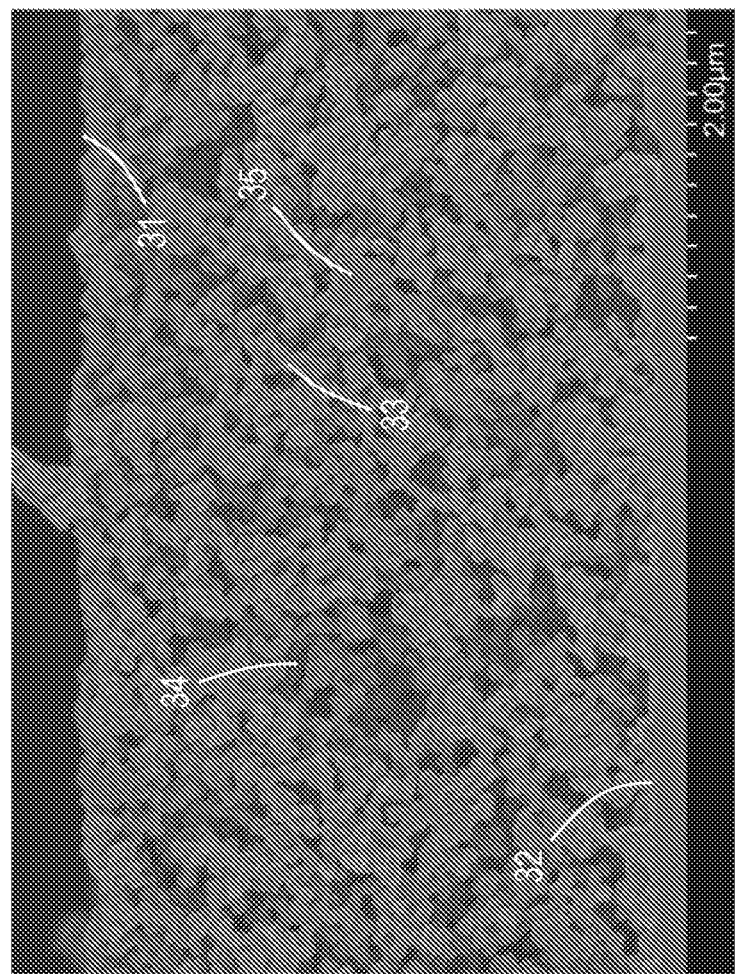
FIG. 4B is a scanning electron microscope (SEM) image of an exemplary optically diffusive layer.

FIG. 4A is a schematic cross-sectional view of an optically diffusive layer 30, according to some embodiments. The optically diffusive layer 30 schematically shown in FIG. 4A can be a portion of the optically diffuse layer 30 schematically shown in FIG. 3A, for example. FIG. 4B is a scanning electron microscope (SEM) image of an exemplary optically diffusive layer 30. The optically diffusive layer 30 includes a plurality of nanoparticles 33 dispersed between and across the first and second major surfaces 31 and 32 of the optically diffusive layer 30. The nanoparticles can have an average size of from about 10 nm to about 150 nm, or from about 20 nm to about 150 nm and define a plurality of voids 34 therebetween. In some embodiments, the nanoparticles 33 in the optically diffusive layer 30 aggregate to form a plurality of nanoparticle aggregates 35 having an average size of between about 100 nm and about 10 microns or between about 100 nm and about 1000 nm. In other embodiments, the aggregates can be larger (e.g., up to about 10 microns, or from about 1 micron to about 10 microns, or from about 5 microns to about 10 microns). In some embodiments, a polymeric material 36 bonds the nanoparticles 33 to each other to form the plurality of nanoparticle aggregates 35 which may define the voids 34 therebetween. In some embodiments, in a plane (e.g., x-z plane) of a cross-section of the optically diffusive layer 30 in a thickness direction (e.g., z-direction) of the optically diffusive layer 30, the voids 34 occupy from about 5% to about 50% of an area of the plane of the cross-section. In some embodiments, the voids 34 occupy from about 5% to about 45% or to about 40% of an area of the plane of the cross-section. In some embodiments, the voids 34 occupy from about 10% or about 15% to about 50%, or to about 45%, or to about 40% of an area of the plane of the cross-section.

In some embodiments, the optically diffusive layer 30 is formed by coating a mixture of the particles, monomer and a solvent, and then curing and drying the mixture. The monomer cures into a polymeric binder (polymeric material 36) bonding aggregates of the particles together and the solvent evaporates forming voids between the aggregates. The solvent can evaporate at least partially during curing and/or a subsequent drying step can be used to complete evaporation of the solvent. In some embodiments, the curing and drying includes a pre-cure step, then a drying step, and then a post-cure step. In some embodiments, the monomer is ultraviolet (UV) curable and a photoinitiator is included in the mixture. The size of the aggregates can be adjusted by changing the UV power used to cure the monomer with a higher power generally resulting in smaller aggregate size. It has been found that a relatively low amount of photoinitiator with a relative high UV power results in small aggregate size and a non-fragile layer while a higher amount of photoinitiator can result in a more fragile layer. The void fraction can be adjusted by changing the amount of solvent used in the mixture with a higher solvent loading generally resulting in a higher void fraction. In some embodiments, the mixture includes about 20 to about 60 weight percent solids.

In some embodiments, the polymeric material 36 is or includes a radiation cured (e.g., UV cured) polymer. In some embodiments, the polymeric material 36 is or includes an acrylate. In some embodiments, the polymeric material 36 is or includes pentaerythritol triacrylate.

The average particle size of the nanoparticles 33, or other particles described herein, can be the mean or median size. For example, the average size can be the Dv50 size (median size in a volume distribution or, equivalently, particle size where 50 percent of the total volume of the particles is provided by particles having a size no more than the Dv50 size). In some embodiments, the nanoparticles 33 have an average size in a range from about 20 nm to about 150 nm, or from about 30 nm to about 120 nm, or from about 30 nm to about 100 nm, or from about 50 nm to about 90 nm, or from about 60 nm to about 90 nm. In some embodiments, the nanoparticles 33 are or include silica.

The percent of the area of the cross-section occupied by the voids 34 can be determined using image analysis techniques. For example, the optically diffusive layer can be cut by micro-tome and then a scanning electron microscope (SEM) image of the cross-section can be taken and then analyzed using image analysis software to determine the percent area occupied by the voids. The average size of the aggregates can also be determined from an analysis of the image. The size of an aggregate in a cross-section can be the equivalent circular diameter of the agglomerate (i.e., the diameter of a circle having the same area in the cross-section as the agglomerate).

The particles 23 can have an average particle size (e.g., diameter) of at least about 2, 3, 5, 10 20, or 50 times the average size of the particle aggregates 35.

Related optically diffusive layers are described in U.S. provisional co-pending application 63/021,751 titled OPTICAL FILMS AND STACKS INCLUDING OPTICALLY DIFFUSIVE LAYER and filed on May 8, 2020, and hereby incorporated herein by reference to the extent that it does not contradict the present description. Related reflective polarizers including an optically diffusive layer are described in U.S. provisional co-pending application 62/704,399 titled OPTICAL CONSTRUCTION AND DISPLAY SYSTEM INCLUDING SAME and filed on May 8, 2020, and hereby incorporated herein by reference to the extent that it does not contradict the present description.

In some embodiments, a display system includes the reflective polarizer, a sensor for sensing the finger of the user disposed proximate the display panel, and may further include an optically diffusive film disposed between the reflective polarizer and the sensor.

Figure 5A:
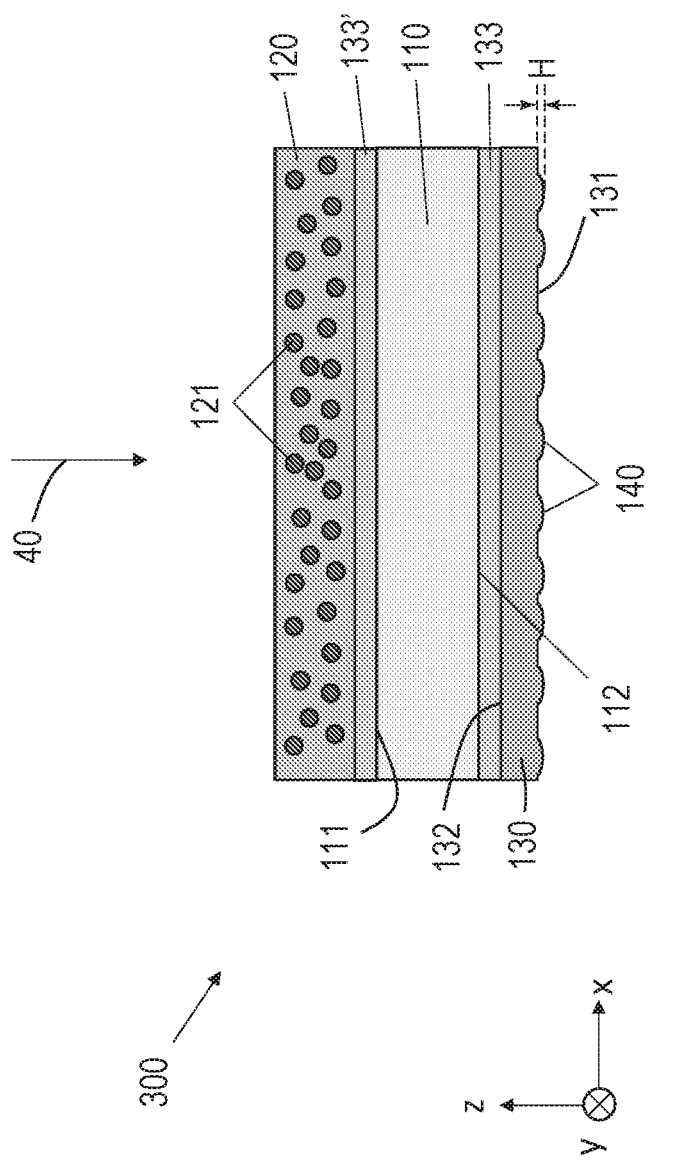
FIG. 5A is a schematic cross-sectional view of an illustrative optically diffusive film.
Figure 5B:
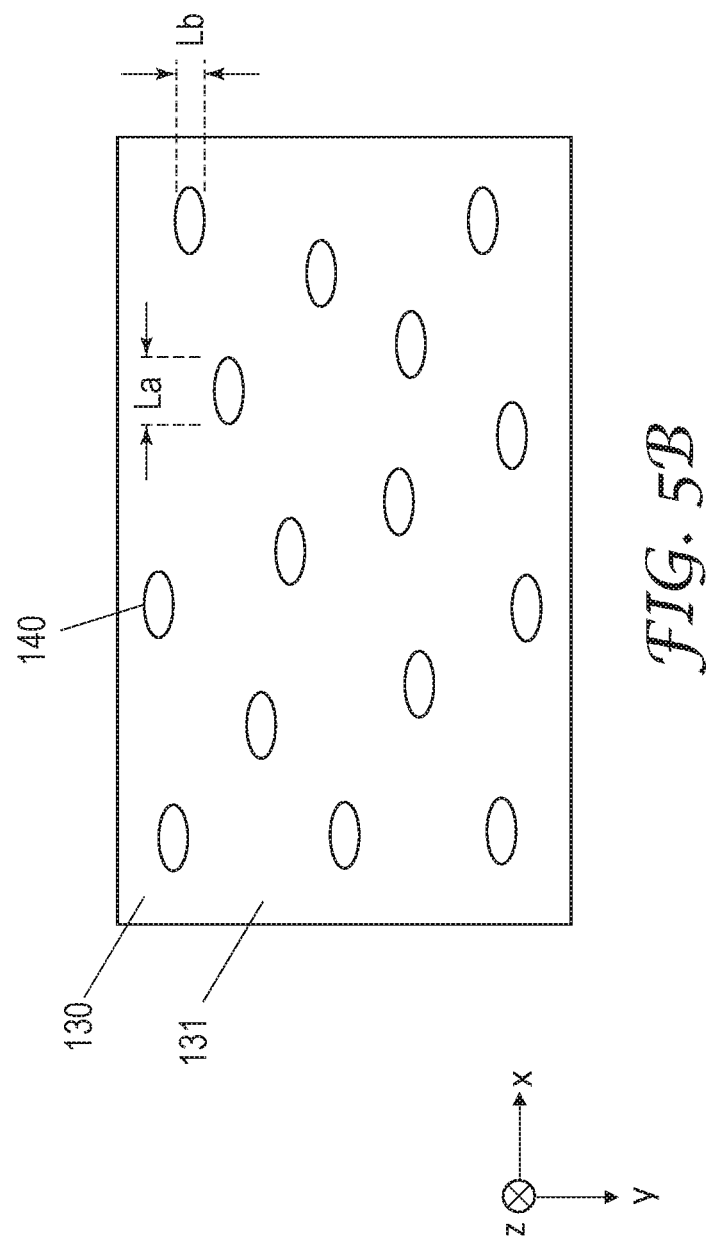
FIG. 5B is a schematic plan view of an illustrative structured major surface.

FIG. 5A is a schematic cross-sectional view of an optically diffusive film 300, according to some embodiments. FIG. 5B is schematic plan view of a major surface 131 of the optically diffusive film 300 according to some embodiments. The optically diffusive film 300 includes an optical substrate layer 110 with a first major surface 111 and a second major surface 112, and an optical layer 130 disposed on the second major surface 112 of the optical substrate layer 110. In some embodiments, an adhesive layer 133 may be disposed between the optical layer 130 and optical substrate layer 110. Alternatively, the optical layer 130 may be formed directly on the optical substrate layer 110 and the adhesive layer 133 may be omitted. In some embodiments, the optical layer 130 has a structured major surface 131 and an unstructured major surface 132. In some embodiments, the structured major surface 131 faces away from the optical substrate layer 110, and includes a plurality of spaced-apart elongated structures 140.

In some embodiments, the elongated structures 140 are elongated along a same first direction (e.g., the x-direction, as shown in FIG. 5A) and may be arranged at a substantially uniform density (e.g., as illustrated in FIG. 5B) across the structured major surface 131. In some embodiments, the optically diffusive film 300 further includes an optically diffusive layer 120 disposed on the first major surface 111 of the optical substrate layer 110. In some embodiments, an adhesive layer 133' is disposed between the optically diffusive layer 120 and optical substrate layer 110. Alternatively, the optically diffusive layer 120 may be formed directly on the optical substrate layer 110 and the adhesive layer 133' may be omitted.

In some embodiments, the optically diffusive layer 120 includes a plurality of nanoparticles 121 dispersed therein. In some embodiments, the nanoparticles 121 have an average size of between about 10 nm to about 300 nm. In some embodiments, nanoparticles 121 include silica (e.g., the nanoparticles 121 can be silica nanoparticles), and may provide a diffusing (scattering effect) to at least some wavelengths of light. The optically diffusive layer 120 may be as described for optically diffusive layer 30. For example, in some embodiments, the optically diffusive layer 120 includes a polymeric material (e.g., corresponding to polymeric material 36) bonding the nanoparticles of the optically diffusive layer 120 to each other to form a plurality of nanoparticle aggregates (e.g., corresponding to aggregates 35) defining a plurality of voids (e.g., corresponding to voids 34) therebetween. In some embodiments, in a plane of a cross-section of the optically diffusive layer 120 in a thickness direction of the optically diffusive layer 120: the nanoparticles 121 of the optically diffusive layer 120 have an average size between about 20 nm and about 150 nm; an average size of the nanoparticle aggregates is in a range from about 100 nm to about 10 microns; and the voids occupy from about 5% to about 50% or about 15% to about 45% of an area of the plane of the cross-section, or any range described elsewhere.

The elongated structures 140 may be disposed with an irregular, random pattern, or optionally in a regular array or pattern. In some embodiments, the elongated structures 140 are elongated (i.e., they have their longest dimension) along a first direction, such as the x-axis as shown in FIGS. 5A-5B, and are arranged along an orthogonal, second direction, such as the y-axis as shown in FIGS. 5A-5B. The assignment of the coordinate/reference system (i.e., the x, y, and z directions) depicted in FIGS. 5A-5B is an example only for discussion purposes, and other reference systems and arrangements may be used while still being consistent with the present disclosure. In some embodiments, the elongated structures 140 have an average length (e.g., La) along the first direction and an average width (e.g., Lb) along an orthogonal second direction (e.g., y-direction), where the average length is at least about 2 or at least about 2.5 times the average width. The second is orthogonal to the first direction and to the thickness direction (z-direction). In some embodiments, the elongated structures 140 have an average peak height H between about 2 microns and about 7 microns or between about 3 microns and about 6.5 microns. The elongated structures 140 can be formed using a microreplication process (a process used to produce microstructures, such as cast and cure processes which are known in the art), for example.

In some embodiments, an optical construction includes a reflective polarizer 100, 100', or 200 disposed on an optically diffusive film 300. The optical construction can be used in a display system as described further elsewhere.

Figure 6A:
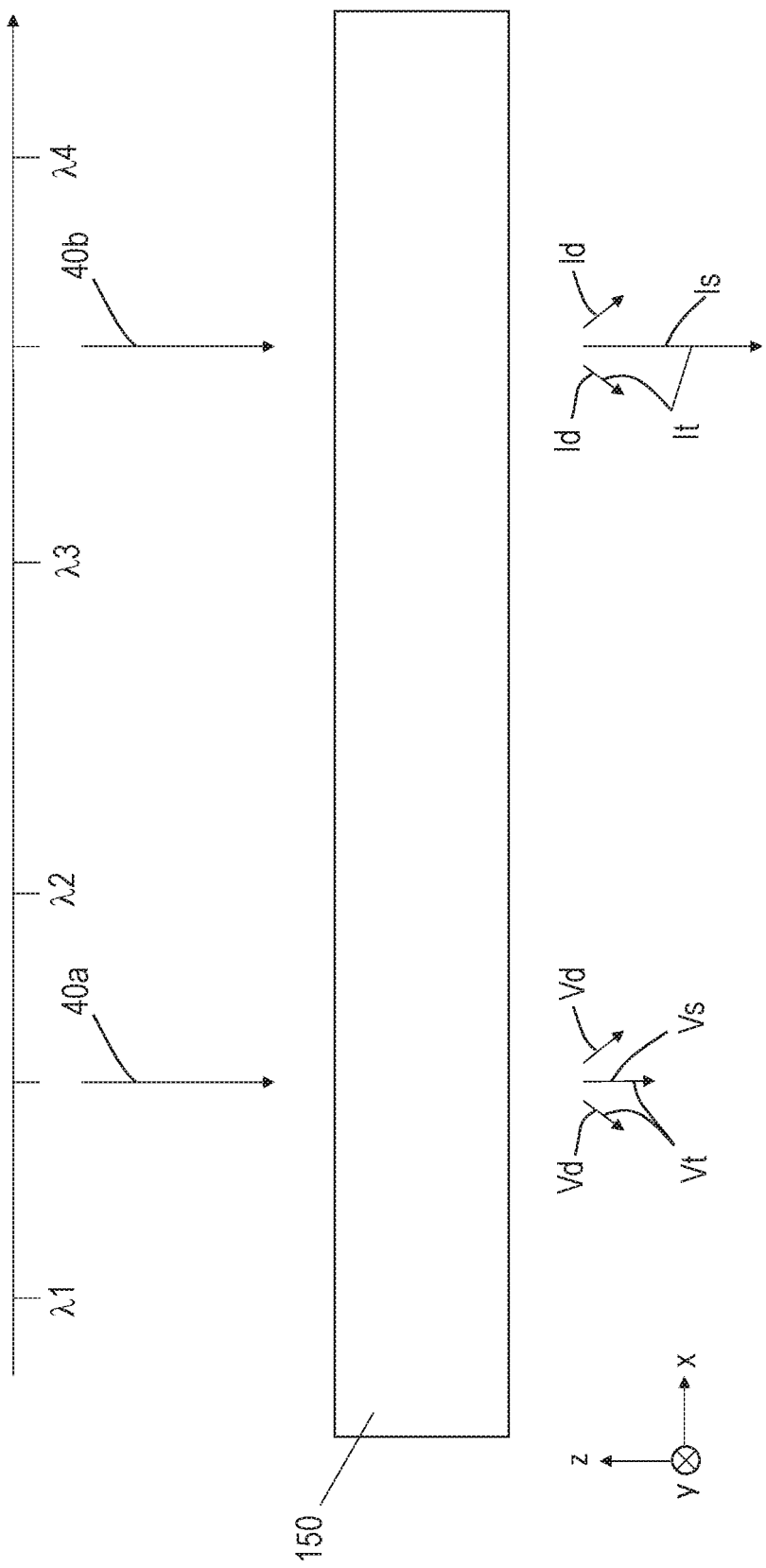
FIGS. 6A-6B are schematic cross-sectional views of layers or films illustrating substantially normally incident light and diffusely and specularly transmitted light.
Figure 6B:
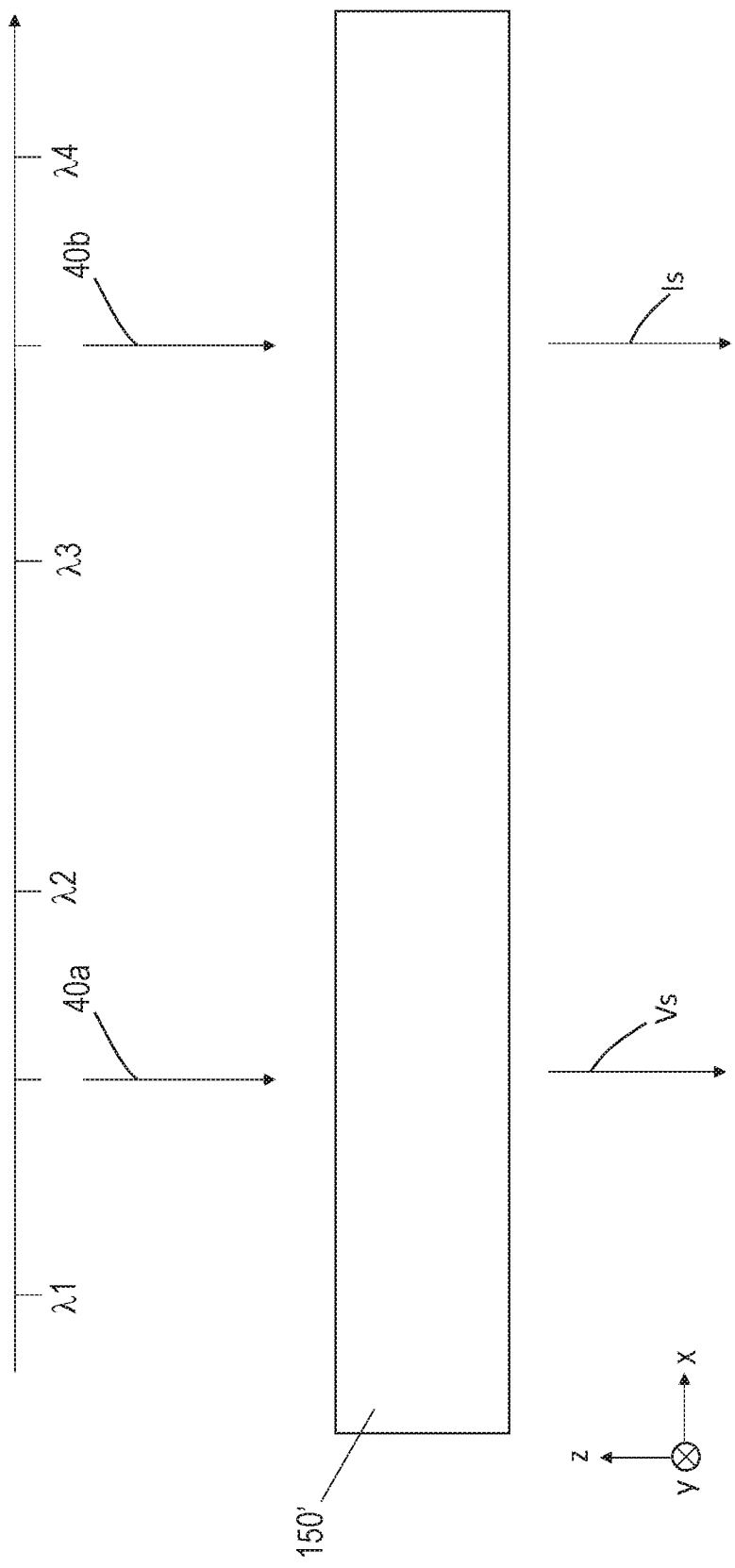

FIG. 6A-6B are schematic cross-sectional views of layer or film 150 and layer or film 150', respectively, illustrating light 40a and 40b substantially normally incident on the layer or film. The layer or film 150 may correspond to any of the optically diffusive layers or optically diffusive films or reflective polarizers or optical constructions, for example, described herein. The layer or film 150' can correspond to any of the substrate layers or optical layers, for example, described herein. The light 40a has a wavelength in a range of λ1 to λ2 and the light 40b has a wavelength in a range of λ3 to λ4. In some embodiments, the range of λ1 to λ2 is a visible range and the range of λ3 to λ4 is an infrared range. For example, in some embodiments, λ1 is about 450 nm, λ2 is about 650 nm, λ3 is about 930 nm, and λ4 is about 970 nm. For the light 40a in the wavelength range λ1 to λ2, the layer or film 150 has an average specular transmittance Vs, an average diffuse transmittance Vd and an average total transmittance Vt (Vt=Vs+Vd). For the light 40b in the wavelength range λ3 to λ4, the layer or film 150 has an average specular transmittance Is, an average diffuse transmittance Id and an average total transmittance It (It=Is+Id). A high diffuse transmittance (e.g., high Vd) corresponds to a high optical haze.

In some embodiments, for substantially normally incident light (40, 40a, 40b) and a visible wavelength range from about 450 nm to about 650 nm and an infrared wavelength range from about 930 nm to about 970 nm, an optically diffusive layer (e.g., 30 or 120 or 150) has an average specular transmittance Vs in the visible wavelength range and an average specular transmittance Is in the infrared wavelength range, where Is/Vs≥2.5. In some embodiments, Is/Vs≥3. In some embodiments, the optically diffusive layer has an average total transmittance It in the infrared wavelength range, where Is/It≥0.6 or Is/It≥0.7. In some embodiments, the optically diffusive layer has an average total transmittance Vt in the visible wavelength range, where It/Vt>1 or It/Vt>2, or It/Vt>3.

In some embodiments, for a substantially normally incident light (40, 40a, 40b) and for each of mutually orthogonal first and second polarization states (171, 172), the optical substrate layer (e.g., 110 or 150') has an average specular transmittance (Vs, Is) of greater than about 70% in each of the visible and infrared wavelength ranges. In some embodiments, the optical substrate layer (e.g., 110 or 150') is or includes a polyester film (e.g., a polyethylene terephthalate [PET] film).

In some embodiments, a display system includes the reflective polarizer and further includes a structured mirror. The structured mirror can include optical bumps on an optical mirror. The optical bumps can be formed by printing or by microreplication (e.g., casting and curing), for example.

Figure 7A:
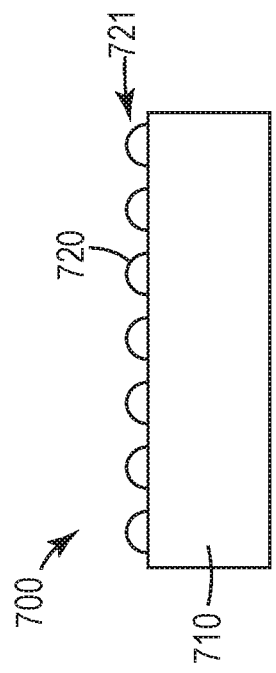
FIGS. 7A-7B are schematic cross-sectional views of illustrative structured mirrors.
Figure 7B:
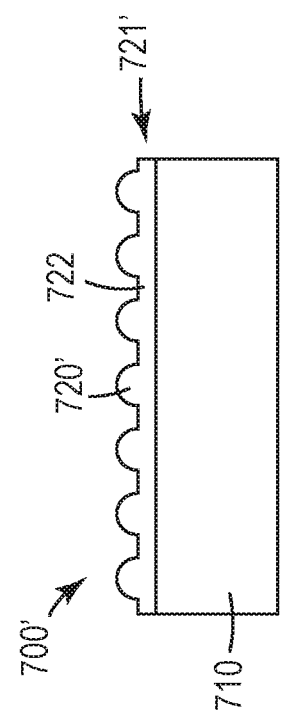

FIGS. 7A and 7B provide alternate embodiments of a structured mirror 700 with spaced-apart optical bumps according to the present description. FIG. 7A shows a structured mirror 700 which includes an optical mirror 710 and discontinuous layer 721 including an array of discrete, spaced apart optical bumps 720. In the embodiment of FIG. 7A, the optical bumps 720 are spaced in an array, which may be a regular (e.g., rectangular, square, or hexagonal) or irregular (e.g., random or pseudorandom) array, and disposed directly on the surface of optical mirror 710. In some embodiments, optical bumps 720 are rounded bumps which cover some percentage of the surface area of optical mirror 710, and which may contribute to anti-wet-out performance (as well as the reduction of other unwanted optical effects, such as Newton's rings) while remaining substantially transparent to at least some wavelengths of near infrared light. In some embodiments, the area coverage of the surface of optical mirror 710 may be between about 10% and about 40%.

FIG. 7B shows an alternate embodiment of a structured mirror 700', which includes an optical mirror 710 and continuous layer 721' featuring optical bumps 720' separated by substantially planar land portions 722. The embodiment of FIG. 7B differs from the embodiment of FIG. 7A primarily in that continuous layer 721' and optical bumps 720' are formed as a single component which is disposed on optical mirror 710, rather than (as in FIG. 7A) having optical bumps 720 disposed directly on optical mirror 710. As with the embodiment of FIG. 7A, the embodiment of FIG. 7B may, in some embodiments, have an area coverage of optical bumps 720' on optical mirror 710 (including land portions 722 of continuous layer 721') between about 10% and about 40%.

Suitable material for the optical bumps 720, 720' includes OP1028 Premium Gloss HS Overprint Varnish, OP2018 Imprintable Matte UV Varnish, and 9308 UV Flexo Ink (all manufactured by Nazdar Ink Technologies, Shawnee, KS), for example.

In some embodiments, for a substantially normally incident light, the optical mirror 710 has an average optical reflectance of greater than about 30% (or in any range describe elsewhere herein) in the visible wavelength range for at least a first polarization state, and a specular transmittance of greater than about 20% (or in any range describe elsewhere herein) for at least one wavelength in the infrared wavelength range for each of the first polarization state and an orthogonal second polarization state. In some embodiments, the optical bumps 720, 720' has an average optical transmittance of greater than about 50%, or greater than about 60%, or greater than about 70% for each of the visible and infrared wavelength ranges for each of the first and second polarization states.

Related optical bumps are described in U.S. provisional co-pending application 63/021,773 titled OPTICAL FILM WITH DISCONTINUOUS COATING and filed on May 8, 2020, and hereby incorporated herein by reference to the extent that it does not contradict the present description.

Optical mirror 710 can include a plurality of alternating first and second polymeric layers 11 and 12 (see, e.g., FIGS. 1-2 where 100, 100' can alternatively represent optical mirrors), where each first and second polymeric layer is less than about 500 nm thick, or less than about 350 nm thick, or less than about 300 nm thick. The optical mirror can include a single packet or multiple packets separated by thicker middle layers as described further elsewhere herein. In some embodiments, the optical mirror 710 includes alternating first and second dielectric layers, where at least one of the first and second layers is an inorganic layer. For example, the optical mirror 710 can be a dielectric reflector. In some embodiments, the optical mirror 710 is or includes a metal layer.

Figure 8:
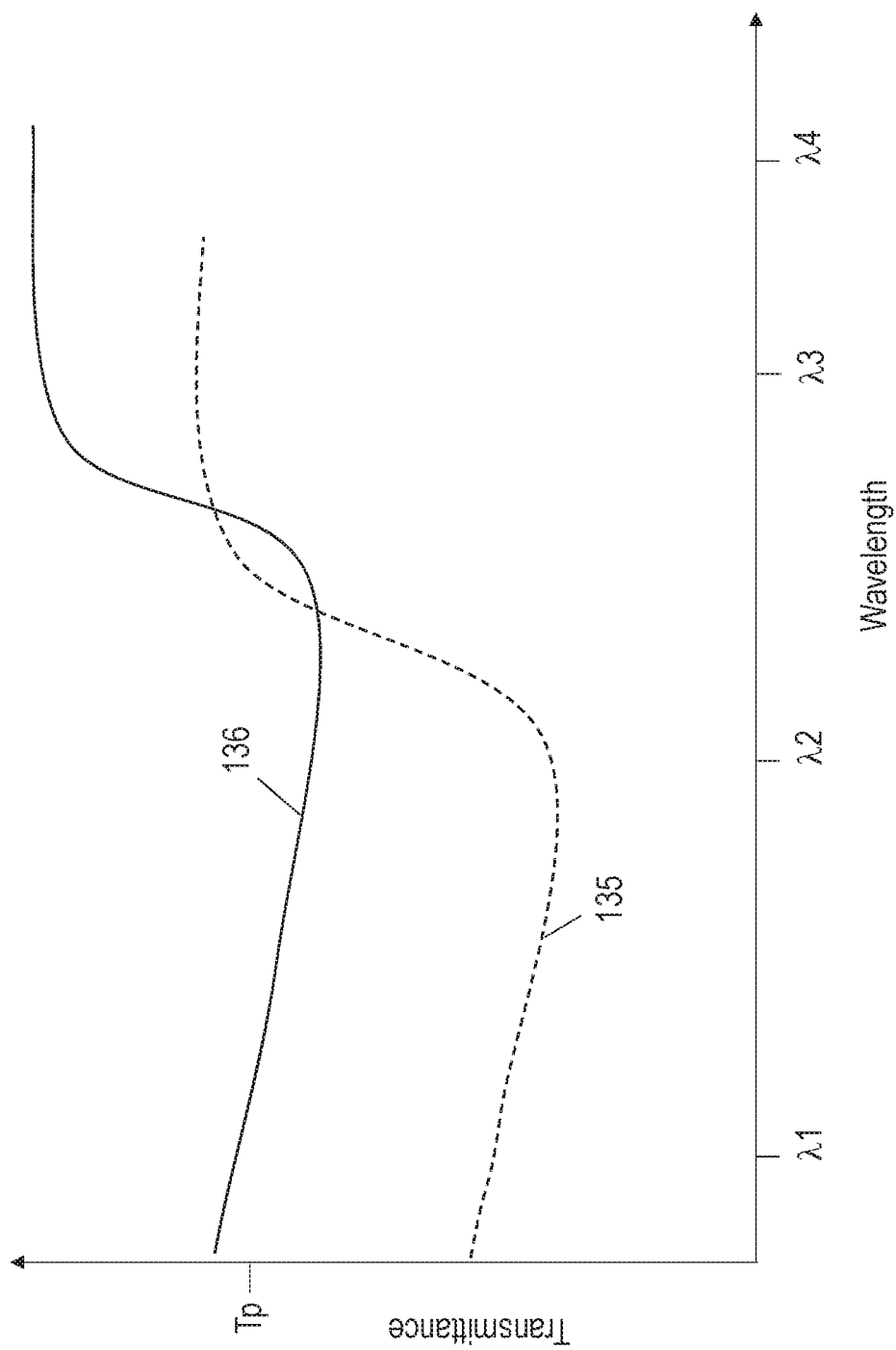
FIGS. 8-10 are schematic plots of transmission versus wavelength.
Figure 9:
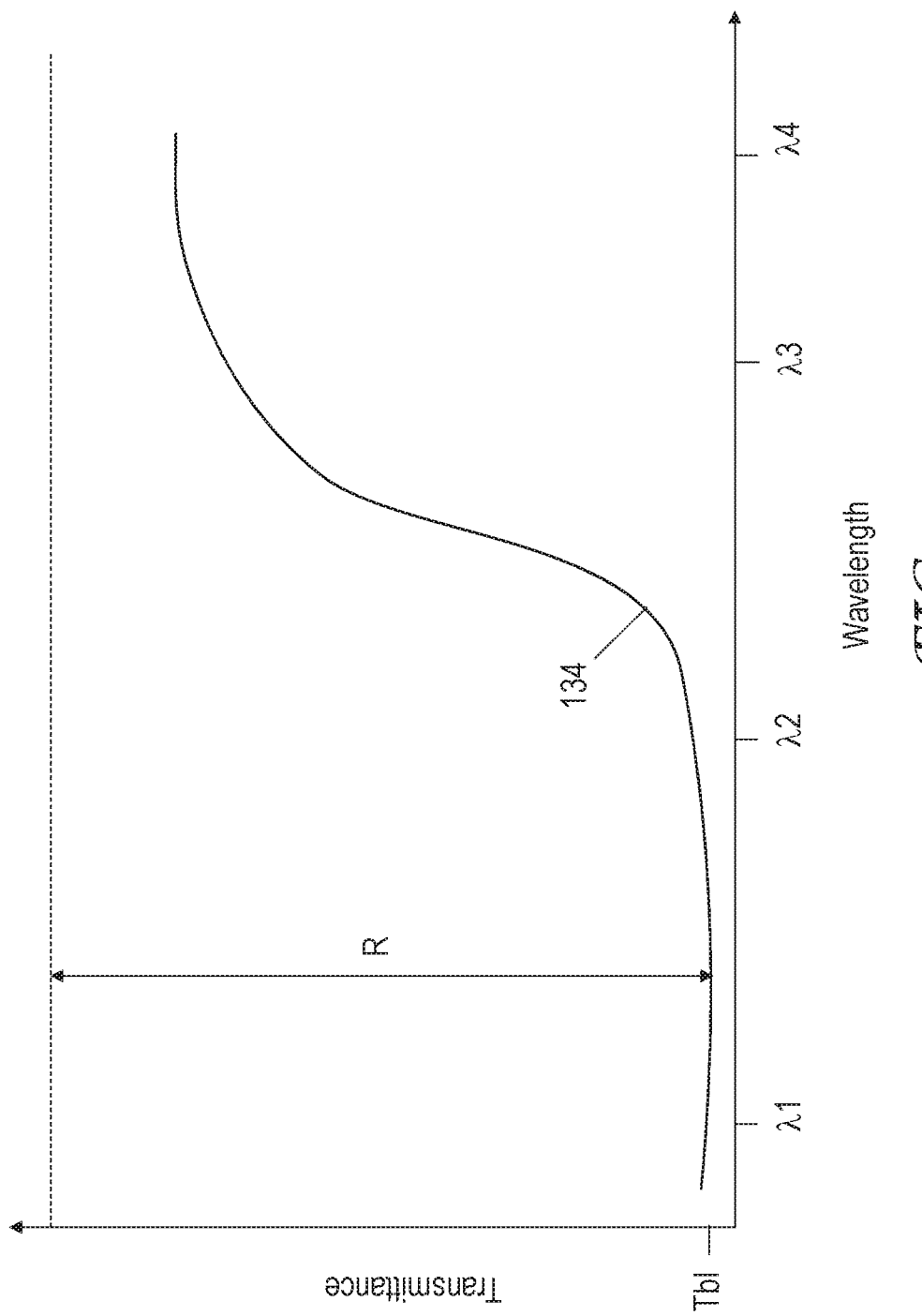

FIGS. 8-9 are schematic plots of transmittance versus wavelength for a reflective polarizer, or for an optical construction including a reflective polarizer, or for another optical element, for substantially normally incident light 40 for a first polarization state (transmittance 136 in FIG. 8) and for an orthogonal second polarization state (transmittance 134 in FIG. 9), respectively, according to some embodiments. In some embodiments, for substantially normally incident light 40 and a predetermined wavelength range (e.g., λ1 to λ2 and/or a range extending at least from about 450 nm to about 650 nm), the reflective polarizer 100, 100' or 200 has an average optical transmittance Tp of at least about 40% for a first polarization state 171 and an average optical reflectance R of at least about 70% for an orthogonal second polarization state 172. In some embodiments, the average optical transmittance Tp is at least about 50% or at least about 55% or at least about 60%. In some embodiments, the average optical reflectance R is at least about 80% or at least about 85% or at least about 90%. The transmittance 135 versus wavelength for light 170 incident at an incident angle θ is also schematically illustrated in FIG. 8.

In some embodiments, for the first polarization state and a predetermined wavelength range (e.g., a visible range of about 450 nm to about 650 nm, an infrared range of about 930 nm to about 970 nm, or a range of about 400 nm to about 800 nm), the reflective polarizer or optical construction has a greater average optical transmittance for light incident at a smaller incident angle (e.g., transmittance 136) and a smaller average optical transmittance for light incident at a greater incident angle (e.g., transmittance 135). The smaller incident angle can be in a range of zero degrees to about 20 degrees, or can be approximately zero degrees, for example. The greater incident angle can be in a range of about 30 degrees to about 50 degrees, or can be about 45 degrees, for example. In some embodiments, for the predetermined wavelength range, the reflective polarizer or optical construction has a greater average optical transmittance for substantially normally incident light and a smaller average optical transmittance for light incident at an angle of incidence of about 45 degrees for a first (pass) polarization state for any plane of incidence. In some embodiments, a difference between the greater average optical transmittance and the smaller average optical transmittance is at least 10%, or at least 20%, or at least 30%.

In some embodiments, the transmission for substantially normally incident light in the second polarization state is higher for a smaller wavelength in the predetermined wavelength range and lower for a greater second wavelength in the predetermined wavelength range. Such a sloped block state transmittance can provide reduced color shift with viewing angle, for example.

The average transmittance (resp., reflectance) is the mean of the transmittance (resp., reflectance) over the predetermined wavelength range. For a reflective polarizer or optical construction where absorption is negligible, the reflectance R is approximately 100% minus the transmittance. The transmittance 136 is a pass state transmittance for the reflective polarizer or optical construction and the transmittance 134 is a block state transmittance for the reflective polarizer or optical construction. Alternatively, the transmittance 134 can represent the total transmittance or the specular transmittance, for example, of an optical mirror for any polarization state or for unpolarized light. Transmittance and reflectance can be understood to be the total transmittance and total reflectance, respectively, except where indicated otherwise. The average transmittance Tp in the first (pass) polarization state and the average transmittance Tbl in the second (block) polarization state (or in either polarization state for an optical mirror) for substantially normally incident light 40 in the wavelength range from λ1 to λ2 is indicated in FIGS. 8-9. The indicated value of R is approximately the average optical reflectance for substantially normally incident light 40 in the wavelength range from λ1 to λ2.

In some embodiments, λ1 may be about 400 nm or about 450 nm and λ2 may be about 650 nm, about 700 nm, or about 800 nm, for example. In some embodiments λ3 may be about 930 nm or about 950 nm and λ4 may be about 1100 nm or about 970 nm for example.

In some embodiments, the transmittance 134 represents the transmittance of an optical mirror (e.g., optical mirror 710). In some embodiments, for a substantially normally incident light 40, the optical mirror has an average optical reflectance R of greater than about 30% in a visible wavelength range from about 450 nm to about 650 nm for at least a first polarization state (e.g., one or both of polarization states 171, 172). In some embodiments, the average optical reflectance R is greater than about 50%, or greater than about 60%, or greater than about 70%, or greater than about 80% in the visible wavelength range for each of the first and second polarization states. In some embodiments, the transmittance 134 represents the specular transmittance of an optical mirror. In some embodiments, for a substantially normally incident light 40, the optical mirror has a specular transmittance of greater than about 20% for at least one wavelength (e.g., λ3 or λ4 or a wavelength therebetween) in an infrared wavelength range from about 930 nm to about 970 nm for each of the first polarization state and an orthogonal second polarization state. In some embodiments, the specular transmittance is greater than about 40%, or greater than about 50%, or greater than about 60%, or greater than about 70%, or greater than about 80% for the at least one wavelength in the infrared wavelength range for each of the first and second polarization states.

Figure 10:
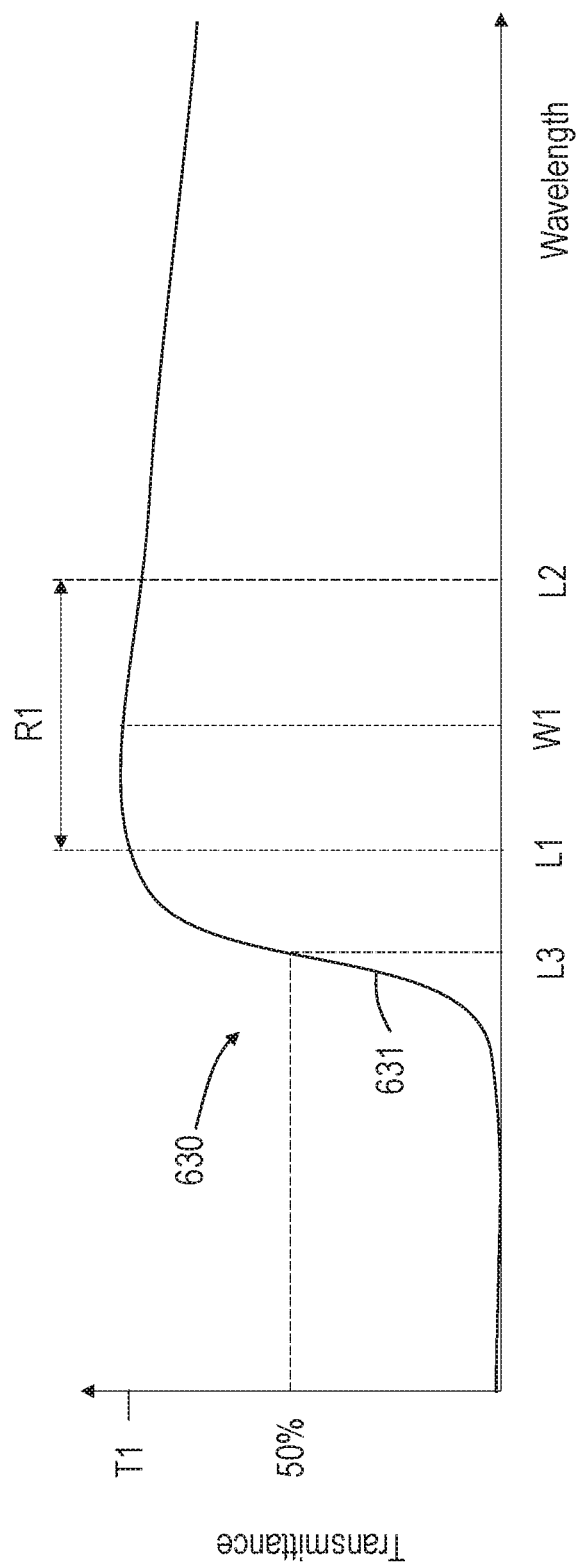

FIG. 10 is a schematic plot of an optical transmittance 630 of a reflective polarizer (e.g., reflective polarizer 100, 100' or 200) versus wavelength for a first (block) polarization state for a substantially normally incident light 40. The optical transmittance 630 has a band edge 631. In some embodiments, a best linear fit to the band edge 631 correlating the optical transmittance to the wavelength at least across a wavelength range where the optical transmittance along the band edge increases from about 10% to at least about 70% (e.g., from about 10% to about 70% or from about 10% to about 80%) has a slope of greater than about 2.5%/nm, or greater than about 3%/nm, or greater than about 3.5%/nm, or greater than about 4%/nm, or greater than about 4.5%/nm, or greater than about 5%/nm. In some embodiments, for a first wavelength range R1 extending from a smaller wavelength L1 to a greater wavelength L2, where 30 nm≤L2−L1≤50 nm, and L1 is greater than and within about 20 nm of a wavelength L3 corresponding to an optical transmittance of about 50% along the band edge 631, the optical transmittance 630 has an average T1 of greater than about 75%, or greater than about 80%, or greater than about 85%. In some embodiments, the reflective polarizer is used in a display system with a sensing light source (e.g., an infrared light source used for finger sensing) configured to emit a light having a first wavelength W1 for fingerprint detection. In some embodiments, the first wavelength W1 is in the first wavelength range R1. W1 can be about 850 nm or about 940 nm, for example. In some embodiments, the wavelength L3 is in a range of about 800 nm to about 1100 nm, or about 810 nm to about 840 nm, or about 900 nm to about 930 nm. For example, in some embodiments, the wavelength L3 is in a range of about 810 nm to about 840 nm and the wavelength W1 is about 850 nm, or the wavelength L3 is in a range of about 900 nm to about 930 nm and the wavelength W1 is about 940 nm.

In some embodiments, a high transmittance in the first wavelength range R1 is achieved, at least in part, due to a sharp band edge. For example, the band edge 631 can have a slope in the ranges described elsewhere. Optical films having sharpened band edges are known in the art and are described in U.S. Pat. No. 6,967,778 (Wheatley et al.), for example. In some embodiment, the high transmittance in the first wavelength range R1 is achieved, at least in part, due to the layer thickness profile near a side of the reflective polarizer including thicker alternating polymeric layers. In some embodiments, the reflective polarizer includes a packet of polymeric layers including a first portion with a generally increasing layer thickness profile having a first slope and a second portion adjacent the first portion and having a generally decreasing layer thickness profile having a second slope having a magnitude substantially higher than the first slope. The thicknesses of the outer layers 20 and 50 may also have an effect on the transmission spectra of the reflective polarizer in the first wavelength range R1 due to light reflected from surfaces of the outer layers which may undergo optical interference with light reflected from other layers. In some embodiments, each of the outer layers 20 and 50 has an average thickness in a range of about 1 micron to about 5 microns, for example.

Figure 11:
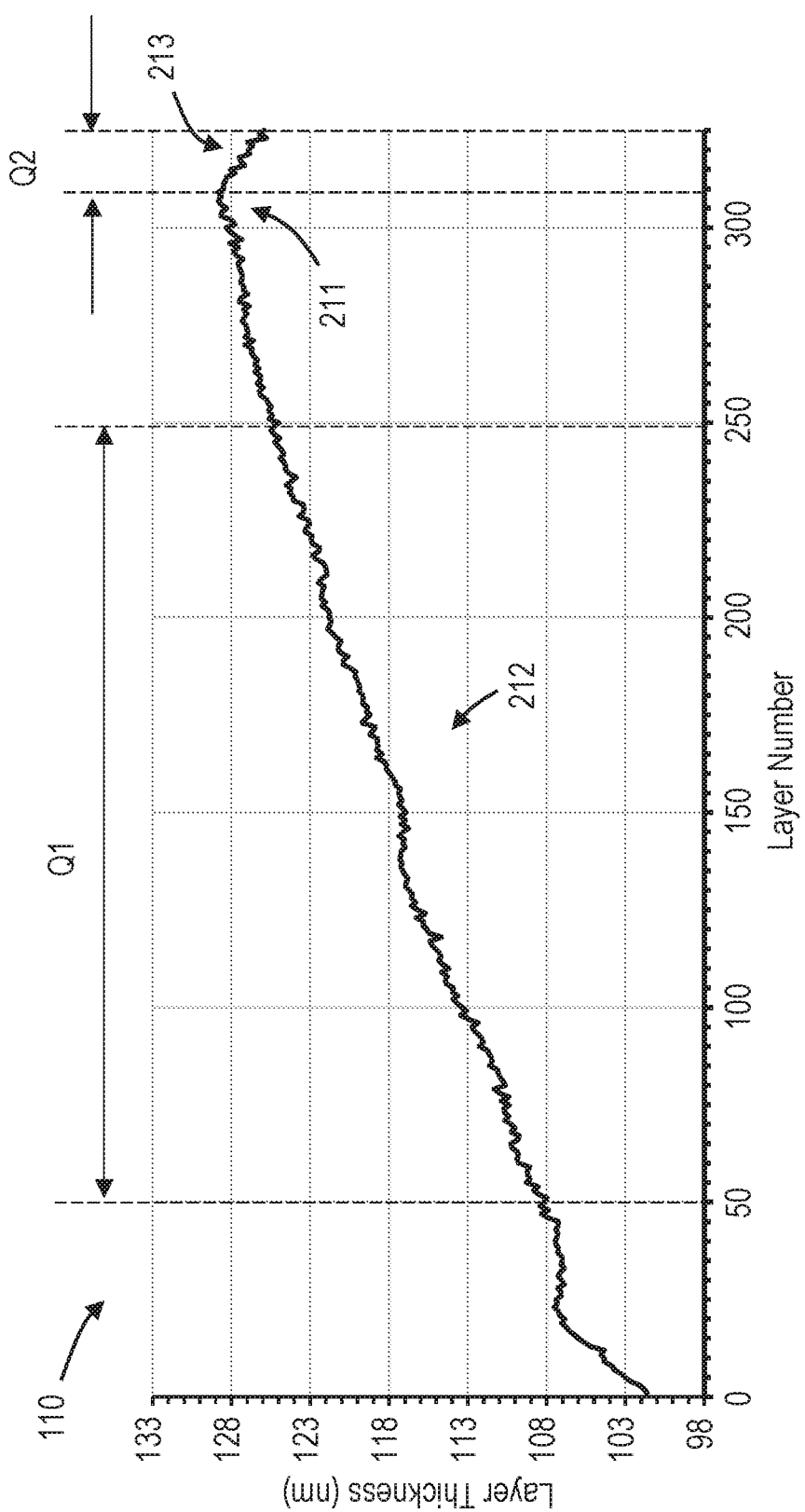
FIG. 11 is an illustrative plot of average layer thickness versus layer number for a plurality of polymeric layers according to some embodiments.
Figure 12:
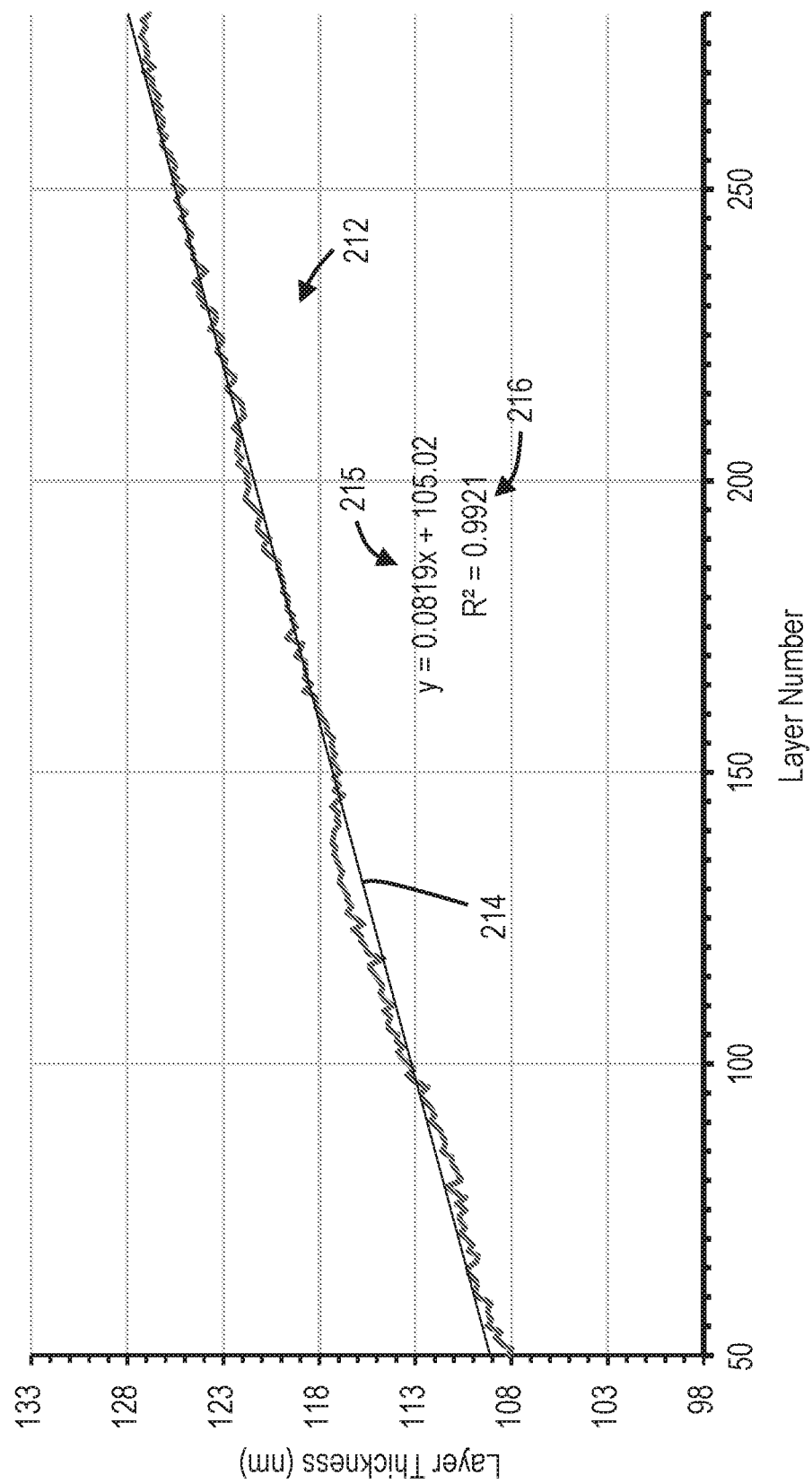
FIGS. 12-14 show portions of the plot of FIG. 11.
Figure 13:
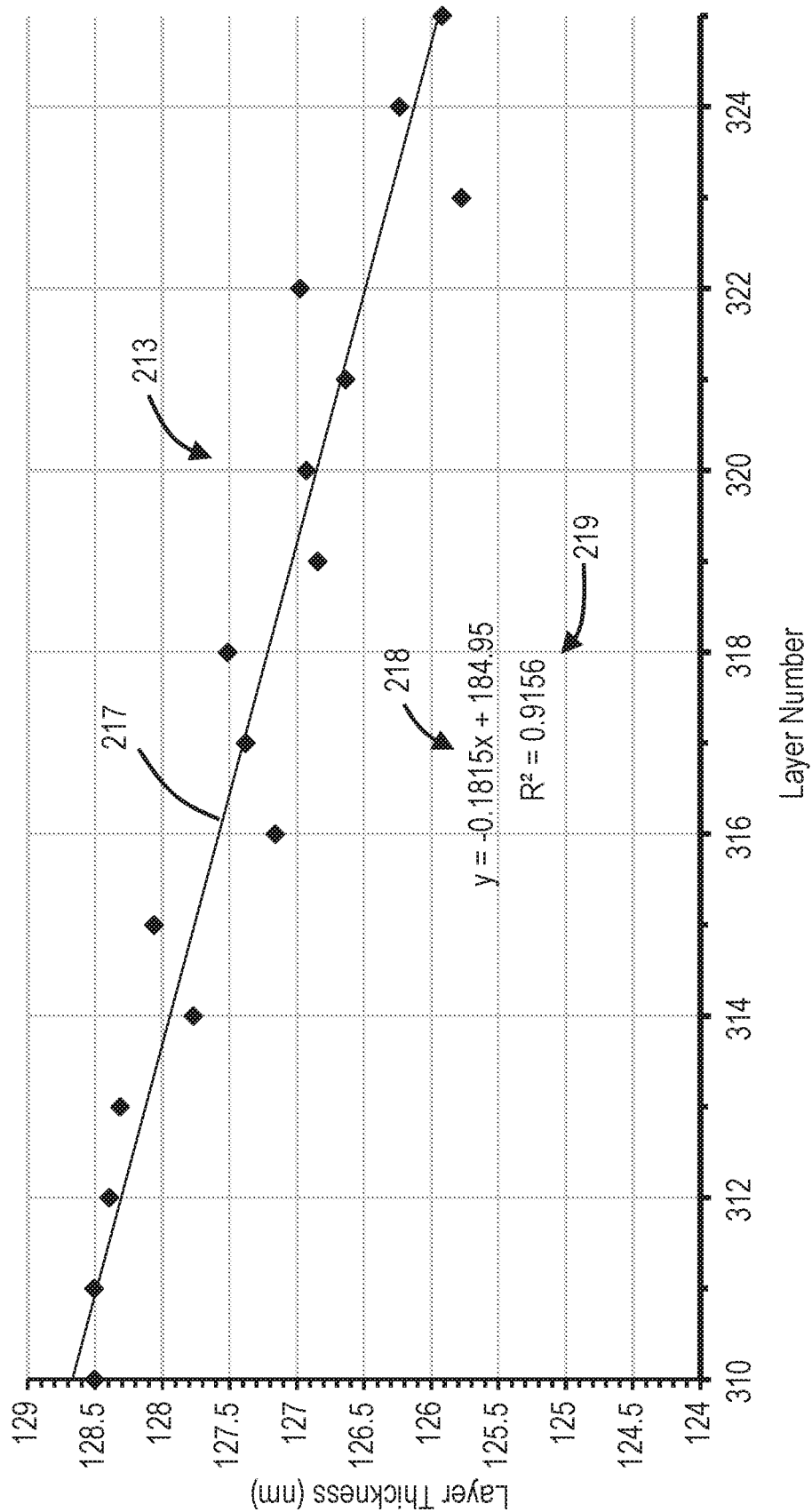
Figure 14:
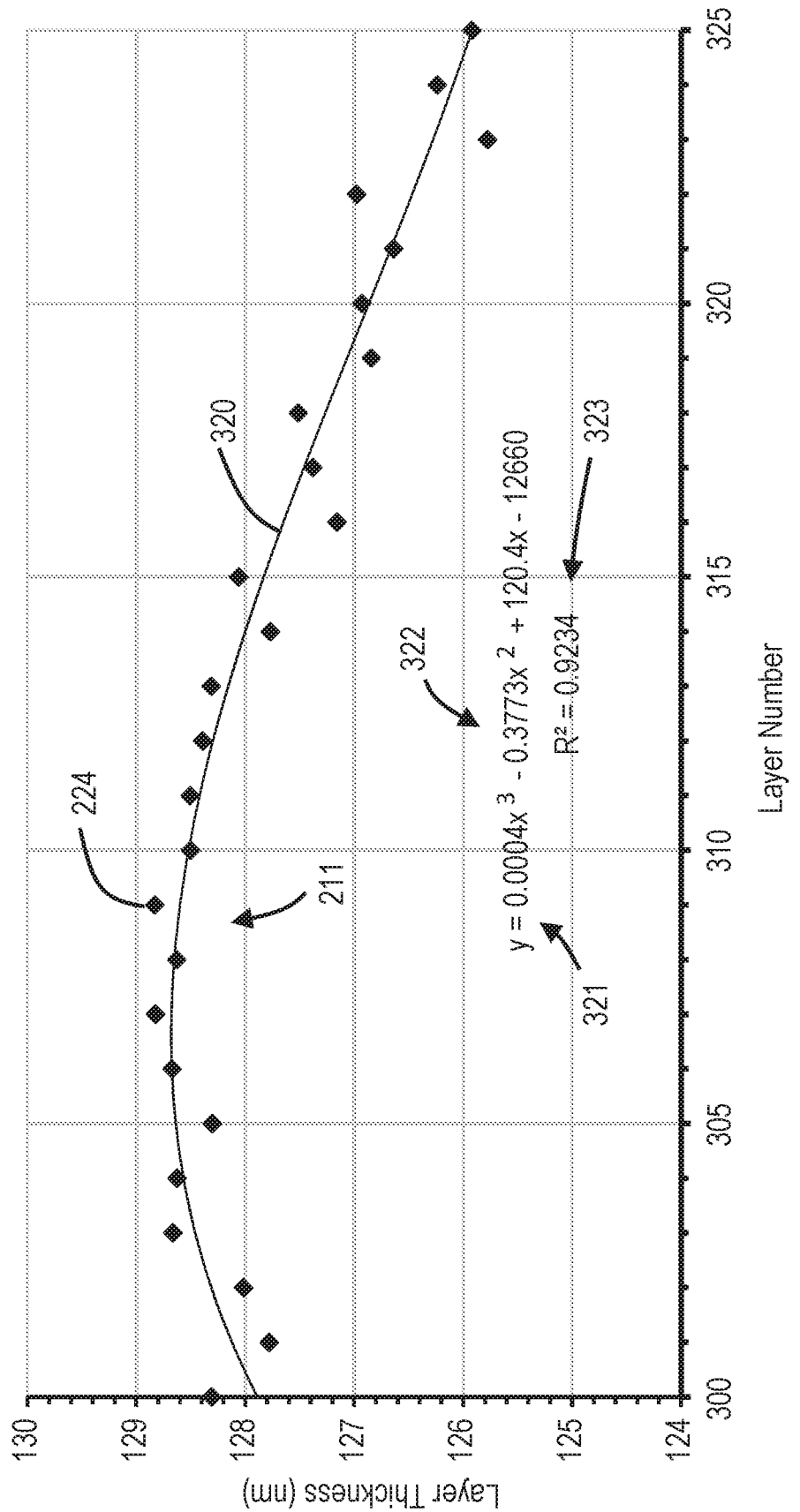

FIG. 11 is a plot 210 of average layer thickness versus layer number for a plurality of polymeric layers 10, 11, according to some embodiments. The thickness profile can be for a plurality of polymeric layers 10, 11 in an entire reflective polarizer or in a packet (e.g., 141 or 142) of a reflective polarizer. FIGS. 12-14 show portions of the plot of FIG. 11.

The layer thicknesses profiles can be selected through suitable feedblock design and processing. For example, the axial rod heater power levels in the multilayer feedblock described in U.S. Pat. No. 6,783,349 (Neavin et al.) can be used to control the layer thickness profile.

The average layer thicknesses can be measured using an Atomic Force Microscope (AFM). To reduce the error of the measurement, the average thickness of a layer can be determined as a moving average. The layers can be numbered from the thinnest layer to the thickest layer and the moving average can average over 20 layers including 10 layers with lower layer numbers, the specified layer, and 9 layers with higher layer numbers. Near the ends of the profile, fewer layers are used in the moving average since fewer layers before or after the specified layer are available. For example, for a film or packet with 325 layers, the average thickness of layer 1 will be the average thickness of layers 1 to 10, the average thickness of layer 2 will be the average thickness of layers 1 to 11, the average thickness of layer 101 will be the average thickness of layers 91 to 110, the average thickness of layer 325 will be the average thickness of layers 315 to 325, and the average thickness of layer 324 will be the average thickness of layers 314 to 325.

In some embodiments, a plot 210 of an average layer thickness t versus a layer number of the plurality of polymeric layers 11, 12 includes a knee region 211 separating a left region 212 including at least Q1 sequentially arranged polymeric layers where the polymeric layers have lower layer numbers, from a right region 213 including at least Q2 sequentially arranged polymeric layers where the polymeric layers have higher layer numbers, such that a linear fit 214 (see, e.g., FIG. 12) to the at least Q1 sequentially arranged polymeric layers in the left region 212 has a positive linear slope 215 having a magnitude of greater than about 0.04 nm per layer number with an r-squared value 216 of greater than about 0.8, and a linear fit 217 (see, e.g., FIG. 13) to the at least Q2 sequentially arranged polymeric layers in the right region 213 has a negative linear slope 218 having a sufficiently large magnitude so that for a substantially normally incident light 40 having a first polarization state, an optical transmittance 230 (see, e.g., FIG. 15) of the reflective polarizer versus wavelength has a band edge 231 between about 800 nm and about 1100 nm, where a best linear fit 232 (see, e.g., FIG. 16) to the band edge 231 correlating the optical transmittance to the wavelength at least across a wavelength range where the optical transmittance along the band edge increases from about 10% to at least about 80% has a slope 233 of greater than about 3%/nm, or greater than about 4%/nm, or in any of the ranges described elsewhere herein for a band edge slope. In some embodiments, the best linear fit 232 has an r-squared value 238 of greater than about 0.8, or greater than about 0.85, or greater than about 0.9, or greater than about 0.93, or greater than about 0.95. Q1 is an integer greater than about 100. In some embodiments, Q1 is at least 100, or at least 150, or at least 180. Q2 is an integer greater than about 10. In some embodiments, Q2 is at least 10, or at least 12, or at least 14.

In some embodiments, the linear fit 217 to the at least Q2 sequentially arranged polymeric layers in the right region 213 has a negative linear slope 218 having a magnitude of greater than about 0.1 nm per layer number with an r-squared value 219 of greater than about 0.8. In some embodiments, the negative linear slope 218 of the linear fit 217 has a magnitude of greater than about 0.12 nm per layer number, or greater than about 0.14 nm per layer number, or greater than about 0.16 nm per layer number. In some such embodiments or in other embodiments, the r-squared value 119 of the linear fit 217 is greater than about 0.8, or greater than about 0.85, or greater than about 0.9.

In some embodiments, the positive linear slope 215 of the linear fit 214 has a magnitude of greater than about 0.05 nm per layer number, or greater than about 0.06 per layer number, or greater than about 0.07 per layer number. In some such embodiments or in other embodiments, the r-squared value 216 of the linear fit 214 is greater than about 0.8, or greater than about 0.85, or greater than about 0.9, or greater than about 0.95.

In some embodiments, a plot 210 of an average layer thickness t versus a layer number of the plurality of polymeric layers includes a knee region 211 separating a left region 212 including at least 100 sequentially arranged polymeric layers where the polymeric layers have lower layer numbers, from a right region 213 including at least 10 sequentially arranged polymeric layers where the polymeric layers have higher layer numbers, such that a third order polynomial fit 320 (see, e.g., FIG. 14) to at least 15 sequentially arranged polymeric layers including the knee region 211 has a positive third order coefficient 321 and a negative second order coefficient 322 with an r-squared value 323 of greater than about 0.8. In some embodiments, the r-squared value 323 is greater than about 0.85, or greater than about 0.9. In some embodiments, the left region 212 includes at least 150 or at least 180 sequentially arranged polymeric layers. In some embodiments, the right region 213 includes at least 12 or at least 14 sequentially arranged polymeric layers.

In some embodiments, a reflective polarizer 100, 100', or 200 includes a plurality of polymeric layers 10, 11 sequentially numbered from 1 to N, where N is an integer greater than about 150 and each of the polymeric layers 10, 11 has an average thickness less than about 350 nm or less than about 300 nm. The reflective polarizer 100, 100' may include other layers (e.g., 146, 147, 143a, 143b) in addition to the polymeric layers 10, 11 that are thicker than about 500 nm, for example. In some embodiments, a plot 210 of an average layer thickness t versus a layer number of the plurality of polymeric layers 10,11 includes a knee region 211 including a thickest polymeric layer 224 in the plurality of polymeric layers 10, 11, such that the reflective polarizer 100, 100', 200 or the plurality of polymeric layers 10, 11 has reflectance and transmittance properties described elsewhere herein.

Figure 15:
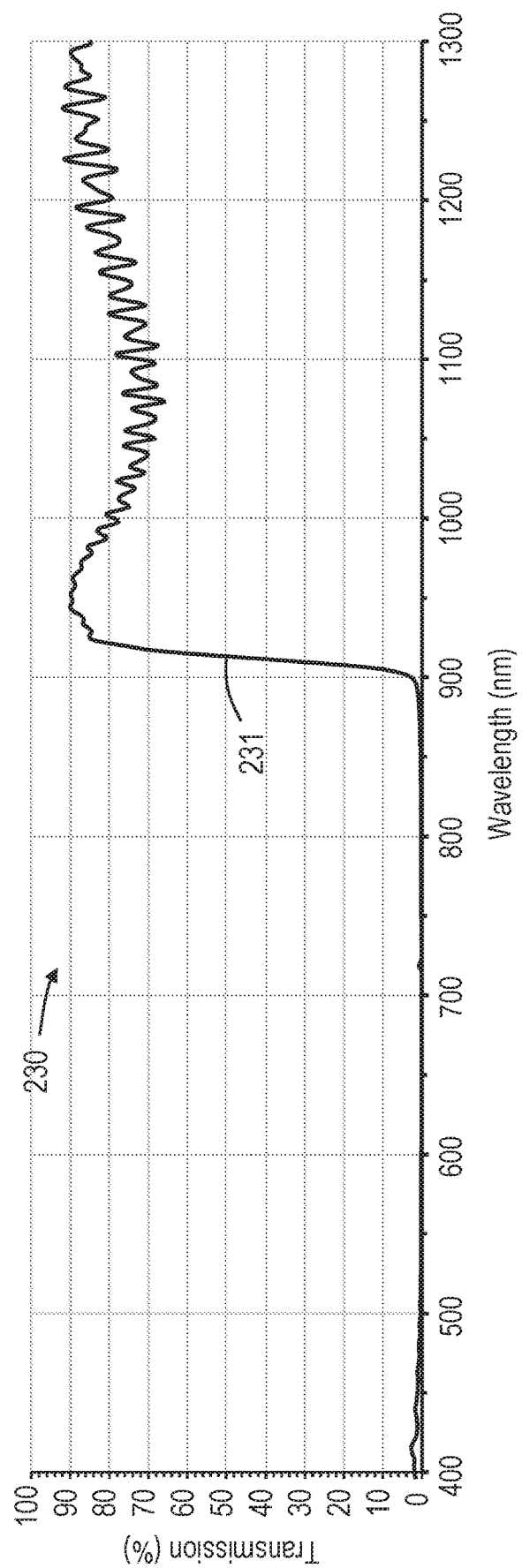
FIG. 15 is a plot of the optical transmittance of an illustrative reflective polarizer versus wavelength.
Figure 16:
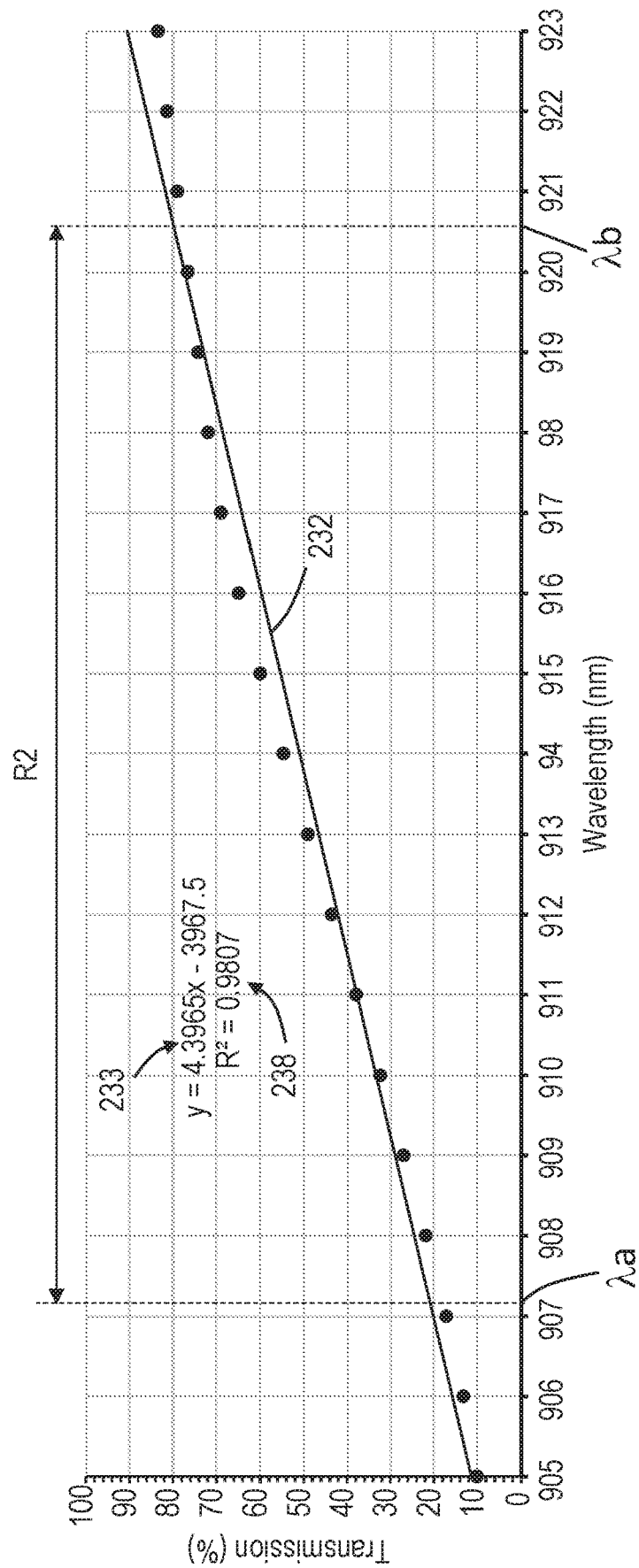
FIGS. 16-18 are portions of the plot of FIG. 15.
Figure 17:
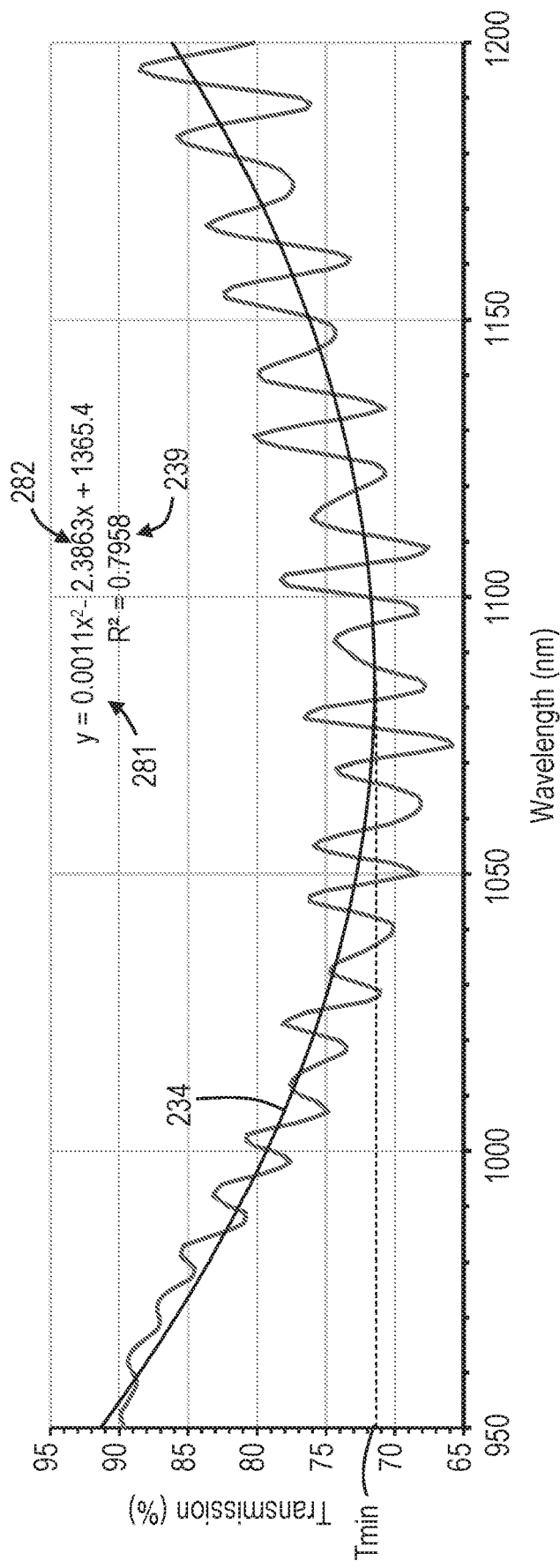
Figure 18:
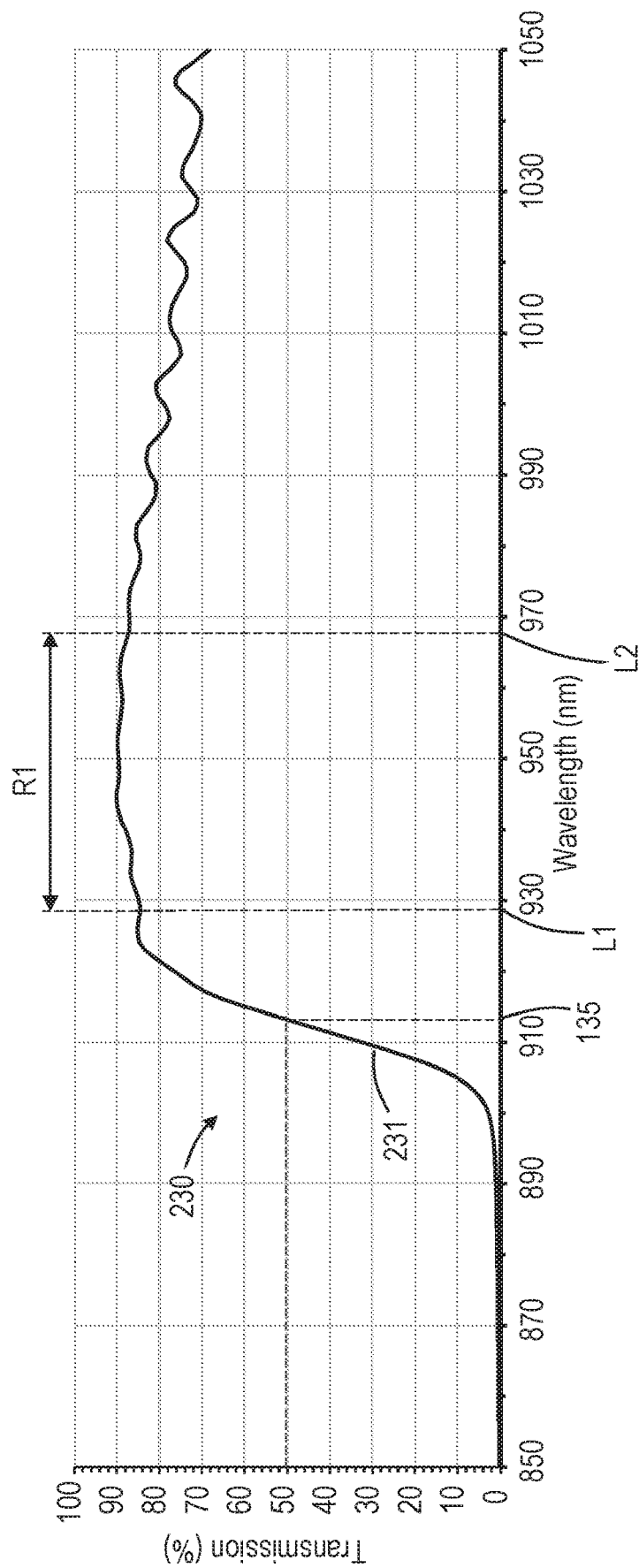

FIG. 15 is a plot of the optical transmittance 230 of a reflective polarizer 100, 100' versus wavelength. FIGS. 16-18 are portions of the plot of FIG. 15. The optical transmittance 230 can be for substantially normally incident light 40 having a first polarization state 171. In some embodiments, the reflective polarizer substantially transmits light having a second polarization state 172 orthogonal to the first polarization state 171. The layer thickness profile of FIG. 11 for a packet reflecting longer wavelengths in a reflective polarizer also including a packet reflecting shorter wavelengths can produce the optical transmittance 230. Suitable materials for the alternating polymeric layers include polyethylene naphthalate (PEN) as the high index material and a polymer blend of various copolyesters and polycarbonates as the low index material, for example.

In some embodiments, the plurality of polymeric layers 10, 11 or the reflective polarizer 100, 100': reflects greater than about 80% of the incident light 40 having a first polarization state 171 in a first wavelength range extending from about 400 nm to about 800 nm; transmits greater than about 40%, or greater than about 50%, of the incident light having a second polarization state 172, orthogonal to the first polarization state 171, in the first wavelength range; transmits greater than about 60% of the incident light in a second wavelength range extending from about 950 nm to about 1300 nm for each of the first and second polarization states 171 and 172; and an optical transmittance 230 of the optical film versus wavelength for the first polarization state 171 includes a band edge 231 between about 800 nm and about 1100 nm. In some embodiments, the band edge 231 is between about 850 nm and about 950 nm. In some embodiments, a best linear fit 232 (see, e.g., FIG. 16) to the band edge 231 correlating the optical transmittance to the wavelength at least across a wavelength range where the optical transmittance along the band edge increases from about 10% to at least about 70% has a slope 233 of greater than about 3%/nm or in any of the ranges described elsewhere for a band edge slope (e.g., greater than about 4%/nm).

In some embodiments, a wavelength range R2 (see, e.g., FIG. 16) from a first wavelength Aa where the best linear fit 232 is 20% to a second wavelength 7b where the best linear fit 232 is 80% is less than about 30 nm wide, or less than about 20 nm wide, or less than about 15 nm wide. In some embodiments, a wavelength range from a smallest wavelength greater than about 600 nm where the transmittance is at least about 20% to a smallest wavelength greater than about 600 nm where the transmittance is at least about 80% is less than about 30 nm wide, or less than about 20 nm wide, or less than about 15 nm wide.

In some embodiments, a second order polynomial fit 234 (see, e.g., FIG. 17) to the optical transmittance 230 across a wavelength range at least 200 nm wide between the band edge and about 2000 nm or about 1600 nm or about 1300 nm has an r-squared value 239 of greater than about 0.6 and a minimum optical transmittance Tmin of less than about 80%. The wavelength range between the band edge and about 2000 nm or about 1600 nm or about 1300 nm can be the range from about 950 nm to about 1200 nm, for example. In some embodiments, the r-squared value 239 is greater than about 0.7 or greater than about 0.75. In some embodiments, the second order polynomial fit 234 has a positive second order coefficient 281 and a negative first order coefficient 282. In some embodiments, the second order polynomial fit 234 has a minimum optical transmittance Tmin of less than about 75%. In some embodiments, the minimum optical transmittance Tmin is greater than about 60% or greater than about 65%.

The linear fits described herein can be linear least squares fits as is known in the art. Polynomial fits can similarly be least squares fits. Such fits minimize the sum of squares of residuals where a residual is the difference between data and the fitted curve (line or polynomial). The least squares analysis allows the r-squared value, sometimes referred to as the coefficient of determination, to be determined.

In some embodiments, for the substantially normally incident light and a first wavelength range R2 extending from a smaller wavelength L1 to a greater wavelength L2 (see, e.g., FIG. 18), where 30 nm≤L2−L1≤50 nm and L1 is greater than and within about 20 nm of a wavelength L3 corresponding to an optical transmittance of about 50% along the band edge, the optical transmittance 230 has an average of greater than about 75%, or greater than about 80%, or greater than about 85%. In some embodiments, 35 nm≤L2−L1≤45 nm. In some embodiments, L1 is within about 18 nm or within about 16 nm of the wavelength L3.

Related reflective polarizers are described in U.S. provisional co-pending application 63/021,743 titled OPTICAL FILM and filed on May 8, 2020, and hereby incorporated herein by reference to the extent that it does not contradict the present description.

Figure 19:
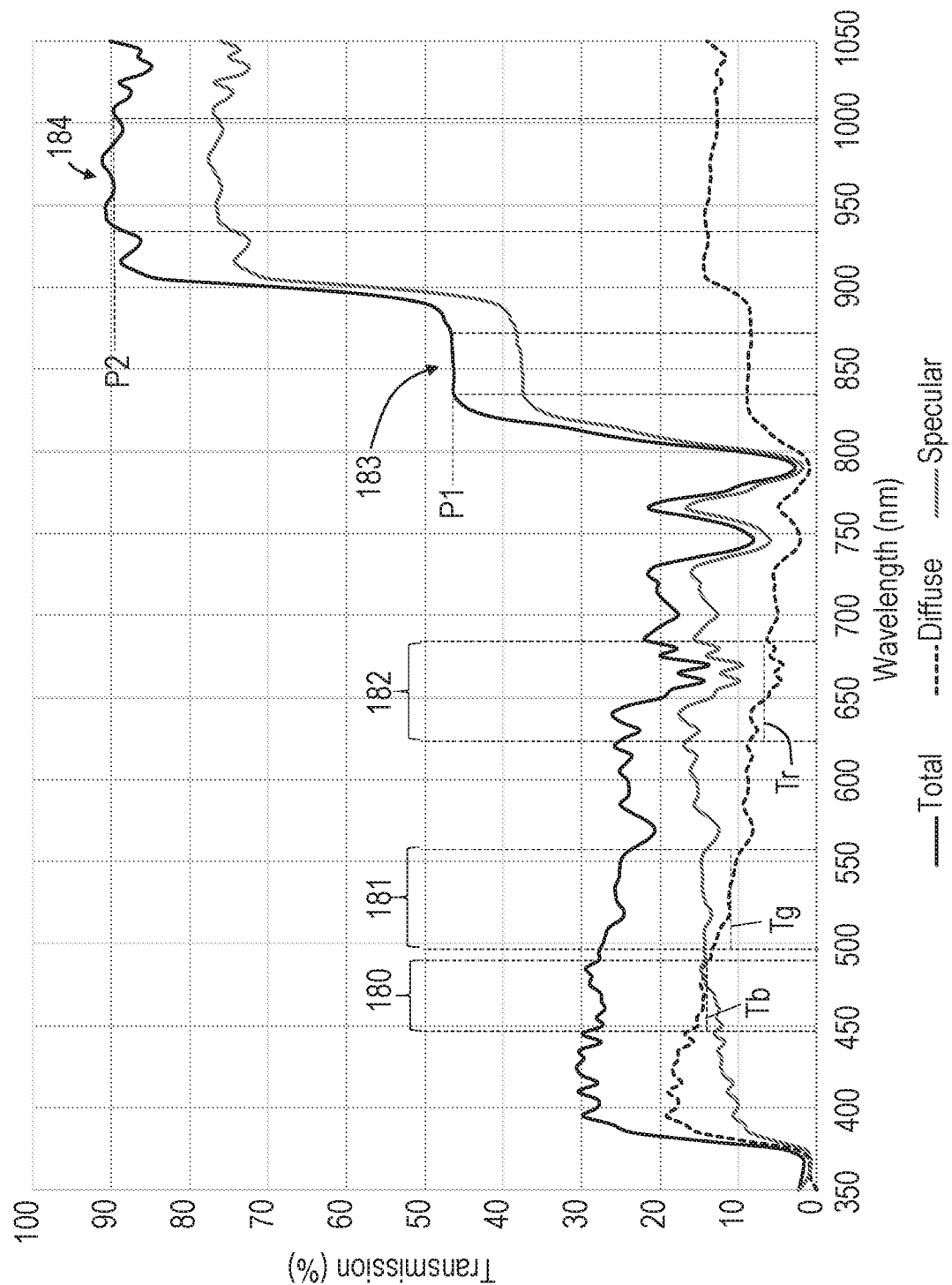
FIG. 19 is a plot of transmission versus wavelength for substantially normally incident unpolarized light for an illustrative reflective polarizer.
Figure 20:
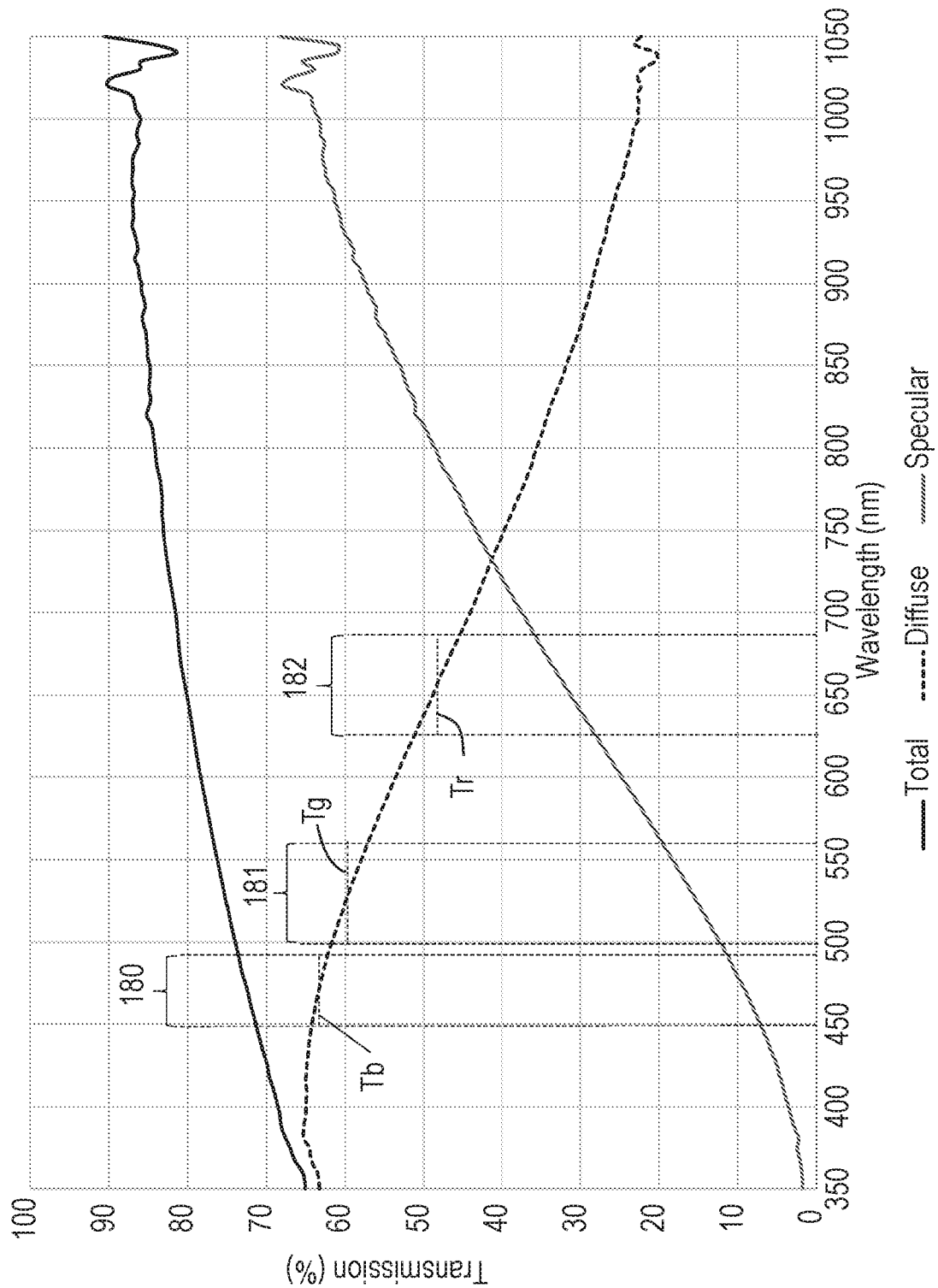
FIG. 20 is a plot of transmission versus wavelength for substantially normally incident light for an illustrative optically diffusive film.

FIGS. 19-20 are plots of transmittance versus wavelength for substantially normally incident unpolarized light 40 for optical elements including an optically diffusive layer. FIG. 19 shows the total, diffuse and specular transmittance of a reflective polarizer (e.g., corresponding to reflective polarizer 200) and FIG. 20 shows the total, diffuse and specular transmittance of an optically diffusive film (e.g., corresponding to optically diffusive film 300).

FIG. 19 is a plot of transmission versus wavelength for substantially normally incident light 40 for an exemplary reflective polarizer where the incident light 40 is unpolarized and where the reflective polarizer included an optically diffusive layer (e.g., corresponding to optically diffusive layer 30). In some embodiments, for substantially normally incident light 40, the reflective polarizer has average diffuse optical transmittances Tb, Tg and Tr in respective wavelength ranges of about 450 to about 485 nm (wavelength range 180), about 500 to about 565 nm (wavelength range 181), and about 625 to about 680 nm (wavelength range 182), where Tb>Tg>Tr. In some embodiments, Tb, Tg and Tr are less than about 30%, or less than about 25%, or less than about 20%. In some embodiments, Tb−Tg and Tg−Tr are each greater than about 1% or greater than about 2%. In some embodiments, Tb-Tr is greater than about 3% or greater than about 5%. In some embodiments, for the substantially normally incident light 40, a total transmittance of the reflective polarizer has spaced apart first and second plateau regions 183 and 184 between about 800 and 1100 nm where each plateau region is at least 20 nm wide. The first and second plateau regions 183 and 184 have respective average total transmittances P1 and P2. In some embodiments, P2 is greater than P1 by greater than about 20%, or greater than 25%, or greater than 30%, or greater than 35%. In some embodiments, the first plateau region 183 is disposed between 800 nm and the second plateau region 184. In some embodiments, the first plateau region 183 includes 860 nm and the second plateau region 184 includes 950 nm.

For the reflective polarizer of FIG. 19, a substantially normally incident unpolarized light 40a, and a visible wavelength range of about 450 nm to about 650 nm, the reflective polarizer has an average total transmittance Vt of about 25.27%, an average diffuse transmittance Vd of about 10.75%, and an average specular transmittance Vs of about 14.52%. For the reflective polarizer of FIG. 19, a substantially normally incident unpolarized light 40b, and an infrared wavelength range of about 930 nm to about 970 nm, the reflective polarizer has an average total transmittance It of about 86.66%, an average diffuse transmittance Id of about 13.89%, and an average specular transmittance Is of about 75.77%.

FIG. 20 is a plot of transmission versus wavelength for substantially normally incident light 40 for an exemplary optically diffusive film (e.g., corresponding to optically diffusive film 300), according to some embodiments. In some embodiments, for substantially normally incident light 40, which may be unpolarized light, the optically diffusive film has average diffuse optical transmittances Tb, Tg and Tr in respective wavelength ranges of about 450 to about 485 nm (wavelength range 180), about 500 to about 565 nm (wavelength range 181), and about 625 to about 680 nm (wavelength range 182), where Tb>Tg>Tr. In some embodiments, Tb is less than about 80% or less than about 70%. In some embodiments, Tb is greater than about 40% or greater than about 50%. In some embodiments, Tr is greater than about 35% or greater than about 40%. In some embodiments, Tr is less than about 65% or less than about 60%. In some embodiments, Tb−Tg and Tg−Tr are each greater than about 1% or greater than about 2%. In some embodiments, Tb-Tr is greater than about 5% or greater than about 10%. In some embodiments, the optically diffusive film has a diffuse optical transmittance generally decreasing (e.g., monotonically decreasing or nonincreasing) over a wavelength range of about 450 nm to about 970 nm and a specular optical transmittance generally increasing (e.g., monotonically increasing or nondecreasing) over the wavelength range of about 450 nm to about 970 nm. In some such embodiments, the total optical transmittance generally increases over the wavelength range of about 450 nm to about 970 nm.

For the optically diffusive film of FIG. 20, a substantially normally incident unpolarized light 70a, and a visible wavelength range of about 450 nm to about 650 nm, the optically diffusive film has an average total transmittance Vt of about 76.06%, an average diffuse transmittance Vd of about 57.43%, and an average specular transmittance Vs of about 18.63%. For the optically diffusive film of FIG. 20, a substantially normally incident unpolarized light 40b, and an infrared wavelength range of about 930 nm to about 970 nm, the optically diffusive film has an average total transmittance It of about 86.94/6, an average diffuse transmittance Id of about 25.69%, and an average specular transmittance Is of about 61.25%.

Figure 21:
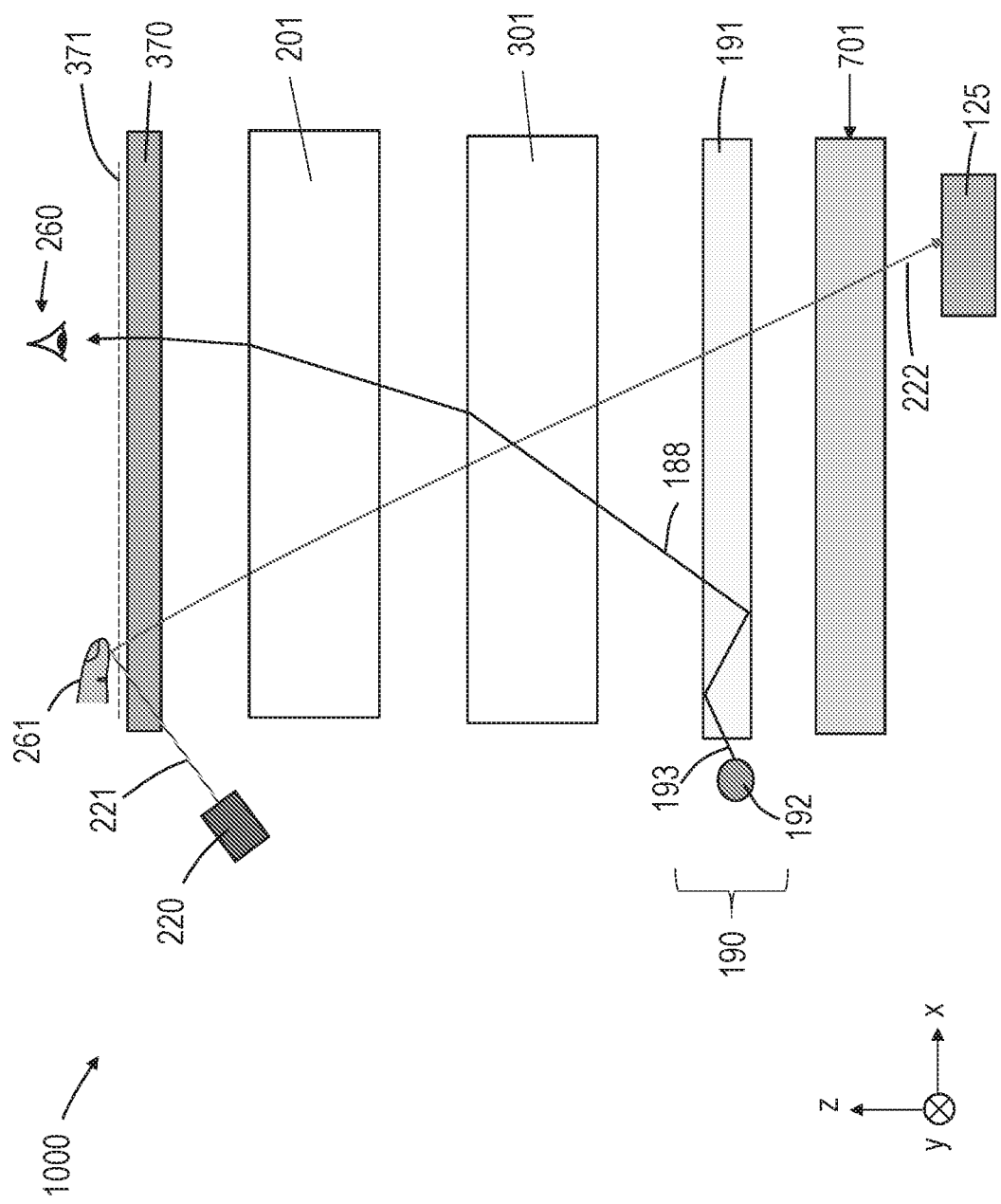
FIGS. 21-23 are schematic exploded cross-sectional views of illustrative display systems.

FIG. 21 is a schematic exploded cross-sectional view of a display system 1000 for sensing a finger 261 of a user 260 applied to the display system 1000, according to some embodiments. The display system 1000 includes a display panel 370 configured to generate an image 371 for viewing by the user 260; a lightguide 190 for providing illumination 188 to the display panel 370; a reflective polarizer 201 disposed between the display panel 370 and the lightguide 190; a sensor 125 for sensing the finger 261 of the user 260 disposed proximate the lightguide 190 opposite the reflective polarizer 201; and a sensing light source 220 configured to emit an infrared light 221 (directly or indirectly) toward the finger 261 of the user 260. In the illustrated embodiment, an optically diffusive film or layer 301 is disposed between the reflective polarizer 201 and the lightguide 190. The reflective polarizer 201 can correspond to reflective polarizer 100, 100', or 200, for example. The optically diffusive film or layer 301 can correspond to optically diffusive film 300 or optically diffusive layer 120, for example. In some embodiments, the reflective polarizer 201 includes a first optically diffusive layer disposed conformably disposed on a structured major surface of the reflective polarizer 201, and the optically diffusive film or layer 301 is or includes a second optically diffusive layer. The sensor 125 is configured to receive at least a portion of the infrared light 222 reflected by the finger 261. In the illustrated embodiment, the display system 1000 further includes a mirror 701 disposed between the lightguide 190 and the sensor 125. Mirror 701 can correspond to structured mirror 700 or 700' described elsewhere, for example.

In some embodiments, the lightguide 190 includes a lightguide plate 191 and at least one light source 192 configured to inject light 193 into the lightguide plate 191. In some embodiments, the lightguide plate 191 extends in two orthogonal directions defining a plane (e.g., x-y plane) of the lightguide plate 191, and light (e.g., illumination 188) exiting the lightguide plate 191 propagates generally in a direction making an angle in a range of about 70 degrees or about 80 degrees to about 89 degrees with the plane of the lightguide plate 191. The angle can be about 85 degrees, for example.

The sensing light source 220 can be an infrared light source having a peak emission wavelength of about 850 nm or about 940 nm, for example. The optical components (e.g., reflective polarizer 201, optically diffusive film or layer 301, lightguide plate 191, and mirror 701) disposed between the finger 261 and the sensor 125 are preferably at least partially transmissive for the peak emission wavelength.

Figure 22:
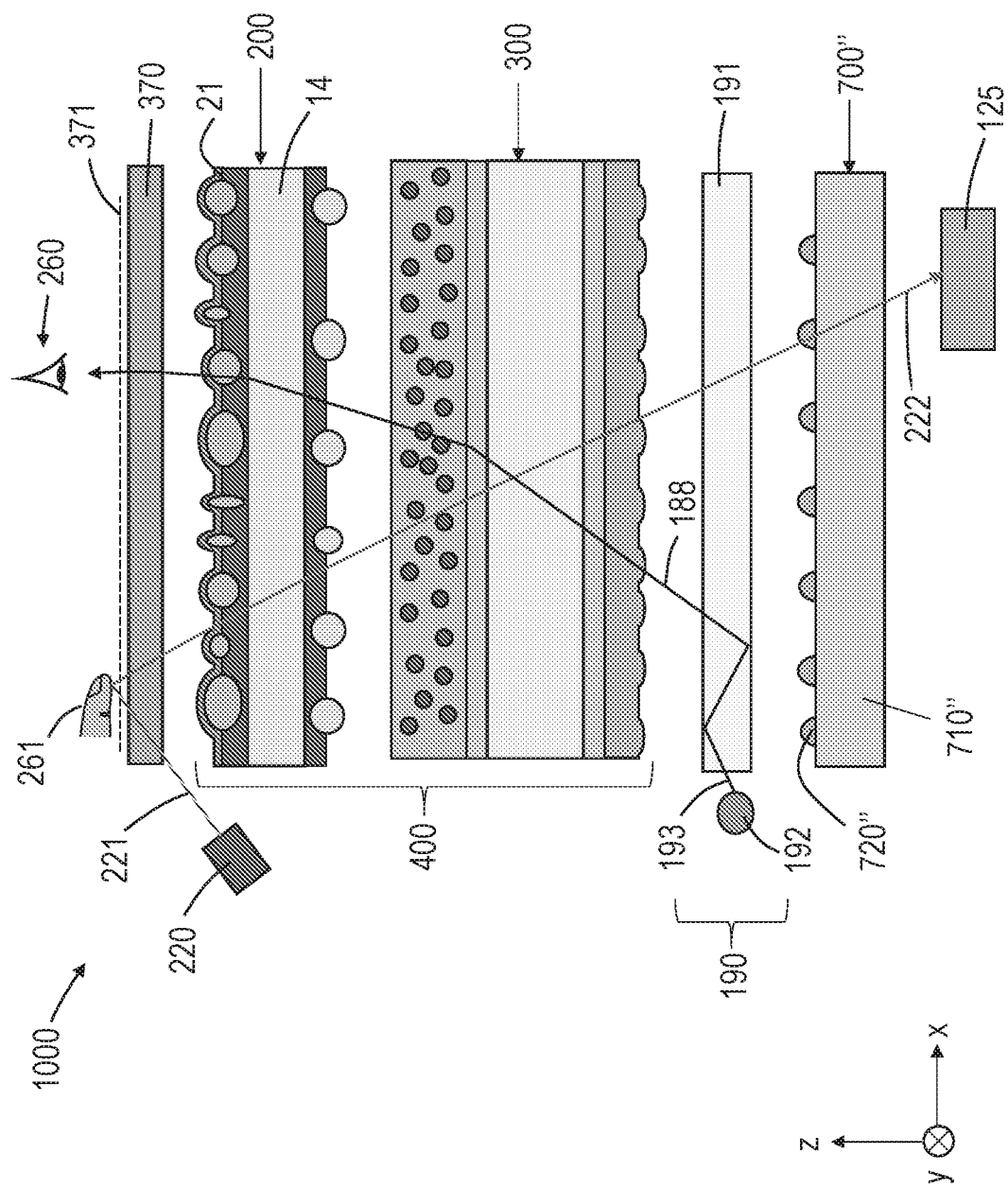
Figure 23:
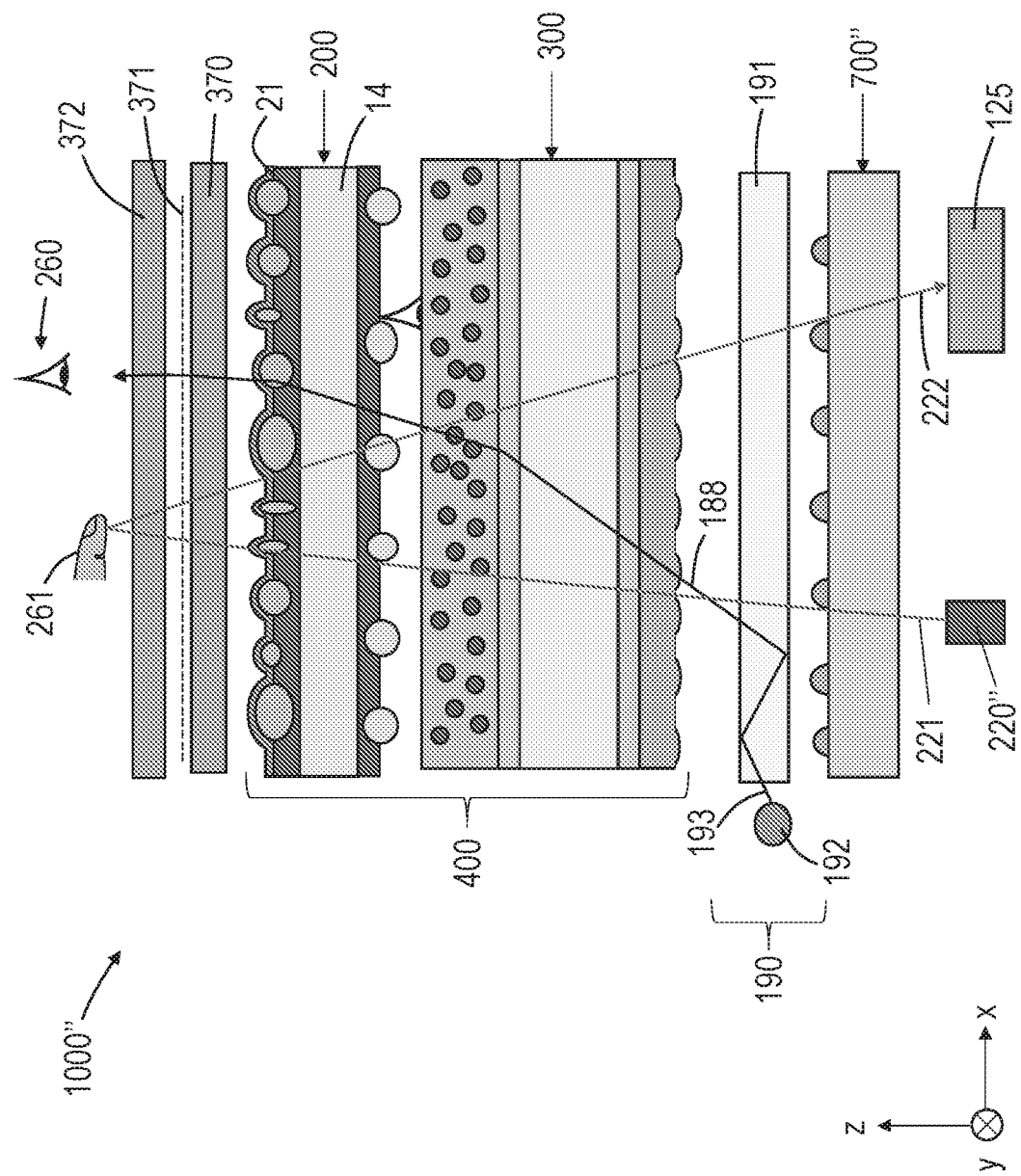

The sensing light source 220 can be disposed at any suitable location in the display system. For example, the sensing light source 220 can be disposed adjacent any the various layers of the display system. FIGS. 22-23 schematically illustrate other possible position of the sensing light source. The positions of the sensing light source shown in FIGS. 21-23 are intended to be exemplary only and not limiting in any sense.

FIG. 22 is a schematic exploded cross-sectional view of a display system 1000' for sensing a finger 261 of a user 260 applied to the display system 1000', according to some embodiments. The display system 1000' includes a display panel 370 configured to generate an image 371 for viewing by the user 260; a lightguide 190 for providing illumination 188 to the display panel 370; an optical construction 400 disposed between the display panel 370 and the lightguide 190 where the optical construction 400 includes a reflective polarizer 200 disposed on an optically diffusive film 300; a sensor 125 for sensing the finger 261 of the user 260 disposed proximate the lightguide 190 opposite the reflective polarizer 200; and a sensing light source 220' configured to emit an infrared light 221 toward the finger 261 of the user 260. The first structured major surface 21 of the reflective polarizer 200 is disposed between the display panel 370 and the plurality of polymeric layers 14. In the illustrated embodiment, display system 1000' includes a cover glass 372 disposed above the display panel 370 and configured to transmit the image 371 for viewing by the user 260. The sensing light source 220' is disposed below the cover glass 372. In the illustrated embodiment, the display system 1000' further includes a structured mirror 700" disposed between the lightguide 190 and the sensor 125. Structured mirror 700" includes an optical mirror 710" and an array of discrete spaced apart optical bumps 720" formed on the optical mirror 710" and facing the lightguide 190. Structured mirror 700" can correspond to structured mirror 700 or 700' described elsewhere, for example.

FIG. 23 is a schematic exploded cross-sectional view of a display system 1000" for sensing a finger 261 of a user 260 applied to the display system 1000", according to some embodiments. Display system 1000" generally corresponds to display system 1000' except for the placement of the sensing light source 220". The sensing light source 220" is disposed such that the structured mirror 700" is between the sensing light source 220" and the lightguide 190.

As described further elsewhere herein, in some embodiments, the reflective polarizer 200 is a collimating reflective polarizer that has a greater average optical transmittance for visible pass state light (e.g., p-polarized pass state light) incident at a smaller incident angle and a smaller average optical transmittance for the light incident at a greater incident angle. Such polarizers can provide a collimating effect by reflecting light having a greater incident angle back towards the mirror 700" so that the light is recycled. Liquid crystal displays (LCDs) often include brightness enhancing prism films (typically crossed prism films) to increase an on-axis brightness of the display. In some cases, such films can be omitted when a collimating reflective polarizer is included. In some embodiments of the display system 1000, 1000', 1000", there are no brightness enhancing prism films disposed between the display panel 370 and the mirror 701 or 700".

Related display systems are described in U.S. provisional co-pending application 63/021,739 titled OPTICAL CONSTRUCTION AND DISPLAY SYSTEM and filed on May 8, 2020, and hereby incorporated herein by reference to the extent that it does not contradict the present description.

Exemplary Reflective Polarizers

Materials Used in the Exemplary Reflective Polarizers

| Abbreviation | Description and Source |
| --- | --- |
| PEN | Polyethylene Naphthalate, obtained from 3M Corporation, Saint Paul, MN |
| PETG | A glycol modified copolyester, obtained under the trade designation PETG GN071 from Eastman Chemicals, Knoxville, TN |
| PC1804 | A polycarbonate material, obtained under the trade designation MAKROLON 1804 from Covestro Corporation, Leverkusen, Germany |
| PC2405 | A polycarbonate material, obtained under the trade designation MAKROLON 2405 from Covestro Corporation, Leverkusen, Germany |
| PCTG | A glycol modified copolyester, obtained under the trade designation VM318 PCTG from Eastman Chemicals, Knoxville, TN |
| PC:PCTG | An amorphous blend of polycarbonate and an amorphous polyester poly-cyclohexylenedimethylene terephthalate glycol, in the ratio 80:20, produced by 3M Company, St Paul MN. |
| DIW | Deionized Water, produced by 3M Corporation, Saint Paul, MN. |
| WB50 | A sulphonated polyester described, produced by 3M Corporation, St. Paul, MN. |

-continued

| Abbreviation | Description and Source |
|---|---|
| 1100D | A polyester polymer, obtained under the trade designation Eastek 1100 Polymer Dispersion from Eastman Chemical Company, Kingsport, TN. |
| TOM259 | A non-ionic surfactant, obtained under the trade designation Tomadol 25-9 from Evonik Industries, Essen, Germany. |
| MX500 | A cross-linked polymethyl methacrylate beads with an average diameter of 5 microns obtained under the trade designation MX-500 from, Soken Chemical & Engineering Co., Ltd., Tokyo, Japan. |
| MZ8HN | A cross-linked polymethyl methacrylate beads with an average diameter of 8 microns obtained under the trade designation MZ-8HN from, Soken Chemical & Engineering Co., Ltd., Tokyo, Japan. |
| A-174 | Silane obtained under the trade designation Silquest A-174 from GE Advanced Materials, Wilton Conn. |
| SR444 | Pentaerythritol triacrylate is a low volatile and fast curing monomer available from Startomer Arkema, Exton PA. |
| NALCO 2329 | Silica particles (with an average particle size of 75 nm) obtained under the trade name NALCO 2329 from Nalco Chemical Company, Naperville Ill. |
| IRGACURE 184 | Available from Ciba Specialty Chemicals Company, High Point NC. |
| IRGACURE 819 | Available from Ciba Specialty Chemicals Company, High Point NC. |

A numerical modelling study was completed using three different layer thickness profiles composed of 650 microlayers sandwiched between two thicker skin layers. The 650 microlayers alternated between a birefringent High Index Optical layer (HIO) and an isotropic Low Index Optical layer (LIO). The refractive indices used for this model at 633 nm are shown in the table below. These indices were inferred from a multilayer reflective polarizer film. That film was produced via a multilayer coextrusion process using PEN as the HIO material and a polymer blend of 15.0 weight percent PETG, 40.8 weight percent PCTG, 17.0 weight percent PC1804, and 27.2 weight percent PC2405 as the LIO material. The films were then stretched continuously in a standard tenter with a draw ratio of 6:1 in the transverse direction and constrained in the machine direction (no orientation or relaxation). The oven temperature used for the orientation was 270 degrees Fahrenheit. The indices were inferred by using a numerical model finding what indices gave the best fit between measured spectra and calculated spectra for a 650 microlayer film. The layer thicknesses were measured using an Atomic Force Microscope (Dimension ICON from Bruker Instruments, Billerica, MA).

| | $n_x$ | $n_y$ | $n_z$ |
|---|---|---|---|
| HIO | 1.8260 | 1.6355 | 1.4893 |
| LIO | 1.5699 | 1.5699 | 1.5699 |

Figure 24:
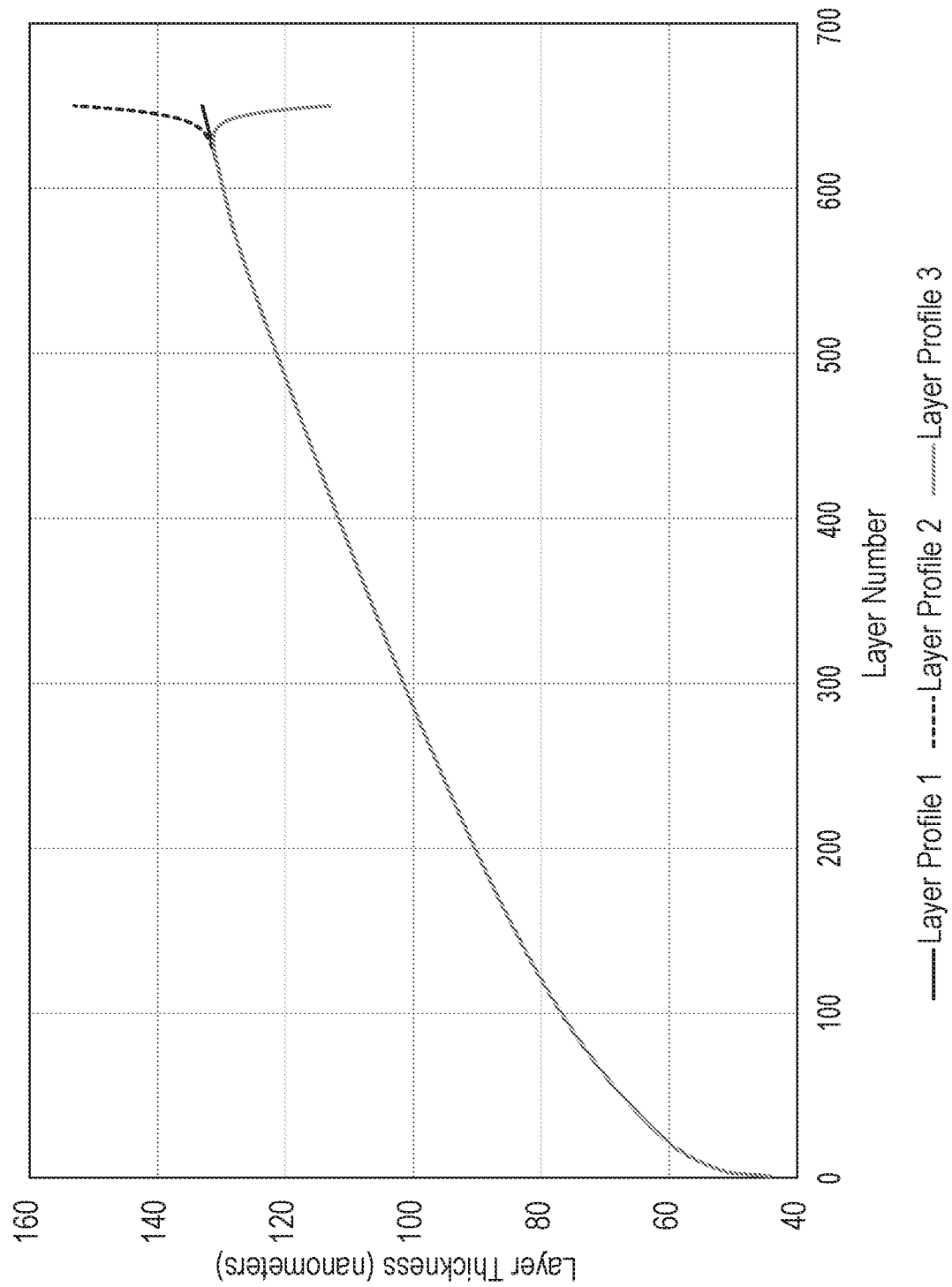
FIG. 24 is a plot of average layer thickness versus layer number for various illustrative reflective polarizers.

Three model layer thickness profiles are shown in FIG. 24 and are defined as follows:

Layer Profile 1: A proposed layer profile designed to provided reflectivity from about 400 nanometers to about 930 nanometers for the block polarization state.

Layer Profile 2: compared to Layer Profile 1 it has an apodized "up" configuration utilizing an exponential relationship, $$t = tm - Ae^{\frac{-(N-n)}{d}},$$

where A is an amplitude factor, d describes how many layers the apodized feature penetrates, tm is a layer thickness at the beginning of the apodized feature, N is the total number of layers, and n is the layer number. For Layer Profile 2, A=−20 nm and d=5.

Layer Profile 3: compared to Layer Profile 1 it has an apodized "down" configuration utilizing the same functional form as Layer Profile 2. For Layer Profile 3, A=20 nm and d=5.

To simulate the optical performance of these layer profiles with these materials a numerical optical model was employed to calculate the resulting transmission spectra for these reflective polarizers in the block state. The calculations were made for each layer profile with each skin layer composed of the LIO material being 1.5, 2.5, and 5.0 micrometers thick. The table below defines the parameters for Reflective Polarizers 1 through 9 and shows the calculated average transmission over the 930 to 980 nanometer band for each layer profile (average for all skin thicknesses) and the average bandwidth for each layer profile (average for all skin thicknesses). The bandwidths were calculated from the first wavelength the transmission reaches 20% to the wavelength where the transmission finally achieves 80%.

| Reflective Polarizer | Layer Profile | Apodization | Skin Thickness (micrometers) | Bandwidth (nanometers) | Average % Transmission (930 to 980 nanometers) |
|---|---|---|---|---|---|
| 1 | 1 | Standard | 1.5 | 71 | 56.7 |
| 2 | 2 | Up | 1.5 | 117 | 43.6 |
| 3 | 3 | Down | 1.5 | 14 | 82.4 |
| 4 | 1 | Standard | 2.5 | 43 | 70.0 |
| 5 | 2 | Up | 2.5 | 105 | 43.1 |

-continued

| Reflective Polarizer | Layer Profile | Apodization | Skin Thickness (micrometers) | Bandwidth (nanometers) | Average % Transmission (930 to 980 nanometers) |
|---|---|---|---|---|---|
| 6 | 3 | Down | 2.5 | 18 | 83.2 |
| 7 | 1 | Standard | 5 | 61 | 64.8 |
| 8 | 2 | Up | 5 | 126 | 38.9 |
| 9 | 3 | Down | 5 | 8 | 88.4 |

Figure 25:
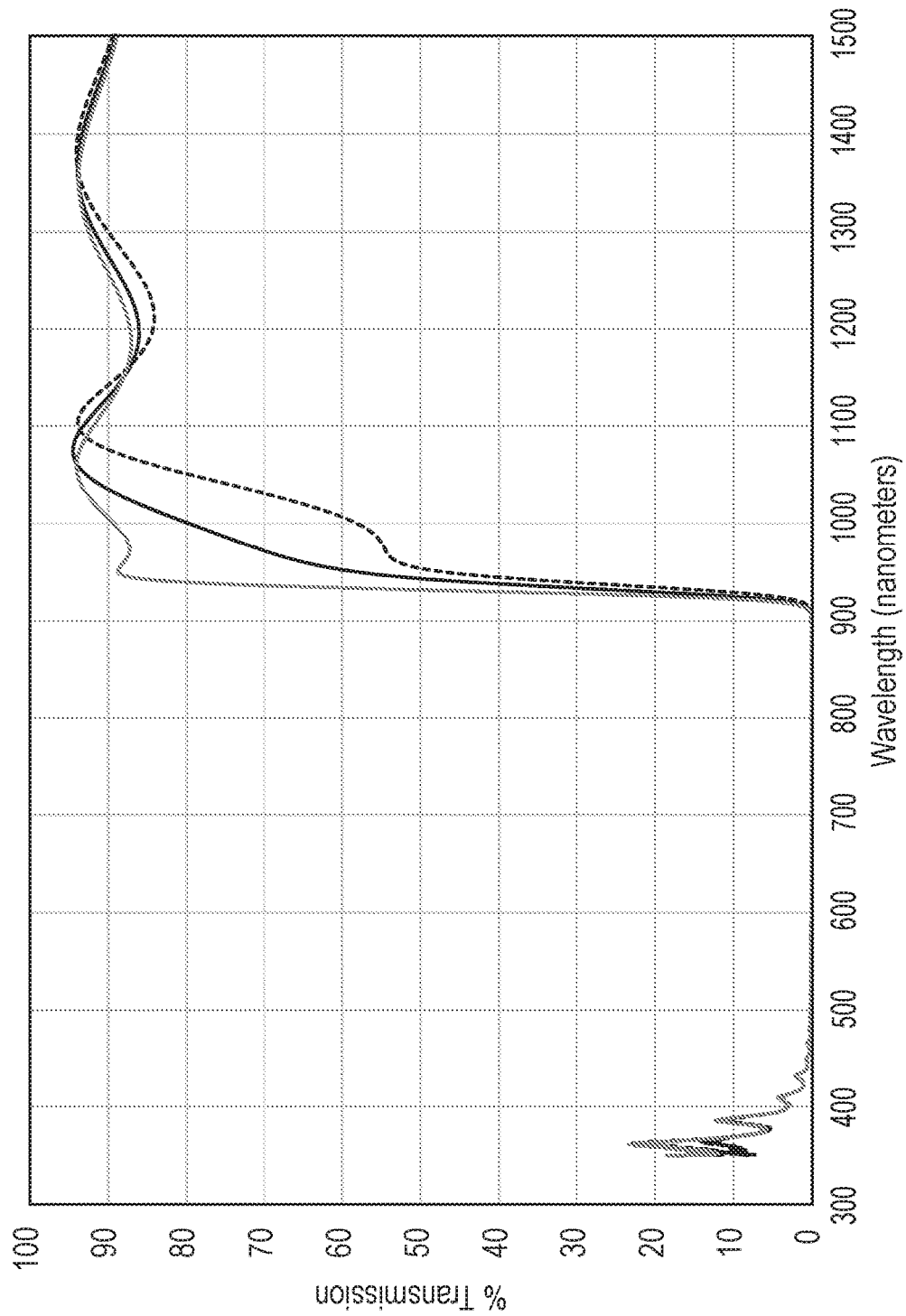
FIGS. 25-27 are block state transmission spectra for substantially normally incident light for various reflective polarizers.
Figure 26:
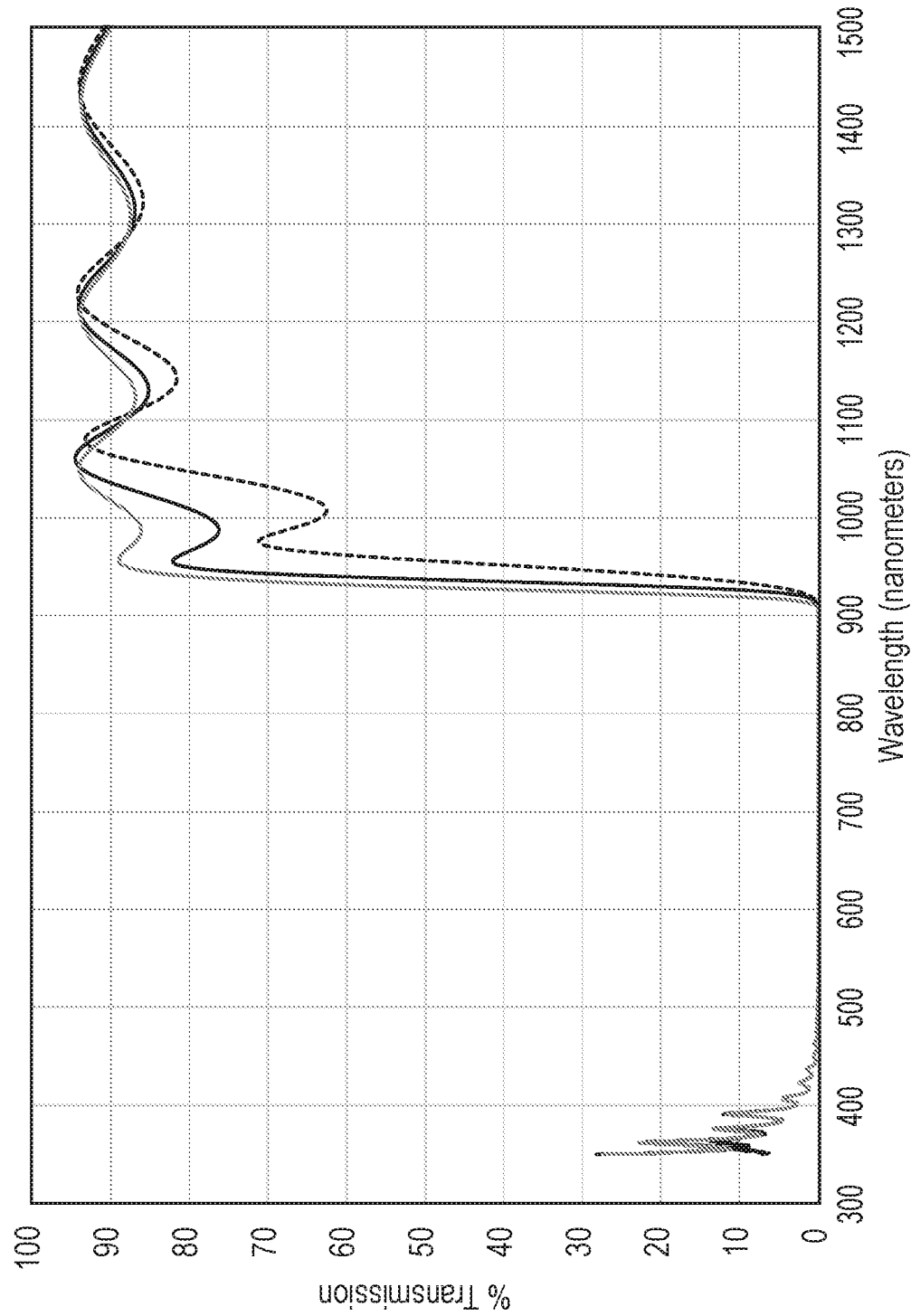
Figure 27:
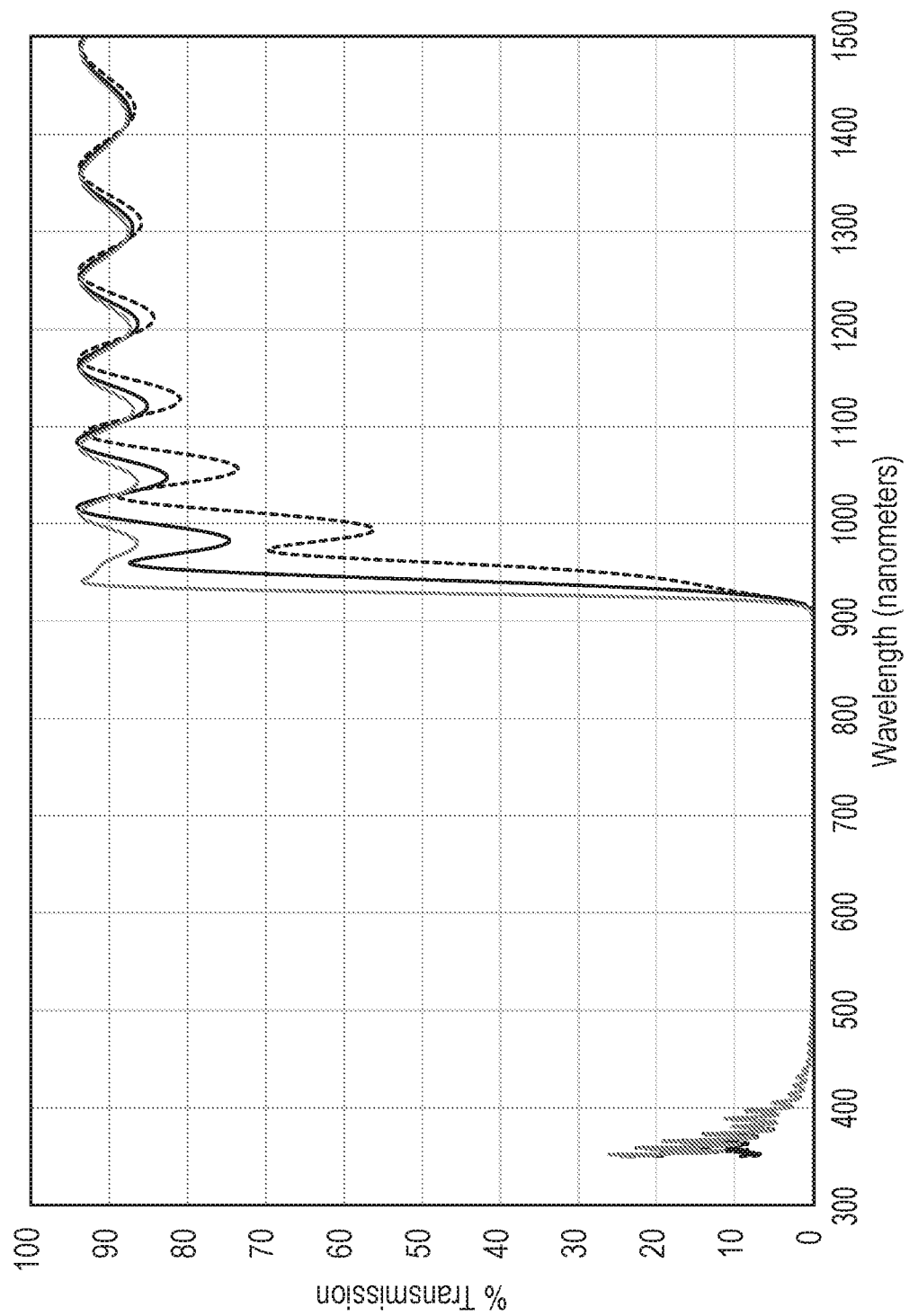

The resulting block state transmission spectra are shown in FIG. 25 for 1.5 micrometer thick skin layers (Reflective Polarizers 1, 2, and 3); FIG. 26 for 2.5 micrometer thick skin layers (Reflective Polarizers 4, 5, and 6); and in FIG. 27 for 5.0 micrometer thick skin layers (Reflective Polarizers 7, 8, and 9).

Figure 28:
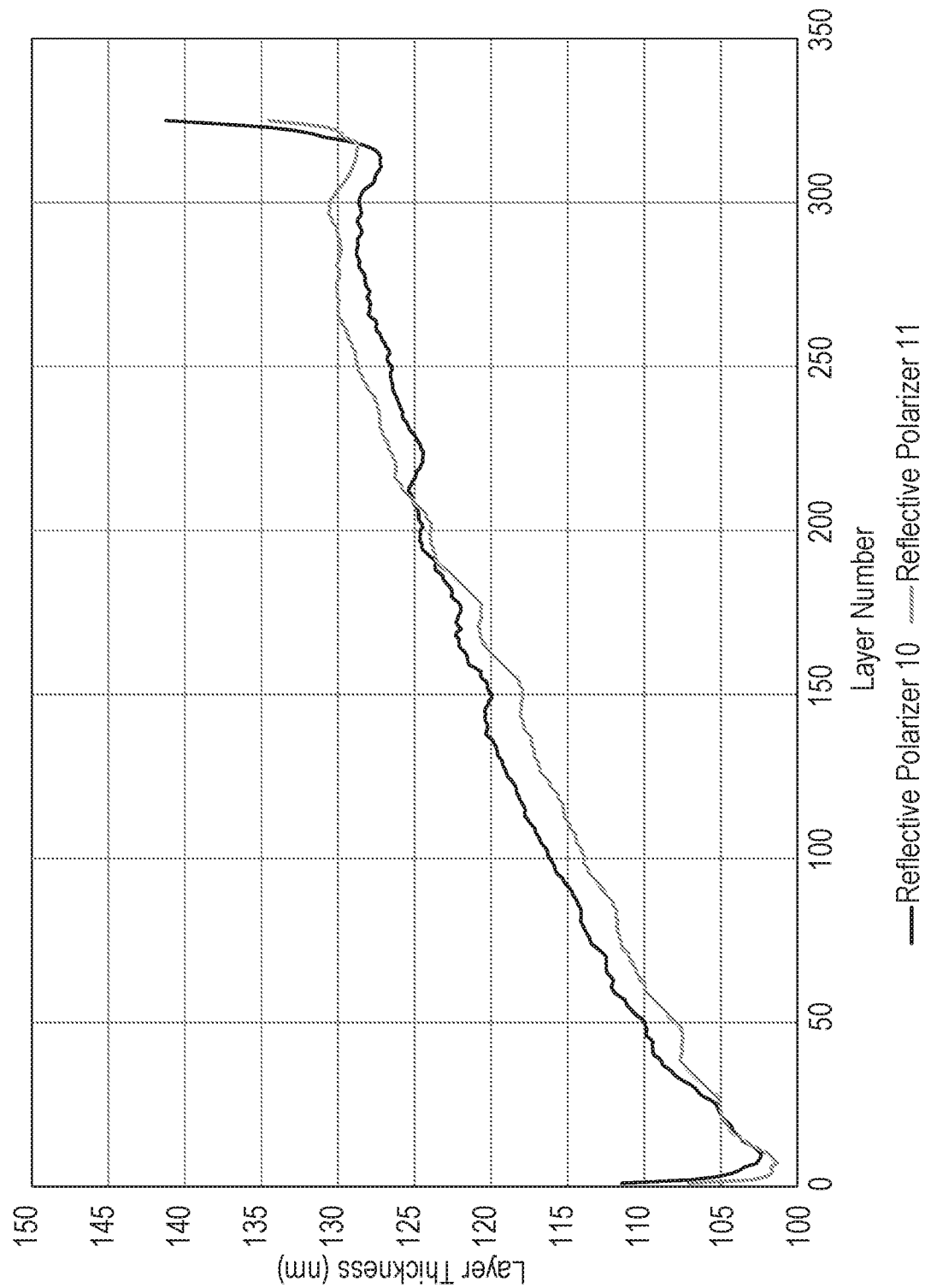
FIG. 28 is a plot of average layer thickness versus layer number for two reflective polarizers.
Figure 29:
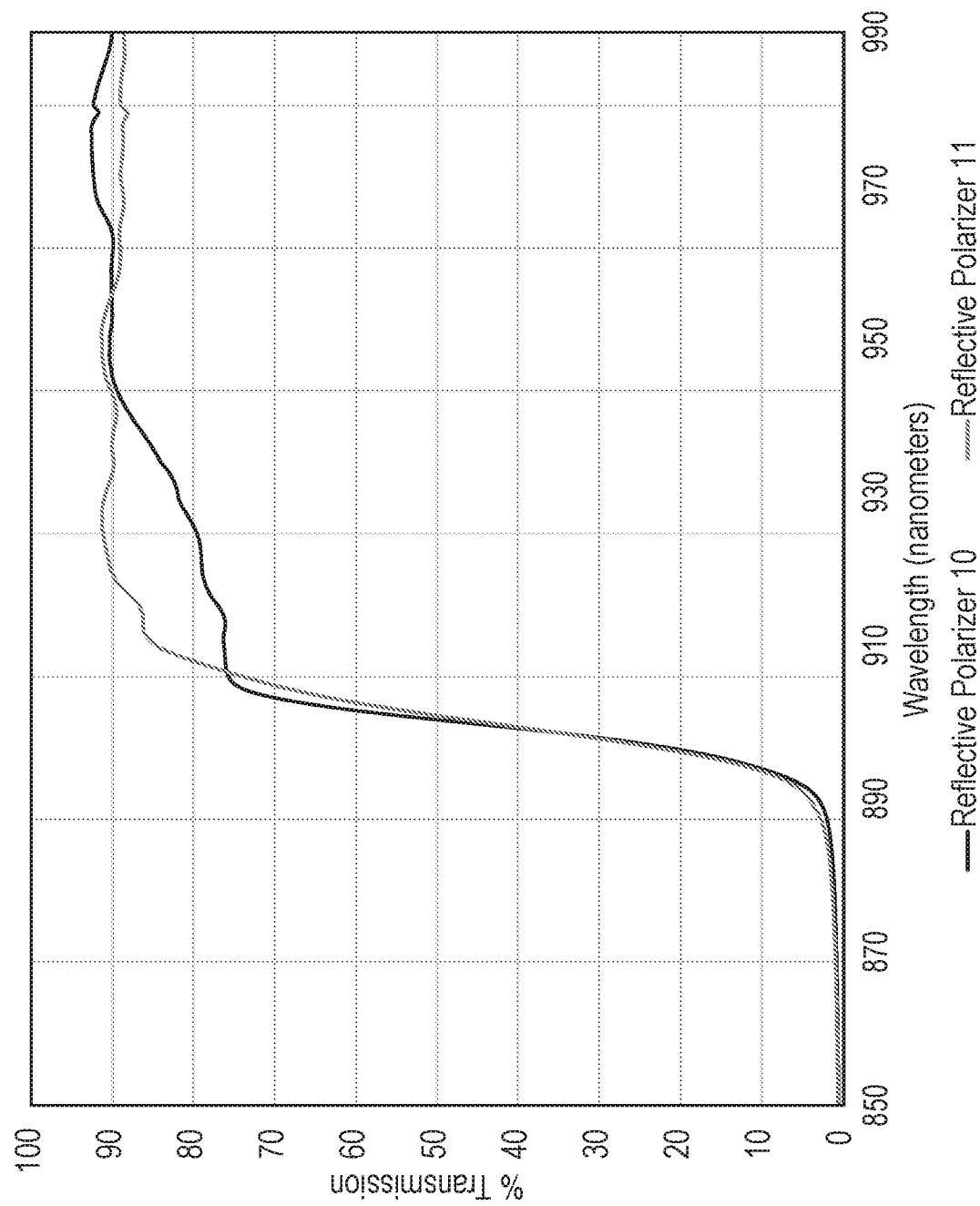
FIG. 29 shows block state transmission spectra for substantially normally incident light for the reflective polarizers of FIG. 28.

FIGS. 28 and 29 show experimental layer thickness profiles and transmission spectra, respectively, for Reflective Polarizers 10 and 11 showing the relationship between layer thickness profile and transmission spectra shape. The materials, layer configuration, and process conditions used to make these films were described above and the layer thickness profiles were measured with the same Atomic Force Microscopy system. The process parameter used to select these layer thicknesses profiles was the axial rod heater power levels in the multi-layer feedblock as described in U.S. Pat. No. 6,783,349 (Neavin et al.). The skin layers were 1.5 micrometers thick for Reflective Polarizers 10 and 11. FIG. 28 shows the measured layer thickness profiles for the last 325 layers delivered by the feedblock system for the two reflective polarizer films. FIG. 29 shows the resulting block state transmission spectra for Reflective Polarizers 10 and 11. Reflective Polarizer 11 had fewer layers having a high positive slope compared to Reflective Polarizer 10. Reflective Polarizer 11 showed higher transmission in for the wavelength range (910 to 950 nm) adjacent to the right band edge than Reflective Polarizer 10.

Preparation of Bead Coating Solutions:

First, a precursor solution WB50 was prepared as follows. A one-gallon polyester kettle was charged with 111.9 g (5.5 mol %) 5-sodiosulfoisophthalic acid, 592.1 g (47.0 mol %) terephthalic acid, 598.4 g (47.5 mol %) isophthalic acid, 705.8 g ethylene glycol, 599 g neopentyl glycol, 0.7 g antimony oxide, and 2.5 g sodium acetate. The mixture was heated with stirring to 230° C. at 345 kPa (50 psi) under nitrogen for 2 hours, during which time water evolution was observed. The temperature was increased to 250° C. and the pressure was then reduced, vacuum was applied (0.2 torr), and the temperature was increased to 270° C. The viscosity of the material increased over a period of 45 minutes, after which time a high molecular weight, clear, viscous sulfopolyester was drained. This sulfopolyester was found by DSC to have a Tg of 70.3° C. The theoretical sulfonate equivalent weight was 3847 g polymer per mole of sulfonate. 500 g of the polymer was dissolved in a mixture of 2000 g water and 450 g isopropanol at 80° C. The temperature was then raised to 95° C. in order to remove the isopropanol (and a portion of the water). The final dispersion consisted of an aqueous 20 wt. % solids dispersion.

Coating solutions were prepared by mixing the inputs detailed in the table below and agitating until homogeneous.
Solution Inputs

| Material | Solution A Weight Percent | Solution B Weight Percent | Solution C Weight Percent |
|---|---|---|---|
| DIW | 0 | 40.7 | 40.1 |
| WB50 | 82.2 | 48.7 | 48.1 |
| 1100D | 16.5 | 9.8 | 9.7 |
| TOM259 | 0.5 | 0.3 | 0.3 |
| MX500 | 0.8 | 0.5 | — |
| MZ8HN | — | — | 1.8 |

Reflective Polarizer 12

A multilayer optical (MOF) film was manufactured with two sequential (stacked) packets of microlayers, with 325 individual microlayers layers in each packet enclosed by packet bonding layers. The microlayers in each packet were arranged as alternating layers of material A and material B. Material A was a birefringent polyester PEN, and material B was a blend of PC:PCTG and PETG in the ratio of 85:15. The microlayer packet was designed to have a reflection band that spans the regions of visible and near-IR wavelengths. The films were then stretched continuously in a standard tenter with a draw ratio of 6:1 in the transverse direction and constrained in the machine direction (no orientation or relaxation). The oven temperature used for the orientation was 270 degrees Fahrenheit. The process conditions for the manufacture of this film were chosen so that the measured spectra matched the calculated spectra using the wavelength-dependent refractive index values, as shown in the table below. Respective refractive indices of materials $n_x$, $n_y$, and $n_z$ are along the x-direction (transverse direction), the y-direction (machine direction), and the z-direction (thickness direction). $n_{iso}$ is the isotropic refractive index of the PC:PCTG, PETG blend.

Calculated Spectra Values

| | Wavelength nm | | |
|---|---|---|---|
| | 450 | 550 | 633 |
| | PEN | | |
| $n_x$ | 1.925 | 1.854 | 1.826 |
| $n_y$ | 1.691 | 1.652 | 1.635 |
| $n_z$ | 1.526 | 1.498 | 1.489 |
| | PC:PCTG, PETG blend | | |
| $n_{iso}$ | 1.596 | 1.578 | 1.570 |

Figure 30A:
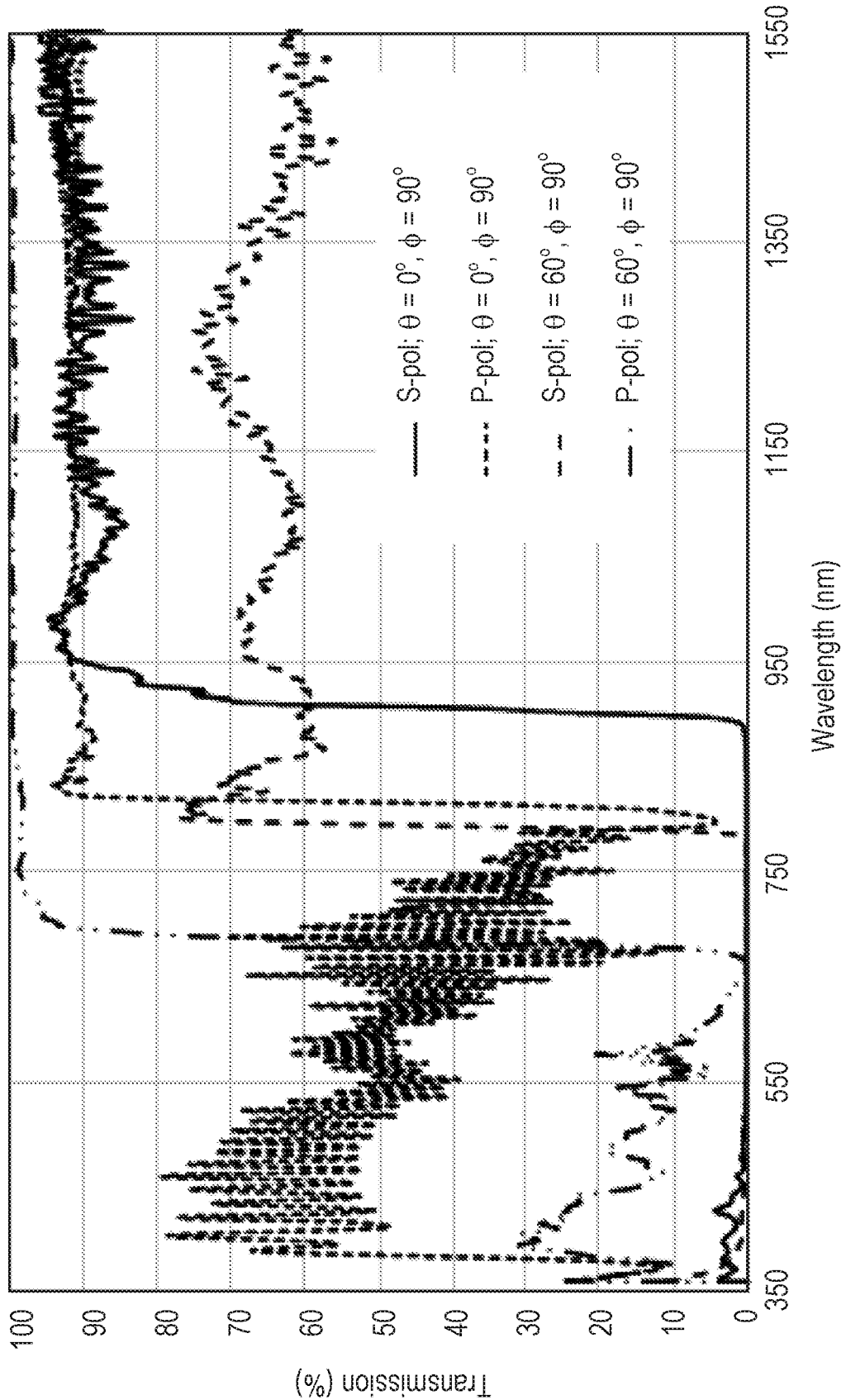
FIG. 30A is a plot of transmission versus wavelength for an illustrative reflective polarizer for s- and p-polarized light.
Figure 30B:
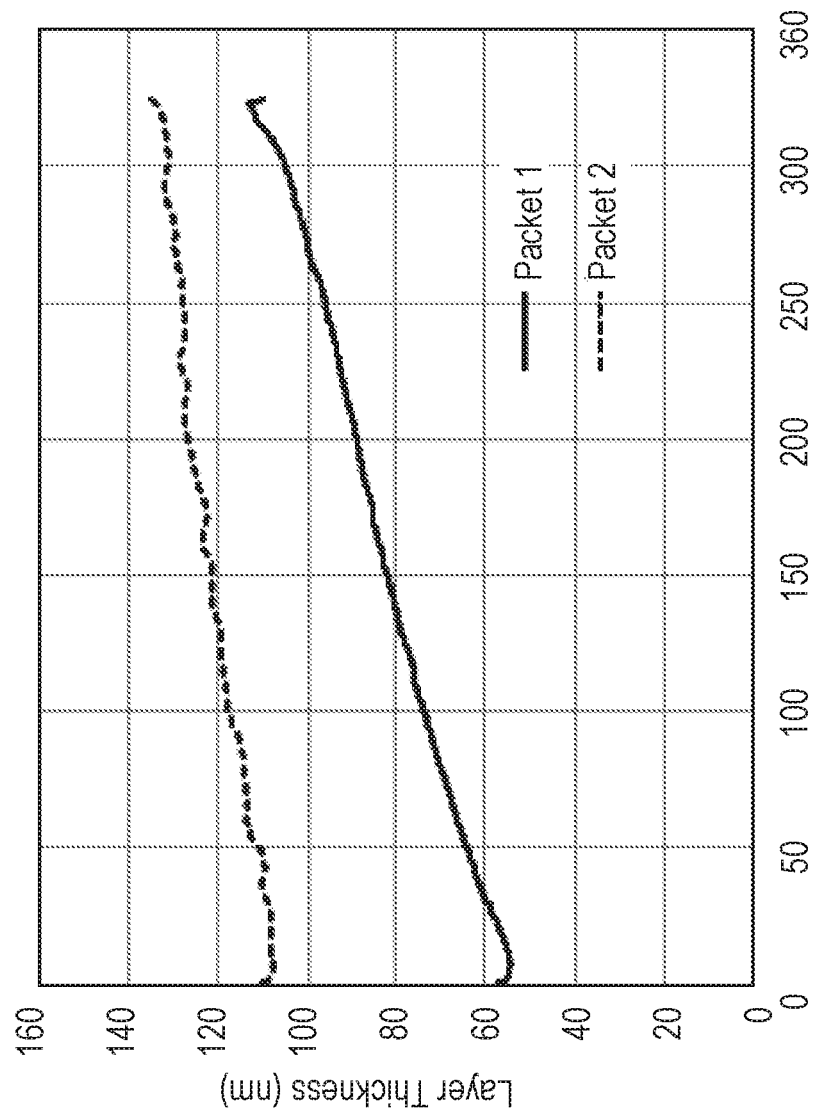
FIG. 30B is a layer thickness profile for the reflective polarizer of FIG. 30A.

Representative spectra for Reflective Polarizer 12 were measured and are shown in FIG. 30A for a plane of incidence making an angle φ of 90 degrees to the transverse direction, for angles of incidence θ of zero (normal incidence) and 60 degrees, and for s- and p-polarizations states. The layer thicknesses were measured using an Atomic Force Microscope (Dimension ICON from Bruker Instruments, Billerica, MA) and is shown in FIG. 30B.

Reflective Polarizer 13

The surface of the packet 1 of unoriented cast web was continuously coated with solution A using a gravure roll in a reverse kiss configuration. The coated web then passed through a coating oven for at least 5 seconds with the temperature of the oven maintained above 65° C. The beads were observed under a microscope on the unoriented cast web to be not grouped together and the beads appeared to be delivered to the surface of the web at the same concentration as in the coating solution. This bead coated cast film was stretched and oriented to yield bead coated MOF as described for Reflective Polarizer 12.

Figure 31:
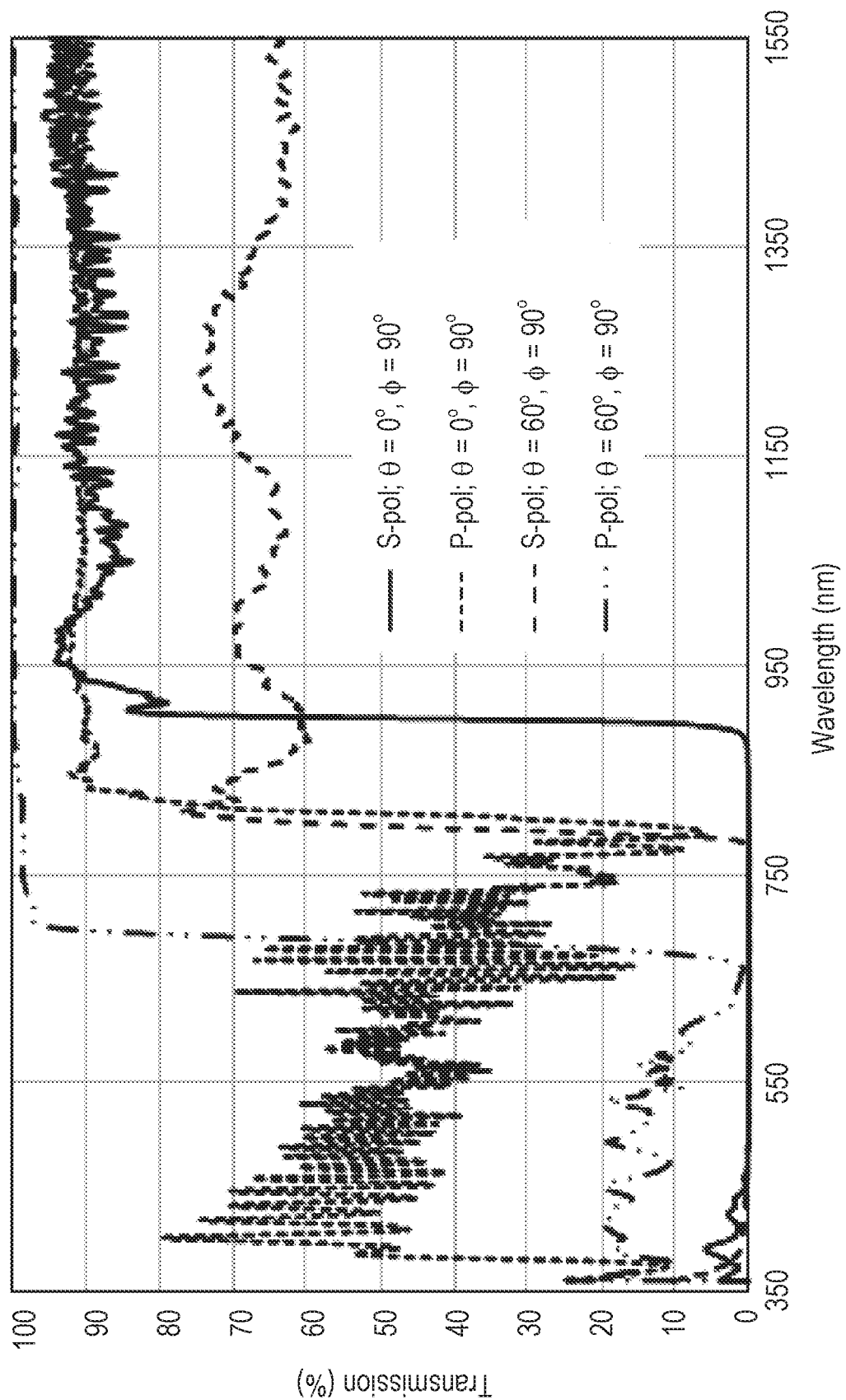
FIGS. 31-33 are plots of transmission versus wavelength for illustrative reflective polarizers for s- and p-polarized light.

A Keyence microscope was used to count the number of beads per unit area and it was found to be ~175 beads/mm². Representative spectra for Reflective Polarizer 13 were measured and are shown in FIG. 31.

Reflective Polarizer 14

The surface of the packet 1 of unoriented cast web was continuously coated with solution A using a gravure roll in a reverse kiss configuration. The coated web then passed through a coating oven for at least 5 seconds with the temperature of the oven maintained above 65° C. The other side (surface of packet 2) of the cast web coated with solution A was then continuously coated with solution B and dried in the same manner as with solution A. The beads were observed under a microscope on the unoriented cast web to be not grouped together and the beads appeared to be delivered to the surface of the web at the same concentration as in the coating solution. This bead coated cast film was stretched and oriented as described for Reflective Polarizer 12 to yield both side bead coated MOF. A Keyence microscope was used to count the number of beads per unit area and it was found to be ~175 beads/mm².

Reflective Polarizer 15

Figure 32:
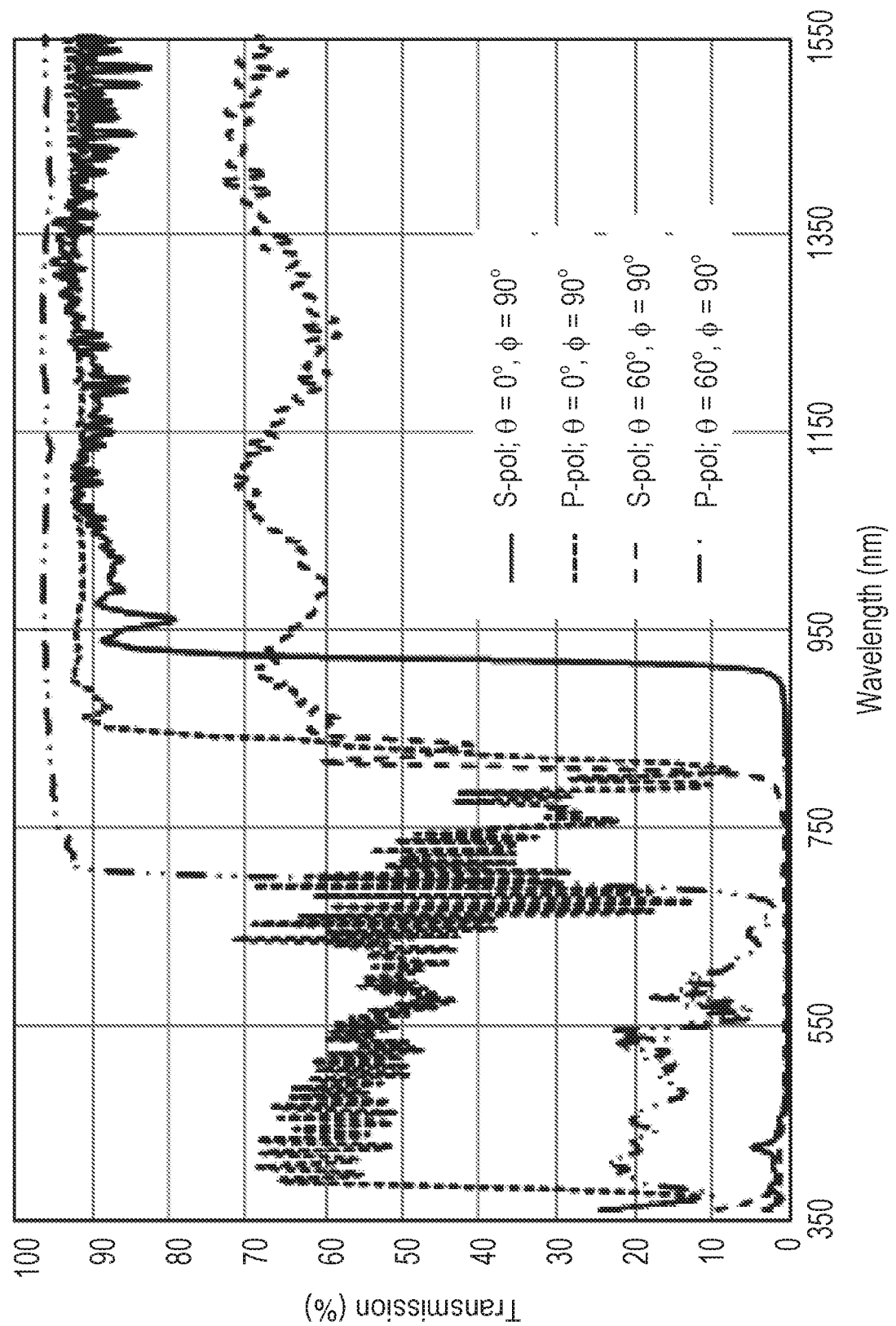

Reflective Polarizer 15 was prepared very similar to Reflective Polarizer 14 except the coating solution B was replaced by coating solution C. A Keyence microscope was used to count the number of beads per unit area and it was found to be ~182 beads/mm2. A cross-section of the Reflective Polarizer 15 was similar to the cross-section shown schematically in FIG. 3A but without the optically diffusive layer 30. Representative spectra for Reflective Polarizer 15 were measured and are shown in FIG. 32.

Reflective Polarizer 16

The surface of the thick packet of the MOF film as described in Reflective Polarizer 15 was coated with a conformal diffuser using a slurry of silica nanoparticles in acrylic monomer dissolved in its solvent as described below.

First, a coating precursor solution was prepared by mixing a 5.95 g of A-174 and 0.5 g of 4-hydroxy-2,2,6,6-tetramethylpiperidine 1-oxyl (5 wt. %; 4H-2,2,6,6-TMP 1-0) were added to the mixture of 400 g NALCO 2329 and 450 g of 1-methoxy-2-propanol in a glass jar with stirring at room temperature for 10 mins. The jar was sealed and placed in an oven at 80° C. for 16 hours. Then, the water was removed from the resultant solution with a rotary evaporator at 60° C. until the solid content of the solution was close to 45 wt %. 200 g of 1-methoxy-2-propanol was charged into the resultant solution, and then remaining water was removed by using the rotary evaporator at 60° C. This latter step was repeated for a second time to further remove water from the solution. Finally, the concentration of total silica nanoparticles was adjusted to 42.5 wt. % by adding 1-methoxy-2-propanol to result in the silica solution containing surface modified silica nanoparticles with an average size of 75 nm.

Next, a coating solution was prepared. The coating solution was composed of 20.96 wt. % of the clear precursor solution described above, 5.94 wt. % of SR444, 71.55 wt. % isopropyl alcohol, 1.48 wt. % IRGACURE 184 and 0.07 wt. % IRGACURE 819. Coating solution was pumped (using a pressure pot) to a slot-type coating die at a rate that produced a wet layer thickness of 7 microns onto the Reflective Polarizer 15.

Next, the coating was polymerized by passing the coated substrate through a UV-LED cure chamber that included a quartz window to allow passage of UV radiation. The UV-LED cure chamber included a rectangular array of 160 UV-LEDs, 4 down-web by 40 cross-web (approximately covering a 42.5 cm×4.5 cm area). The LEDs (available from Nichia Inc., Tokyo Japan) operated at a nominal wavelength of 385 nm and when run at 10 Amps, resulted in a UV-A dose of 0.035 joules per square cm. The UV-LEDs were run at 3 Amps to produce the film described in this example. The water-cooled UV-LED array was powered by a Lambda power supply (available from TDK-Lambda, Neptune NJ). The UV-LEDs were positioned above the quartz window of the cure chamber at a distance of approximately 2.5 cm from the substrate. The UV-LED cure chamber was supplied with a flow of nitrogen at a flow rate of 141.6 liters/mm. Air was introduced into the nitrogen supply to control the total oxygen level in the UV-LED chamber. The oxygen level in the UV-LED cure chamber was monitored using a Series 3000 oxygen analyzer (available from Alpha Omega Instruments, Cumberland RI).

After being polymerized by the UV-LEDs, the solvent in the cured coating was removed and dried at 66° C. for 30 seconds. Next, the dried coating was post-cured using a Fusion System Model 1600 configured with a D-bulb (available from Fusion UV Systems, Gaithersburg, MD). The UV Fusion chamber was supplied with a flow of nitrogen that resulted in an oxygen concentration of approximately 50 ppm in the chamber. This resulted in a diffuser coated film with conformal coating of the beads.

Figure 33:
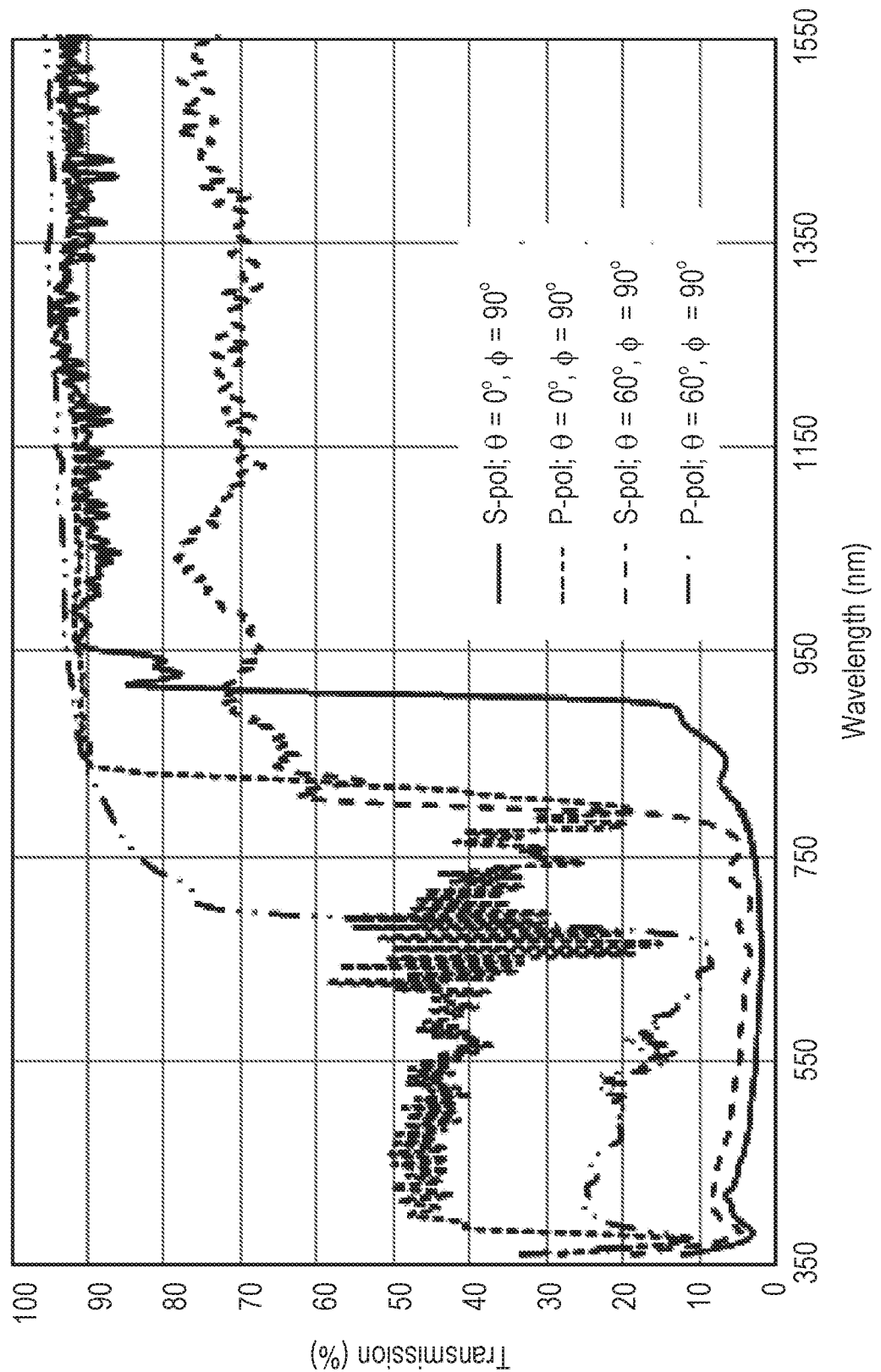

A schematic of the cross-section of the Reflective Polarizer 16 is shown in FIG. 3A. Representative spectra for Reflective Polarizer 16 were measured and are shown in FIG. 33.

Exemplary Optically Diffusive Films

Additional Materials Used in the Exemplary Optically Diffusive Films

| Identification | Description | Source |
|---|---|---|
| 4H-2,2,6,6-TMP 1-O | 4-hydroxy-2,2,6,6-tetramethylpiperidine 1-oxyl | Sigma Aldrich, Milwaukee, WI |
| 1-methoxy-2-propanol | Solvent | Sigma Aldrich, Milwaukee, WI |
| Isopropyl alcohol | Solvent | Sigma Aldrich, Milwaukee, WI |
| HDDA | 1,6 hexanediol diacrylate available under the tradename SR238B | Sartomer Arkema, Exton PA |
| TMPTA | Trimethylolpropane triacrylate available under the tradename SR351 | Sartomer Arkema, Exton PA |
| TPO | Diphenyl (2,4,6-trimethylbenzoyl)-phosphine oxide available under the trade name DAROCUR TPO | BASF, Germany |

-continued

| Identification | Description | Source |
|---|---|---|
| PHOTOMER 6210 | Aliphatic urethane acrylate oligomer available | IGM Resins USA, St. Charles, IL |

A coating precursor solution was made. 5.95 grams of 3-methacryloxypropyl-trimethoxysilane (A-174, Momentive, Waterford, NY) and 0.5 gram of 4-hydroxy-2,2,6,6-tetramethylpiperidine 1-oxyl (5 wt. %; 4H-2,2,6,6-TMP 1-0, Sigma Aldrich, Milwaukee, WI) were added to the mixture of 400 grams 75 nm diameter $SiO_2$ sol (NALCO 2329, Nalco Company, Naperville, IL) and 450 grams of 1-methoxy-2-propanol (Sigma Aldrich, Milwaukee, WI) in a glass jar with stirring at room temperature for 10 minutes. The jar was sealed and placed in an oven at 80° C. for 16 hours. Then, the water was removed from the resultant solution with a rotary evaporator at 60° C. until the solid content of the solution was close to 45 wt. %. 200 grams of 1-methoxy-2-propanol was charged into the resultant solution, and then remaining water was removed by using the rotary evaporator at 60° C. This latter step was repeated for a second time to further remove water from the solution. Finally, the concentration of total $SiO_2$ nanoparticles was adjusted to 42.5 wt. % by adding 1-methoxy-2-propanol to result in the $SiO_2$ sol containing surface modified $SiO_2$ nanoparticles with an average size of 75 nm.

A coating solution "A" was made. The coating solution "A" was composed of 27.98 wt. % of the clear precursor solution described above, 7.9 wt. % of pentaerythritol triacrylate monomer (SR444, Sartomer), 63.3 wt. % isopropyl alcohol, 0.8 wt. % IRGACURE 184 (BASF, Vandalia, IL) and 0.02 wt. % IRGACURE 819 (BASF, Vandalia, IL). Coating solution "A" was pumped with a Viking CMD (Viking Pump, Cedar Falls, IA) pump to a slot-type coating die at a rate that produced a wet layer thickness of 15 microns onto a primed polyester substrate.

Next, the coating was polymerized by passing the coated substrate through a UV-LED cure chamber that included a quartz window to allow passage of UV radiation. The UV-LED cure chamber included a rectangular array of UV-LEDs. The LEDs (available from Nichia Inc., Tokyo Japan) operated at a nominal wavelength of 385 nm and when run at 10 Amps, resulted in a UV-A dose of 0.035 joules per square cm. The UV-LEDs were run at 8 Amps. The water-cooled UV-LED array was powered by a Genesys 150-22 power supply (available from TDK-Lambda, Neptune NJ). The UV-LEDs were positioned above the quartz window of the cure chamber at approximately 2.5 cm from the substrate. The UV-LED cure chamber was supplied with a flow of nitrogen at a flow rate of 22 cubic feet per minute in order to keep the oxygen level below 50 parts ppm. The oxygen level in the UV-LED cure chamber was monitored using a Series 3000 oxygen analyzer (available from Alpha Omega Instruments, Cumberland RI).

After being polymerized by the UV-LEDs, the solvent in the cured coating was removed by transporting the coated substrate to a drying oven at 150° F. (66 C) for 30 seconds. Next, the dried coating was post cured using a Fusion System Model 1600 configured with a H-bulb (available from Fusion UV Systems, Gaithersburg, MD). The UV Fusion chamber was supplied with a flow of nitrogen that resulted in an oxygen concentration of approximately 50 ppm in the chamber. This resulted in the porous coated polyester film.

Test Methods and Results

The total near-infrared transmission and diffuse near-infrared transmission were measured for each diffuser using a spectrometer (ULTRASCAN PRO, Hunterlab, Reston, VA). The near-infrared scattering ratio was calculated from these measurements by dividing the diffuse near-infrared transmission by the total near-infrared transmission. The total transmission at 940 nm was 90.82%, the diffused transmission was 35.2%, and the near-infrared scattering ratio was 39%.

The visible transmission (% T), haze (% H) and clarity (% C) were measured for each diffuser using a haze meter (Haze-gard Plus, BYK-Gardner, Columbia, MD). Results are provided in the following table. The visible transmission was 87.5/a, the haze was 80.4%, and the clarity was 97.8%.

Optically diffusive films were made by forming a structured optical layer on the substrate of the diffuser opposite the optically diffusive layer. The structured optical layer appeared generally as structured optical layer 130 schematically illustrated in FIGS. 5A-5B.

The geometry of the structured surface was characterized by the following parameters:
1. X1: Tip radius of the features of the structured surface (e.g., corresponding to elongated structures 140).
2. X2: Feature density (the numbers of features per square mm).
3. Feature height, which was 5 microns Rolls for microreplicating structures described by the parameters in the following table were made.

| | X2 = 20 feat./mm² | X2 = 50 feat./mm² | X2 = 80 feat./mm² |
|---|---|---|---|
| Actual density (features/mm) | 21.13 | 50.31 | 81.58 |
| Surface Coverage % at X1 = 1 micron | 0.67 | 1.59 | 2.58 |
| Surface Coverage % at X1 = 5 microns | 0.95 | 3.86 | 6.26 |
| Total # features in design | 7,181,700 | 35,908,494 | 58,227,616 |

For each roll, a structured optical layer was formed on the substrate of diffuser opposite the optically diffusive layer by microreplicating from the roll in a continuous process using a 100% solid UV curable resin with cured refractive index of about 1.5067, and formulated as shown in the table below.

| Formulation | Wt % |
|---|---|
| HDDA | 20% |
| TMPTA | 20% |
| TPO | 0.5% |
| PHOTOMER 6210 | 59.5% |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A display system for sensing a finger of a user applied to the display system, the display system comprising:
    a display panel configured to generate an image for viewing by the user;
    a sensor for sensing the finger of the user disposed proximate the display panel;
    a sensing light source configured to emit a first light having a first wavelength W1 toward the finger of the user, the sensor configured to receive and detect at least a portion of the first light reflected by the finger; and
    a reflective polarizer disposed between the display panel and the sensor and comprising a plurality of polymeric layers numbering at least 50 in total, such that for a substantially normally incident light, an optical transmittance of the reflective polarizer versus wavelength for a first polarization state comprises a band edge, wherein:
    a best linear fit to the band edge correlating the optical transmittance to the wavelength at least across a wavelength range where the optical transmittance along the band edge increases from about 10% to at least about 70% has a slope of greater than about 2.5%/nm; and
    for a first wavelength range extending from a smaller wavelength L1 to a greater wavelength L2 and comprising W1, 30 nm≤L2−L1≤50 nm, L1 greater than and within about 20 nm of a wavelength L3 corresponding to an optical transmittance of about 50% along the band edge, the optical transmittance has an average of greater than about 75%,
    wherein for the substantially normally incident light and a predetermined wavelength range, the reflective polarizer has an average optical reflectance of at least 70% for the first polarization state and an average optical transmittance of at least 40% for an orthogonal second polarization state.

2. The display system of claim 1, wherein the first wavelength W1 is about 850 nm or about 940 nm.

3. The display system of claim 1, wherein the wavelength L3 is between about 800 nm and about 1100 nm.

4. The display system of claim 1, wherein for the second polarization state and the predetermined wavelength range, the reflective polarizer has a greater average optical transmittance for light incident at a smaller incident angle and a smaller average optical transmittance for light incident at a greater incident angle.

5. The display system of claim 1, wherein the predetermined wavelength range extends at least from about 450 nm to about 650 nm.

6. The display system of claim 1, wherein the plurality of polymeric layers comprises a plurality of first polymeric layers arranged along at least a portion of a thickness of the reflective polarizer and sequentially numbered from 1 to N, N an integer greater than about 150, the plurality of first polymeric layers comprising a polymeric end layer at each end thereof, the polymeric end layers and each layer therebetween having an average thickness less than about 350 nm, a plot of an average layer thickness versus a layer number of the plurality of first polymeric layers comprising a knee region separating a left region comprising at least Q1 sequentially arranged first polymeric layers, Q1 an integer greater than about 100, where the first polymeric layers have lower layer numbers, from a right region comprising at least Q2 sequentially arranged first polymeric layers, Q2 an integer of at least 10, where the first polymeric layers have higher layer numbers, such that a linear fit to the at least Q1 sequentially arranged first polymeric layers in the left region has a positive linear slope having a magnitude of greater than about 0.04 nm per layer number with an r-squared value of greater than about 0.8, and a linear fit to the at least Q2 sequentially arranged first polymeric layers in the right region has a negative linear slope having a magnitude of greater than about 0.1 nm per layer number with an r-squared value of greater than about 0.8.

7. The display system of claim 6, wherein the plurality of polymeric layers further comprises a plurality of second polymeric layers spaced apart along a thickness direction of the reflective polarizer from the plurality of first polymeric layers by one or more middle layers, each of the pluralities of first and second polymeric layers numbering at least 200 in total, each of the first and second polymeric layers having an average thickness of less than about 300 nm, each of the one or more middle layers having an average thickness of greater than about 500 nm.

8. The display system of claim 1, wherein a second order polynomial fit to the optical transmittance across a wavelength range at least 200 nm wide between the band edge and about 1300 nm has an r-squared value of greater than about 0.6 and a minimum optical transmittance of less than about 80%.

9. The display system of claim 8, wherein the second order polynomial fit has a positive second order coefficient and a negative first order coefficient.

10. The display system of claim 1, wherein the reflective polarizer further comprises:
    a first outer layer co-extruded with the plurality of polymeric layers;
    a plurality of first particles having an average size of from about 7 to about 9 microns and partially protruding from a first major surface of the first outer layer to form a first structured major surface; and
    a first optically diffusive layer conformably disposed on the first structured major surface so that opposing first and second major surfaces of the first optically diffusive layer substantially conform to the first structured major surface, the first optically diffusive layer comprising a plurality of nanoparticles dispersed therein, the nanoparticles defining a plurality of voids therebetween.

11. The display system of claim 10, wherein the reflective polarizer further comprises:
- a second outer layer opposite the first outer layer, the second outer layer co-extruded with the plurality of polymeric layers and the first outer layer; and
- a plurality of second particles partially protruding from a second major surface of the second outer layer to form a second structured major surface.

12. The display system of claim 1, further comprising an optically diffusive film disposed between the reflective polarizer and the sensor, the optically diffusive film comprising:
- an optical substrate layer;
- a second optically diffusive layer disposed on the optical substrate layer and facing the reflective polarizer and comprising a plurality of nanoparticles dispersed therein, wherein for a substantially normally incident light and a visible wavelength range from about 450 nm to about 650 nm and an infrared wavelength range from about 930 nm to about 970 nm, the second optically diffusive layer has an average specular transmittance Vs in the visible wavelength range and an average specular transmittance Is in the infrared wavelength range, Is/Vs>2.5; and
- a structured optical layer disposed on the optical substrate layer and facing away from the reflective polarizer and comprising a structured major surface facing away from the optical substrate layer and comprising a plurality of spaced apart elongated structures elongated along a same first direction and arranged at a substantially uniform density across the structured major surface of the structured optical layer.

13. The display system of claim 12 further comprising a lightguide for providing illumination to the display panel, the lightguide disposed between the reflective polarizer and the sensor.

14. The display system of claim 13 further comprising a structured mirror disposed between the lightguide and the sensor and comprising an optical mirror, and an array of discrete spaced apart optical bumps formed on the optical mirror and facing the lightguide, such that for a substantially normally incident light, the optical mirror has an average optical reflectance of greater than about 30% in the visible wavelength range for at least the first polarization state, and a specular transmittance of greater than about 20% for at least one wavelength in the infrared wavelength range for each of the first polarization state and the second polarization state.

15. A display system for sensing a finger of a user applied to the display system, the display system comprising:
- a display panel configured to generate an image for viewing by the user;
- a sensor for sensing the finger of the user disposed proximate the display panel;
- a sensing light source configured to emit a first light having a first wavelength W1 toward the finger of the user, the sensor configured to receive and detect at least a portion of the first light reflected by the finger; and
- a reflective polarizer disposed between the display panel and the sensor and comprising a plurality of polymeric layers numbering at least 50 in total, such that for a substantially normally incident light, an optical transmittance of the reflective polarizer versus wavelength for a first polarization state comprises a band edge, wherein:
- a best linear fit to the band edge correlating the optical transmittance to the wavelength at least across a wavelength range where the optical transmittance along the band edge increases from about 10% to at least about 70% has a slope of greater than about 2.5%/nm; and
- for a first wavelength range extending from a smaller wavelength L1 to a greater wavelength L2 and comprising W1, 30 nm≤L2−L1≤50 nm, L1 greater than and within about 20 nm of a wavelength L3 corresponding to an optical transmittance of about 50% along the band edge, the optical transmittance has an average of greater than about 75%,
- wherein a second order polynomial fit to the optical transmittance across a wavelength range at least 200 nm wide between the band edge and about 1300 nm has an r-squared value of greater than about 0.6 and a minimum optical transmittance of less than about 80%.

16. The display system of claim 15, wherein the second order polynomial fit has a positive second order coefficient and a negative first order coefficient.

17. A display system for sensing a finger of a user applied to the display system, the display system comprising:
- a display panel configured to generate an image for viewing by the user;
- a sensor for sensing the finger of the user disposed proximate the display panel;
- a sensing light source configured to emit a first light having a first wavelength W1 toward the finger of the user, the sensor configured to receive and detect at least a portion of the first light reflected by the finger; and
- a reflective polarizer disposed between the display panel and the sensor and comprising a plurality of polymeric layers numbering at least 50 in total, such that for a substantially normally incident light, an optical transmittance of the reflective polarizer versus wavelength for a first polarization state comprises a band edge, wherein:
- a best linear fit to the band edge correlating the optical transmittance to the wavelength at least across a wavelength range where the optical transmittance along the band edge increases from about 10% to at least about 70% has a slope of greater than about 2.5%/nm; and
- for a first wavelength range extending from a smaller wavelength L1 to a greater wavelength L2 and comprising W1, 30 nm≤L2−L1≤50 nm, L1 greater than and within about 20 nm of a wavelength L3 corresponding to an optical transmittance of about 50% along the band edge, the optical transmittance has an average of greater than about 75%,
- wherein the reflective polarizer further comprises:
  - a first outer layer co-extruded with the plurality of polymeric layers;
  - a plurality of first particles having an average size of from about 7 to about 9 microns and partially protruding from a first major surface of the first outer layer to form a first structured major surface; and
  - a first optically diffusive layer conformably disposed on the first structured major surface so that opposing first and second major surfaces of the first optically diffusive layer substantially conform to the first structured major surface, the first optically diffusive layer comprising a plurality of nanoparticles dispersed therein, the nanoparticles defining a plurality of voids therebetween.

18. The display system of claim 17, wherein the reflective polarizer further comprises:
- a second outer layer opposite the first outer layer, the second outer layer co-extruded with the plurality of polymeric layers and the first outer layer; and a plurality of second particles partially protruding from a second major surface of the second outer layer to form a second structured major surface.

\* \* \* \* \*